(12) United States Patent
Yaji et al.

(10) Patent No.: US 7,860,595 B2
(45) Date of Patent: Dec. 28, 2010

(54) PRODUCTION SCHEDULE CREATION DEVICE AND METHOD, PRODUCTION PROCESS CONTROL DEVICE AND METHOD, COMPUTER PROGRAM, AND COMPUTER-READABLE RECORDING MEDIUM

(75) Inventors: Yasuhito Yaji, Chiba (JP); Kenji Sugiyama, Chiba (JP); Tetsuaki Kurokawa, Chiba (JP); Masanori Shioya, Chiba (JP); Kuniharu Ito, Chiba (JP); Hirokazu Kobayashi, Chiba (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 12/655,854

(22) Filed: Jan. 8, 2010

(65) Prior Publication Data

US 2010/0138023 A1 Jun. 3, 2010

Related U.S. Application Data

(62) Division of application No. 10/584,423, filed as application No. PCT/JP2004/019405 on Dec. 24, 2004, now Pat. No. 7,676,293.

(30) Foreign Application Priority Data

| Dec. 24, 2003 | (JP) | ............................. 2003-427914 |
| Mar. 31, 2004 | (JP) | ............................. 2004-106121 |
| Apr. 8, 2004 | (JP) | ............................. 2004-114637 |

(51) Int. Cl.
*G06F 19/00* (2006.01)
*G05B 13/02* (2006.01)

(52) U.S. Cl. ........................... 700/100; 700/31; 700/37; 700/45; 705/8

(58) Field of Classification Search ............. 700/14–16, 700/28–31, 37, 45, 47, 95, 97, 99–104; 705/8, 705/9
See application file for complete search history.

(56) References Cited

U.S. PATENT DOCUMENTS 4,698,745 A * 10/1987 Hiroi et al. .................... 700/45

(Continued)

FOREIGN PATENT DOCUMENTS

JP 05-108649 4/1993

(Continued)

OTHER PUBLICATIONS

Taiwan Office Action dated Mar. 10, 2006 issued in corresponding Taiwan Application No. 93140842.

(Continued)

*Primary Examiner*—Sean P Shechtman
(74) *Attorney, Agent, or Firm*—Kenyon & Kenyon LLP

(57) ABSTRACT

A production schedule creation device includes: a production simulator (100) simulating a production process expressing the production state and the production constraint of the production process; a mathematical expression holding device holding a mathematical model (110) created by acquiring information relating to creation of the production schedule in attention as a mathematical model expressing, in a mathematical expression, the production state and the production constraint of the production process; and an optimization calculation device (120) performing the optimization calculation by using a predetermined evaluation function for the mathematical model (110) and calculating a production instruction for the production simulator. The production instruction obtained by the optimization calculation device is supplied to the production simulator (100) so as to execute simulation. Thus, an optimum solution can be obtained by performing only one simulation.

16 Claims, 29 Drawing Sheets

U.S. PATENT DOCUMENTS

| | | |
|---|---|---|
| 5,216,593 A | 6/1993 | Dietrich et al. |
| 5,315,521 A | 5/1994 | Hanson et al. |
| 6,405,157 B1 | 6/2002 | Fujii et al. |
| 6,606,527 B2 | 8/2003 | de Andrade et al. |

FOREIGN PATENT DOCUMENTS

| | | |
|---|---|---|
| JP | 5-225205 | 9/1993 |
| JP | 09-231271 | 9/1997 |
| JP | 10-161708 | 6/1998 |
| JP | 11-003101 | 1/1999 |
| JP | 2000-172745 | 6/2000 |
| JP | 2002-229635 | 8/2002 |
| JP | 2002-288277 | 10/2002 |
| JP | 2002-298066 | 10/2002 |
| JP | 2002-366219 | 12/2002 |
| JP | 2002-373018 | 12/2002 |
| JP | 2003-131719 | 5/2003 |
| TW | 507133 | 10/2002 |

OTHER PUBLICATIONS

Averill M. Law, W. David Kelton "Simulation Modeling & Analysis", 2nd Edition, McGraw-Hill, Inc., ISBN 0-07-100803-9, 1991, Chapters 1 & 2.

Japanese Office Action dated Jul. 13, 2010 issued in corresponding Japanese Application No. 2005-516528 [English Translation—Summary of Office Action].

* cited by examiner

FIG. 13
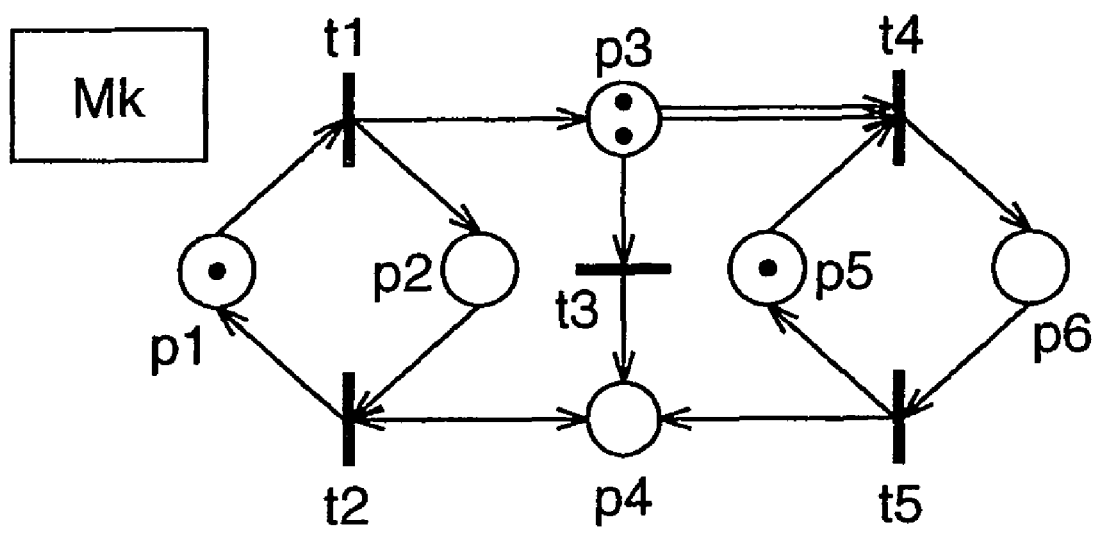
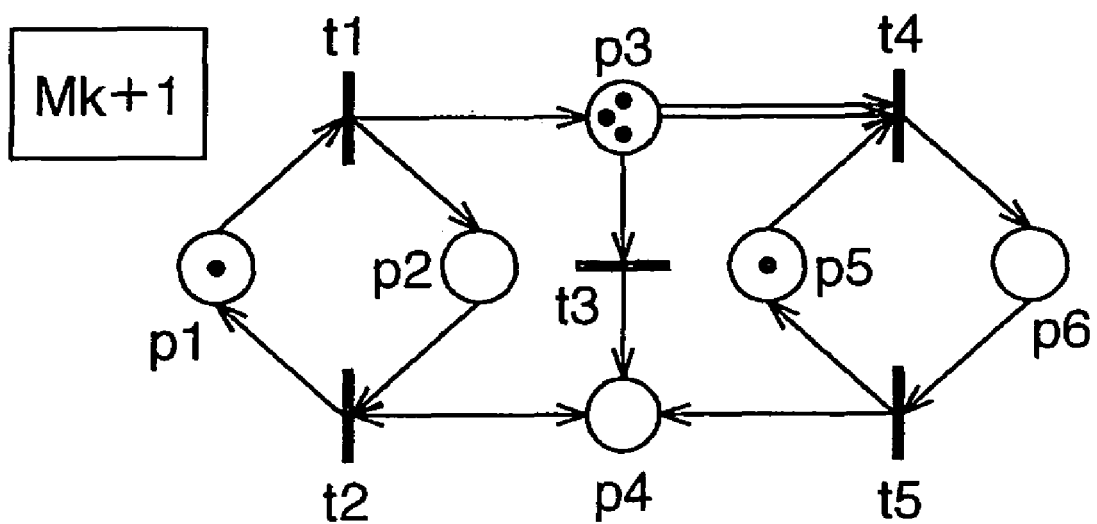

PRODUCTION SCHEDULE CREATION DEVICE AND METHOD, PRODUCTION PROCESS CONTROL DEVICE AND METHOD, COMPUTER PROGRAM, AND COMPUTER-READABLE RECORDING MEDIUM

RELATED/PRIORITY APPLICATION INFORMATION

This application claims the benefit and priority of and is a division application of U.S. patent application Ser. No. 10/584,423 filed Jun. 22, 2006 now U.S. Pat. No. 7,676,293 which is a 35 U.S.C. §371 of PCT/JP04/19405 filed Dec. 24, 2004, which claims foreign priority benefits under 35 U.S.C. §119 of Japanese Patent Application No. 2004-114637, filed Apr. 8, 2004; Japanese Patent Appln. No. 2004-106121, filed Mar. 31, 2004; and Japanese Patent Appln. No. 2003-427914, filed Dec. 24, 2003, all of which are incorporated herein by reference.

TECHNICAL FIELD

The present invention relates to a production schedule creation device and method, a production process control device and method, computer programs, and computer-readable-recording media, and particularly relates to those favorable for use in the case where a schedule of a target system is accurately created without depending on the level of skill of an operator.

BACKGROUND ART

Conventionally, in the form of production by order without performing speculative production, ordered items are divided into manufacturing order, and from the viewpoints of on-time delivery performance, the equipment operation rate, the intermediate inventory volume, cost and the like, the production schedule is created. As the methods for creating the above described production schedule, two methods are used, when these methods are broadly divided technically.

Namely, as disclosed in, for example, "Method and system for evaluating production scheduling" of Patent Document 1, the first method is the method in which in a simulation imitating the plant, built on a computer, operation of real devices is predicted by using the information acquired from the same interface as the real devices, and based on the operation prediction, virtual production is performed at a higher speed than the real devices, and by presenting highly accurate indexes by using the process and result of the virtual production, evaluation and selection of production schedule are made possible.

As disclosed in "Products distribution scheduling device" of Patent Document 2, the second method is the method in which a schedule is created based on the methods which ensure optimality, such as linear programming, and mathematical programming.

As disclosed in "Method and system for evaluating production scheduling" disclosed in Patent Document 1, the method for creating a production schedule by using a simulator (1) needs to perform simulation by variously changing the conditions and repeat the evaluation of the results many times, until the satisfactory result is obtained. Therefore, it (2) has the problem of requiring much time for creating the production schedule in a large-scale plant. Further, it (3) has the problem that the simulation rule has to be set in detail to obtain a highly accurate production schedule.

As disclosed in "Product distribution scheduling device" of Patent Document 2, the method for creating a schedule based on the methods ensuring optimality, such as linear programming and mathematical programming has (1) the problem that as the scale on which the production schedule is created becomes large, it is difficult to obtain solution within a practical time period. Further, an error is caused by the constraint and condition which cannot be expressed in mathematical expression, and therefore, it is not certain whether the obtained production schedule is executable or not.

In view of the above described problems, it is an object of the present invention to make it possible to create a production schedule assured to be actually usable in a target production process for schedule creation by making it possible to obtain an optimum production simulation result without repeatedly performing simulation.

Patent Document 1: Japanese Patent Application Laid-open No. 2002-366219

Patent Document 2: Japanese Patent Application Laid-open No. 2000-172745

SUMMARY OF THE INVENTION

A production schedule creation device according to the present invention is characterized by having a production simulator that simulates a production process expressing a production state and a production constraint of the production process, a mathematical expression model holding device that holds a mathematical expression model which is created by acquiring information relating to creation of a production schedule to which attention is paid, and is a mathematical expression model expressing the production state and the production constraint of the above described production process in a mathematical expression, and an optimization calculation device that performs optimization calculation processing by using a predetermined evaluation function for the above described mathematical expression model, and calculates a production instruction for the above described production simulator, and characterized in that the production instruction obtained by the above described optimization calculation device is supplied to the above described production simulator to cause it to execute simulation, an instruction to perform optimization calculation is output to the above described optimization calculation device from the above described production simulator whenever a new event occurs, and thereby the above described production simulator and the above described optimization calculation device are linked to each other to create the production schedule in the above described production process.

Another production schedule creation device according to the present invention is characterized by having a production simulator that simulates a production process expressing a production state and a production constraint of the production process, a mathematical expression model holding device that holds a mathematical expression model which uses a state equation created by acquiring information relating to creation of a production schedule to which attention is paid, and is a mathematical expression model expressing the production state and the production constraint of the above described production process in a mathematical expression, and an optimization calculation device that performs optimization calculation processing by using a predetermined evaluation function for the above described mathematical expression model to calculate a production instruction for the above described production simulator, and characterized in that the production schedule in the above described production process is created from a simulation result obtained by repeating processing of calculating a feedback gain by the above described optimization calculation processing, calculating the production instruction by using the feedback gain and the production state to supply the production instruction to the above described production simulator to proceed with simulation, obtaining a new production state, and calculating a new production instruction based on the new production state.

Another production schedule creation device according to the present invention is characterized by having a production simulator that simulates a production process expressing a production state and a production constraint of the production process, a mathematical expression model holding device that holds a mathematical expression model which is created by acquiring information relating to creation of a production schedule to which attention is paid, with a time period previously set from a schedule creation starting time of the above described production process (schedule creation time period) as a target, and is a mathematical expression model expressing the production state and the production constraint of the above described production process in a mathematical expression, and an optimization calculation device that performs optimization calculation processing by using a predetermined evaluation function for the above described mathematical expression model, and calculates a production instruction for the above described production simulator, and characterized in that the production schedule in the above described production process is created from a simulation result obtained by repeating processing of calculating the production instruction for a time period previously set from present time by the above described optimization calculation processing (instruction calculation time period) to supply the production instruction to the above described production simulator, executing simulation for only the previously set time period (simulation time period) to determine a production schedule for a previously set time period (schedule determination time period), and setting a date and time immediately after the above described determined time period as a new schedule creation starting time and time to formulate a production schedule.

A production schedule creation method according to the present invention is a method for creating a production schedule by a production schedule creation device having a production simulator that simulates a production process expressing a production state and a production constraint of the production process, a mathematical expression model holding device that holds a mathematical expression model which is created by acquiring information relating to creation of a production schedule to which attention is paid, and is a mathematical expression model expressing the production state and the production constraint of the above described production process in a mathematical expression, and an optimization calculation device that performs optimization calculation processing by using a predetermined evaluation function for the above described mathematical expression model, and calculates a production instruction for the above described production simulator, and characterized in that the production instruction obtained by the optimization calculation device is supplied to the above described production simulator to cause it to execute simulation, an instruction to perform optimization calculation is output to the above described optimization calculation device from the above described production simulator whenever a new event occurs, and thereby the above described production simulator and the above described optimization calculation device are linked to each other to create the production schedule in the above described production process.

Another production schedule creation method according to the present invention is a method for creating a production schedule by a production schedule creation device having a production simulator that simulates a production process expressing a production state and a production constraint of the production process, a mathematical expression model holding device that holds a mathematical expression model which uses a state equation created by acquiring information relating to creation of a production schedule to which attention is paid, and is a mathematical expression model expressing the production state and the production constraint of the above described production process in a mathematical expression, and an optimization calculation device that performs optimization calculation processing by using a predetermined evaluation function for the above described mathematical expression model to calculate a production instruction for the above described production simulator, and characterized in that the production schedule in the above described production process is created from a simulation result obtained by repeating processing of calculating a feedback gain by the above described optimization calculation processing, calculating the production instruction by using the feedback gain and the production state to supply the production instruction to the above described production simulator to proceed with simulation, obtaining a new production state, and calculating a new production instruction based on the new production state.

Another production schedule creation method according to the present invention is a method for creating a production schedule by a production schedule creation device having a production simulator that simulates a production process expressing a production state and a production constraint of the production process, a mathematical expression model holding device that holds a mathematical expression model which is created by acquiring information relating to creation of a production schedule to which attention is paid, with a time period previously set from a schedule creation starting time of the above described production process (schedule creation time period) as a target, and is a mathematical expression model expressing the production state and the production constraint of the above described production process in a mathematical expression, and an optimization calculation device that performs optimization calculation processing by using a predetermined evaluation function for the above described mathematical expression model, and calculates a production instruction-for the above described production simulator, and characterized in that the production schedule in the above described production process is created from a simulation result obtained by repeating processing of calculating the production instruction for a time period previously set from present time by the above described optimization calculation processing (instruction calculation time period) to supply the production instruction to the above described production simulator, executing simulation for only a previously set time period (simulation time period) to determine a production schedule for a previously set time period (schedule determination time period), and setting a date and time immediately after the above described determined time period as a new schedule creation starting time and time to formulate a production schedule.

A computer program of the present invention is characterized by causing a computer to realize functions as a production simulator that simulates a production process expressing a production state and a production constraint of the production process, a mathematical expression model holding device that holds a mathematical expression model which is created by acquiring information relating to creation of a production schedule to which attention is paid, and is a mathematical expression model expressing the production state and the production constraint of the above described production process in a mathematical expression, and an optimization calculation device that performs optimization calculation processing by using a predetermined evaluation function for the above described mathematical expression model, and calculates a production instruction for the above described production simulator, and characterized in that the production instruction obtained by the above described optimization calculation device is supplied to the above described production simulator to cause it to execute simulation, an instruction to perform optimization calculation is output to the above described optimization calculation device from the above described production simulator whenever a new event occurs, and thereby the above described production simulator and the above described optimization calculation device are linked to each other to create the production schedule in the above described production process.

Another computer program according to the present invention is characterized by causing a computer to realize functions as a production simulator that simulates a production process expressing a production state and a production constraint of the production process, a mathematical expression model holding device that holds a mathematical expression model which uses a state equation created by acquiring information relating to creation of a production schedule to which attention is paid, and is a mathematical expression model expressing the production state and the production constraint of the above described production process in a mathematical expression, and an optimization calculation device that performs optimization calculation processing by using a predetermined evaluation function for the above described mathematical expression model to calculate a production instruction for the above described production simulator, and characterized in that the production schedule in the above described production process is created from a simulation result obtained by repeating processing of calculating a feedback gain by the above described optimization calculation processing, calculating the production instruction by using the feedback gain and the production state to supply the production instruction to the above described production simulator to proceed with simulation, obtaining a new production state, and calculating a new production instruction based on the new production state.

Another computer program according to the present invention is characterized by causing a computer to realize functions as a production simulator that simulates a production process expressing a production state and a production constraint of the production process, a mathematical expression model holding device that holds a mathematical expression model which is created by acquiring information relating to creation of a production schedule to which attention is paid, with a time period previously set from a schedule creation starting time of the above described production process (schedule creation time period) as a target, and is a mathematical expression model expressing the production state and the production constraint of the above described production process in a mathematical expression, and an optimization calculation device that performs optimization calculation processing by using a predetermined evaluation function for the above described mathematical expression model, and calculates a production instruction for the above described production simulator, and characterized in that the production schedule in the above described production process is created from a simulation result obtained by repeating processing of calculating the production instruction for a time period previously set from present time by the above described optimization calculation processing (instruction calculation time period) to supply the production instruction to the above described production simulator, executing simulation for only a previously set time period (simulation time period) to determine a production schedule for a previously set time period (schedule determination time period), and setting a date and time immediately after the above described determined time period as a new schedule creation starting time and time to formulate a production schedule.

A production process control device according to the present invention is characterized by having a production simulator that simulates a production process expressing a production state and a production constraint of the production process, a mathematical expression model holding device that holds a mathematical expression model which uses a state equation created by acquiring information relating to creation of a production schedule to which attention is paid, and is a mathematical expression model expressing the production state and the production constraint of the above described production process in a mathematical expression, and an optimization calculation device that performs optimization calculation processing by using a predetermined evaluation function for the above described mathematical expression model to calculate a production instruction for the above described production simulator, and in that control of the production process is performed based on a simulation result obtained by repeating processing of calculating a feedback gain by the above described optimization calculation processing, calculating the production instruction by using the feedback gain and the production state to supply the production instruction to the above described production simulator to proceed with simulation, obtaining a new production state, and calculating a new production instruction based on the new production state.

Another production process control device according to the present invention is characterized by having a production simulator that simulates a production process expressing a production state and a production constraint of the production process, mathematical expression model holding device that holds a mathematical expression model which is created by acquiring information relating to creation of a production schedule to which attention is paid, with a time period previously set from a schedule creation starting time of the above described production process (schedule creation time period) as a target, and is a mathematical expression model expressing the production state and the production constraint of the above described production process in a mathematical expression, and an optimization calculation device that performs optimization calculation processing by using a predetermined evaluation function for the above described mathematical expression model, and calculates a production instruction for the above described production simulator, and in that production control of the production process is performed based on a simulation result obtained by repeating processing of calculating the production instruction for a time period previously set from present time by the above described optimization calculation processing (instruction calculation time period) to supply the production instruction to the above described production simulator, executing simulation for only the previously set time period (simulation time period) to determine a production schedule for a previously set time period (schedule determination time period), and setting a date and time immediately after the above described determined time period as a new schedule creation starting time and time to formulate a production schedule.

A production process control method according to the present invention is a method for controlling a production process by a production process control device having a production simulator that simulates a production process expressing a production state and a production constraint of the production process, a mathematical expression model holding device that holds a mathematical expression model which uses a state equation created by acquiring information relating to creation of a production schedule to which attention is paid, and is a mathematical expression model expressing the production state and the production constraint of the above described production process in a mathematical expression, and an optimization calculation device that performs optimization calculation processing by using a predetermined evaluation function for the above described mathematical expression model to calculate a production instruction for the above described production simulator, and characterized in that control of the production process is performed based on a simulation result obtained by repeating processing of calculating a feedback gain by the above described optimization calculation processing, calculating the production instruction by using the feedback gain and the production state to supply the production instruction to the above described production simulator to proceed with simulation, obtaining a new production state, and calculating a new production instruction based on the new production state.

Another production process control method according to the present invention is a method for controlling a production process using a production process control device having a production schedule creation device having a production simulator that simulates a production process expressing a production state and a production constraint of the production process, a mathematical expression model holding device that holds a mathematical expression model which is created by acquiring information relating to creation of a production schedule to which attention is paid, with a time period previously set from a schedule creation starting time of the above described production process (schedule creation time period) as a target, and is a mathematical expression model expressing the production state and the production constraint of the above described production process in a mathematical expression, and an optimization calculation device that performs optimization calculation processing by using a predetermined evaluation function for the above described mathematical expression model, and calculates a production instruction for the above described production simulator, and is characterized in that production control of the production process is performed based on a simulation result obtained by repeating processing of calculating the production instruction for a time period previously set from present time by the above described optimization calculation processing (instruction calculation time period) to supply the production instruction to the above described production simulator, executing simulation for only a previously set time period (simulation time period) to determine a production schedule for a previously set time period (schedule determination time period), and setting a date and time immediately after the above described determined time period as a new schedule creation starting time and time to formulate a production schedule.

A computer program according to the present invention is characterized by causing a computer to realize functions as a production simulator that simulates a production process expressing a production state and a production constraint of the production process, a mathematical expression model holding device that holds a mathematical expression model which uses a state equation created by acquiring information relating to creation of a production schedule to which attention is paid, and is a mathematical expression model expressing the production state and the production constraint of the above described production process in a mathematical expression, and an optimization calculation device that performs optimization calculation processing by using a predetermined evaluation function for the above described mathematical expression model to calculate a production instruction for the above described production simulator, and in that control of the production process is performed based on a simulation result obtained by repeating processing of calculating a feedback gain by the above described optimization calculation processing, calculating the production instruction by using the feedback gain and the production state to supply the production instruction to the above described production simulator to proceed with simulation, obtaining a new production state, and calculating a new production instruction based on the new production state.

Another computer program according to the present invention is characterized by causing a computer to realize functions as a production simulator that simulates a production process expressing a production state and a production constraint of the production process, a mathematical expression model holding device that holds a mathematical expression model which is created by acquiring information relating to creation of a production schedule to which attention is paid, with a time period previously set from a schedule creation starting time of the above described production process (schedule creation time period) as a target, and is a mathematical expression model expressing the production state and the production constraint of the above described production process in a mathematical expression, and an optimization calculation device that performs optimization calculation processing by using a predetermined evaluation function for the above described mathematical expression model, and calculates a production instruction for the above described production simulator, and in that production control of the production process is performed based on a simulation result obtained by repeating processing of calculating the production instruction for a time period previously set from present time by the above described optimization calculation processing (instruction calculation time period) to supply the production instruction to the above described production simulator, executing simulation for only a previously set time period (simulation time period) to determine a production schedule for a previously set time period (schedule determination time period), and setting a date and time immediately after the above described determined time period as a new schedule creation starting time and time to formulate a production schedule.

Computer-readable recording media according to the present invention are characterized by recording the computer programs according to the present invention.

BRIEF DESCRIPTION OF THE DRAWINGS

FIG. 13 is a diagram showing an example of a Petri net model;

DETAILED DESCRIPTION OF THE PREFERRED EMBODIMENTS

Hereinafter, embodiments of a production schedule creation device, a production schedule creation method, a computer program and a computer-readable recording medium of the present invention will be described with reference to the drawings.

First Embodiment

Figure 1:
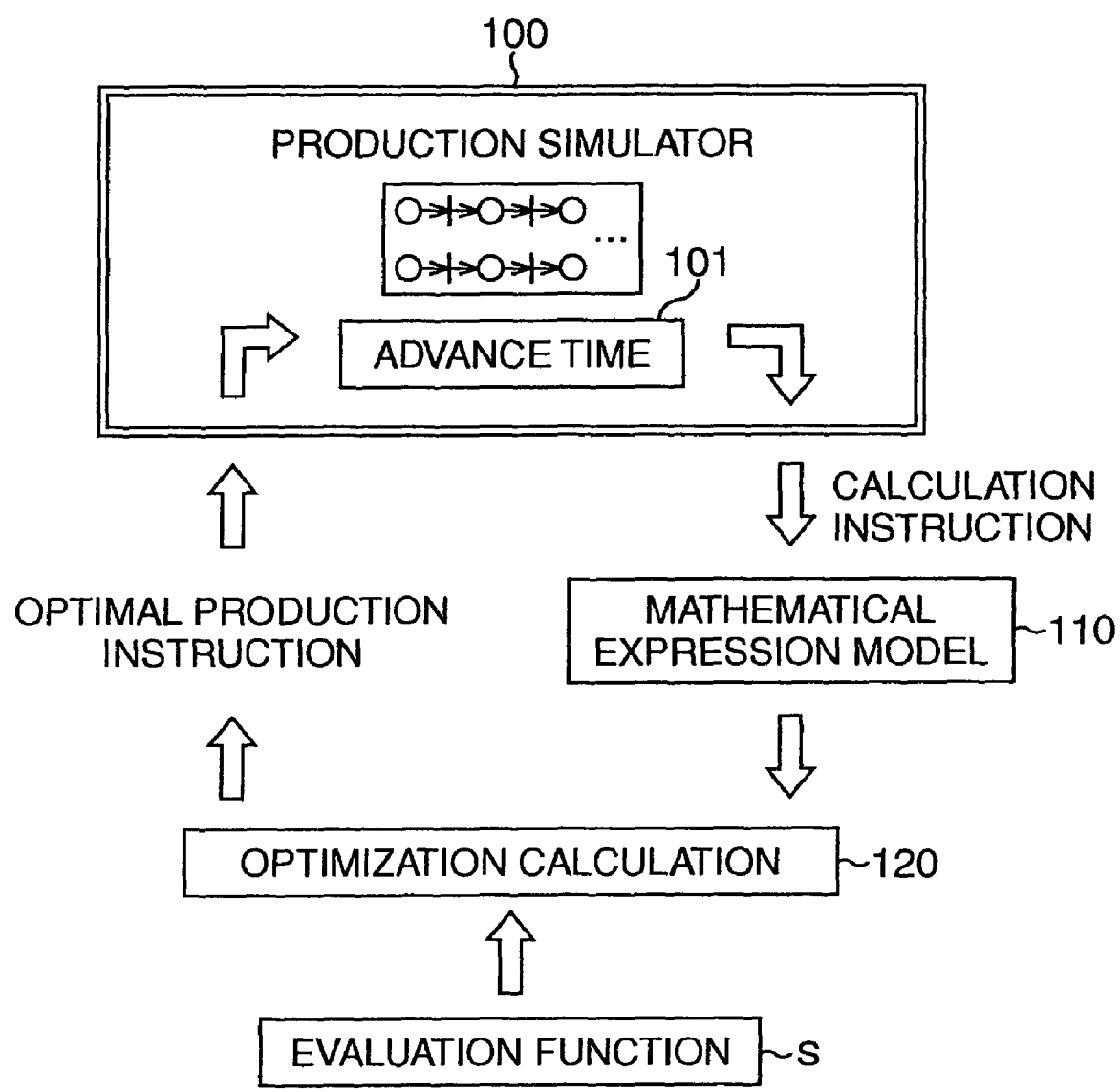
FIG. 1 shows a first embodiment of the present invention, and is a block diagram explaining a schematic configuration of a production schedule creation device.

FIG. 1 shows a first embodiment of the present invention, and is a block diagram-explaining one example of a production schedule creation device. As shown in FIG. 1, the production schedule creation device of this embodiment is configured by a production simulator 100, an optimization calculation device 120 and the like.

The above described production simulator 100 is a large-sized simulator which simulates a plant, and is configured as a discrete system that moves a thing at each event (event of the simulator). In this embodiment, the above described production simulator 100 is configured by using a Petri net, and is configured to output a mathematical expression model 110.

A production model (mathematical expression model) 110 is configured to correspond to the above described production simulator 100. In this embodiment, the above described mathematical expression model 110 is created by acquiring elements relating to the production schedule to be created from a production state and a production constraint of a production process. In the above described mathematical model 110, all the production states and production constraints written in the above described production simulator 100 may be included, or only part of them may be taken.

The above described mathematical expression model 110 is held by mathematical expression model holding device(not shown) configured by semiconductor storage device or the like. The optimization calculation is performed by the above described mathematical model 110 and the optimization calculation device 120 so as to calculate a production instruction for the above described production simulator 100. The optimization calculation performed by the above described optimization calculation device 120 is performed by using an evaluation function S.

Therefore, according to the production schedule creation device of this embodiment, production instruction is not performed based on a previously decided rule as in the prior art, but the production instruction based on the result of the optimization calculation performed by the above described optimization calculation device 120 can be output to the above described production simulator 100. Thereby, the optimum production instruction in accordance with the event at the time can be reliably performed.

Whenever a new event occurs, the event is advanced a step farther by a time management part, and the production simulator 100 gives instructions to the mathematical model 110 and the optimization calculation device 120 to calculate the optimal solution. When the above described calculation instruction is given by the above described production simulator 100, the above described optimization calculation device 120 executes optimization calculation by using the mathematical model 110 and the evaluation function S. As described above, the optimum production schedule can be created by only once executing detailed simulation in which the above described production simulator 100 and the above described optimization calculation device 120 are linked to each other for each event.

Namely, since the simulation performed in this embodiment is not the simulation based on a predetermined rule as in the prior art, but the simulation based on the result of the optimization calculation, it is possible to reliably obtain a theoretical optimum solution by performing only one simulation, and it is not necessary to repeat simulation many times by evaluating the simulation results as in the prior art, thus it can be possible to create the simulation result quickly with high accuracy. Therefore, even if the target of which schedule is created is a large-scale, it is sufficiently possible to create the schedule in a practical time period. The simulation result obtained as described above is output as the schedule.

Even when the scale of the above described production simulator 100 is very large, or the number of constraint conditions is very large and complicated, only an important part having a large influence on the schedule creation, of the production states and mathematical expressions written in the above described production simulator 100 is taken into the above described mathematical expression model 110, whereby the scale of the above described production simulator 100 is brought into a suitable range, and optimization calculation can be performed in a practical time period.

The above described production simulator 100 can express all the production states and production constraints to be considered, and therefore, the schedule created by performing one simulation is assured to be executable in reality.

As described above, in this embodiment, the production schedule is created by linking the production simulator 100, the mathematical expression model 110 and the optimization calculation device 120, and therefore, (1) the schedule can be created without repeating simulation. Further, (2) calculating time can be reduced by taking only an important part which has a large influence on schedule creation into the above described mathematical expression model 110, and (3) a large-scale problem can be solved.

Information of the production state and production constraint of the above described production simulator 100 is detected in each case of the event requiring a production instruction occurs, the optimization production instruction is calculated by the optimization method by the above described optimization calculation device 120 based on the above described detected information and the previously fixed evaluation index, and detailed simulation is performed by the above described production simulator 100 based on the above described calculation result, a schedule is created, thus, (4) making it possible to enhance schedule accuracy, and (5) making it possible to create schedule of which verification of executability is obtained.

Since the mathematical expression model 110 is introduced, even if a change occurs to an important part which has a large influence on the schedule creation, it is possible to cope with the change quickly, and the schedule creation device with high maintainability can be constructed.

Second Embodiment

Figure 2:
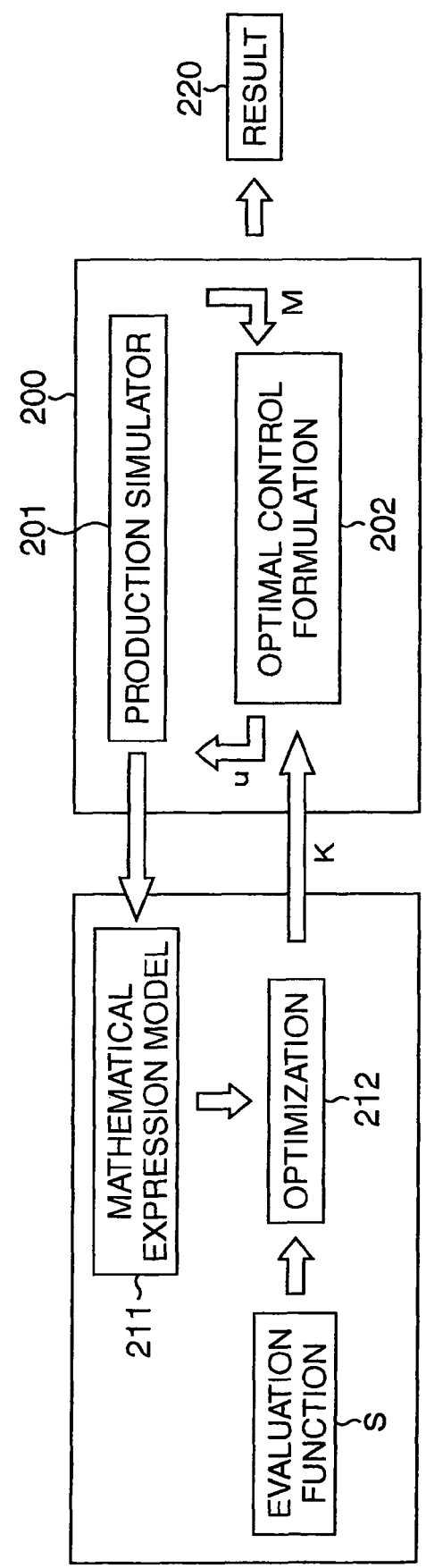
FIG. 2 shows a second embodiment of the present invention, and is a block diagram explaining a schematic configuration of a production schedule creation device.

FIG. 2 shows a second embodiment of the present invention, and is a block diagram explaining one example of a production schedule creation device. As shown in FIG. 2, the production schedule creation device of this embodiment is configured by a simulation control unit 200 including a production simulator 201, an optimization calculation device 212 and the like.

The production simulator 201 is a simulator that simulates a production process expressing the production state and the production constraint of the production process, a so-called large simulator which simulates a plant, and in this embodiment, it is configured as a discrete system which moves a thing for each event (event of the simulator) by using the Petri net.

A mathematical model (mathematical expression model) 211 is configured to correspond to the above described production simulator 201. In this embodiment, the above described mathematical expression model 211 is created by using the state equation as shown in the following expression (A) by acquiring the elements relating to the production schedule to be created from the production state and the production constraint of the production process. The above described mathematical expression model 211 is held by mathematical expression model holding device (not shown) composed of semiconductor storage device or the like.

$$M(k+1)=a \cdot M(k)+b \cdot u(k) \tag{A}$$

Namely, when the state vector indicating the number of tokens present in each place in a certain discrete time k, namely, the state variable is expressed by $M(k)$, and presence and absence of each transition firing is expressed by an operation vector $u(k)$ expressed by "1" and "0", the state vector $M(k+1)$ in the next time $k+1$ can be expressed by the above expression (A) by using a transition matrix a, and an incidence matrix b.

The optimization calculation device 212 performs the optimization calculation processing for the above described mathematical expression model 211, and calculates a feedback gain K. The optimization calculation performed by the above described optimization calculation device 212 is performed by using the evaluation function S as shown by the following expression (B).

$$S=\Sigma\{M'QM+u'Ru\} \tag{B}$$

In the evaluation function S, Q and R are proper matrixes which are set in accordance with the control purpose, and M' and u' are transposed vectors of the state vector M and operation vector u, respectively. Considering the control to minimize the evaluation function S, the feedback gain K for performing the state feedback control with $$u(k)=-K \cdot M(k) \tag{c}$$

can be obtained from the optimal control theory.

An optimal controller 202 of the simulation control unit 200 repeats processing of calculating a production instruction (operation vector u) by using the feedback gain K and the production state (state vector M) that are calculated by the optimization calculation device 212 and supplying it to the production simulator 201 to proceed with the simulation, then obtaining a new production state and calculating a new production instruction based on the new production state. Then, it creates the production schedule in the production process from the simulation result 220 obtained by this.

A concrete example of the second embodiment will be described with reference to FIGS. 3 to 6.

Figure 3:
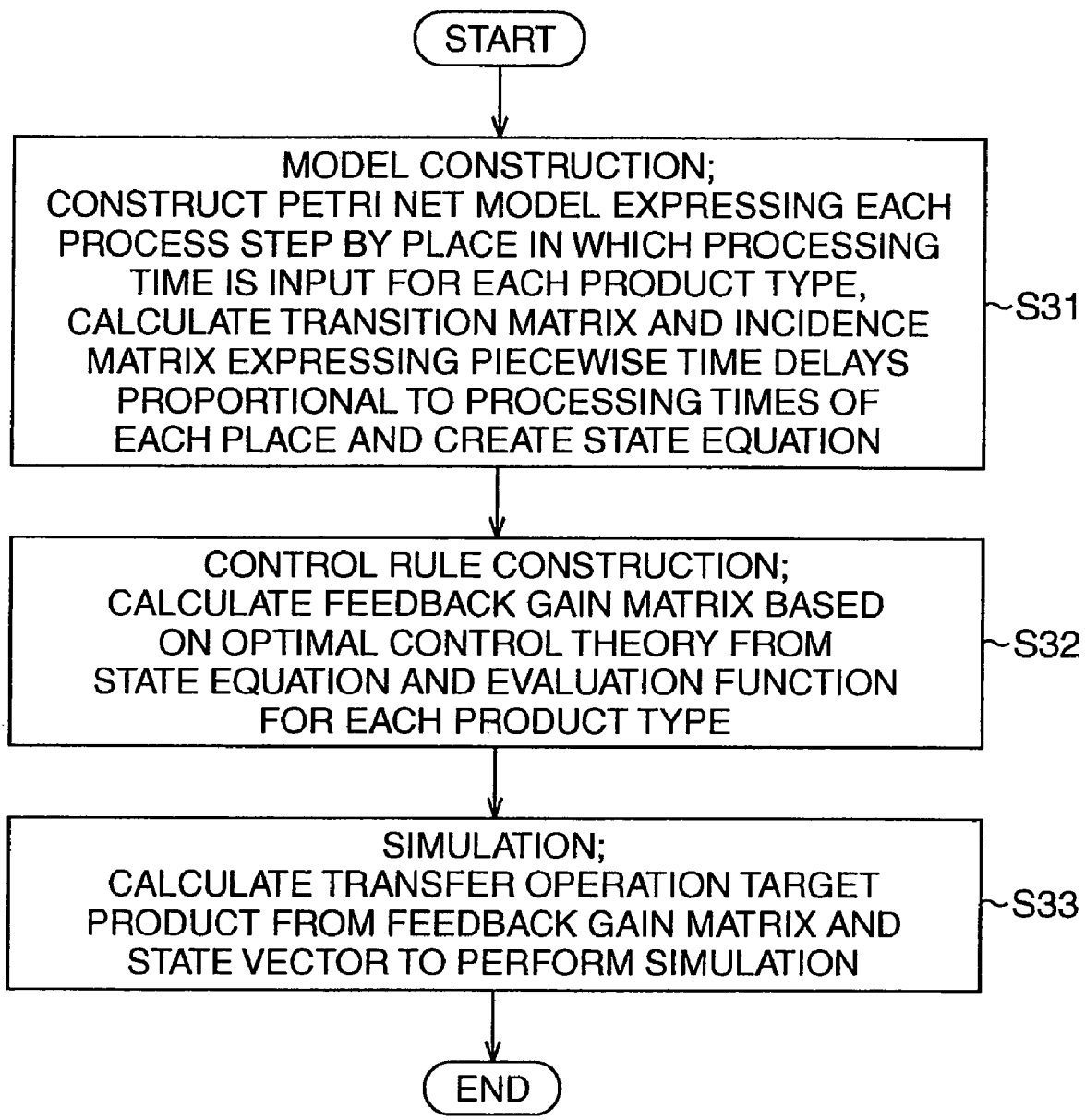
FIG. 3 is a flowchart showing a processing procedure of production schedule creation in the second embodiment.

As shown in FIG. 3, firstly, as a Petri net model of the production process, a Petri net model expressing each process step in a place in which processing time is input is constructed for each product type. Then, the transition matrix a and the incidence matrix b which are expressed in accordance with a piecewise time delay np proportional to processing time Tp of each place of the constructed Petri net model are calculated, and the state equation is created by using these two matrixes a and b (step S31).

Secondly, the feedback gain matrix K is obtained for each product type from the state equation created in the above described step S31 and the evaluation function Q and R that is set (step S32).

Thirdly, from the obtained feedback gain matrix K and the state vector $M(k)$ expressing an in-process product progress state, the operation vector $u(k)$ for a transfer operation node of the product is obtained for each product type, and thereafter, simulation of the production process for a predetermined time period is executed by using a method for sequentially performing a transfer operation of each of products by the transferable number in accordance with the sequence of the products obtaining larger manipulative variables in the positive value, for each of the transfer operation node in the virtual production process (step S33).

Figure 4:
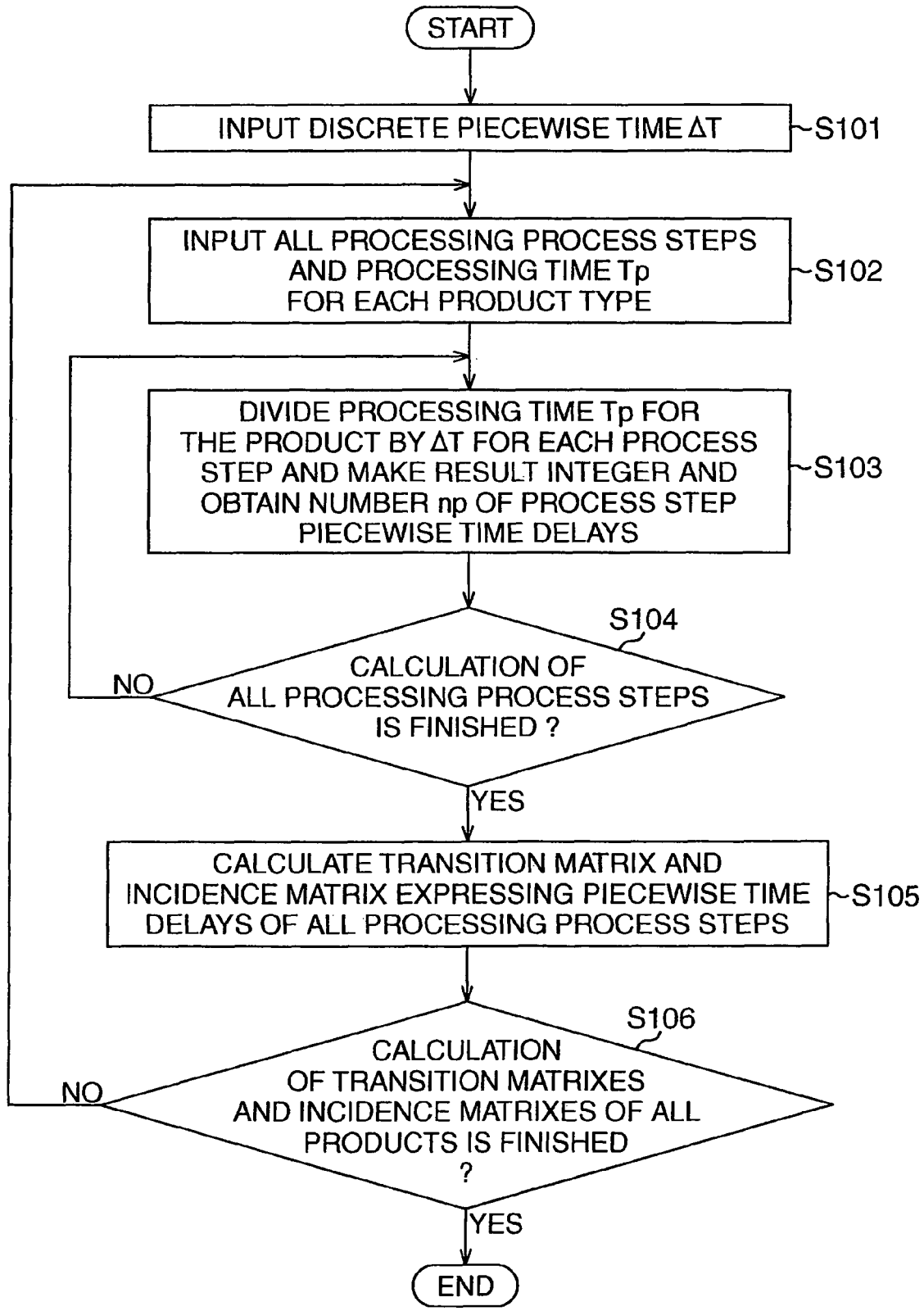
FIG. 4 is a flowchart showing a processing procedure of model construction.

FIG. 4 is a flowchart showing an example of the processing in step S31 shown in FIG. 3, namely, the processing procedure for constructing the Petri net model which expresses each process step in the place in which the processing time is input, for each product type, as the Petri net model of the production process, and calculating the transition matrix a and the incidence matrix b which express the piecewise time delay in each process step for each product type.

Namely, first of all, a discrete piecewise time $\Delta T$ is input (step S101), and next, all the processing process steps and processing time Tp are input for each product type (step S102). Then, the processing time Tp is divided by the piecewise time $\Delta T$ and is made an integer for each processing process step, thereby, obtaining the piecewise time delay np of the above described each processing process step (steps S103 and S104), and in accordance with the piecewise time delay np, the transition matrixes a and the incidence matrixes b for each product type of all the processing process steps are calculated (step S105).

Then, until the transition matrixes a and the incidence matrixes b are calculated for all the products, the flow returns to the processing of step S102 from step 5106, and the above processing is repeatedly performed. It is the most efficient to define the discrete piecewise time $\Delta T$ with the greatest common divisor of each process step processing time of each product type, but may be properly set in consideration of intended control accuracy.

Figure 5:
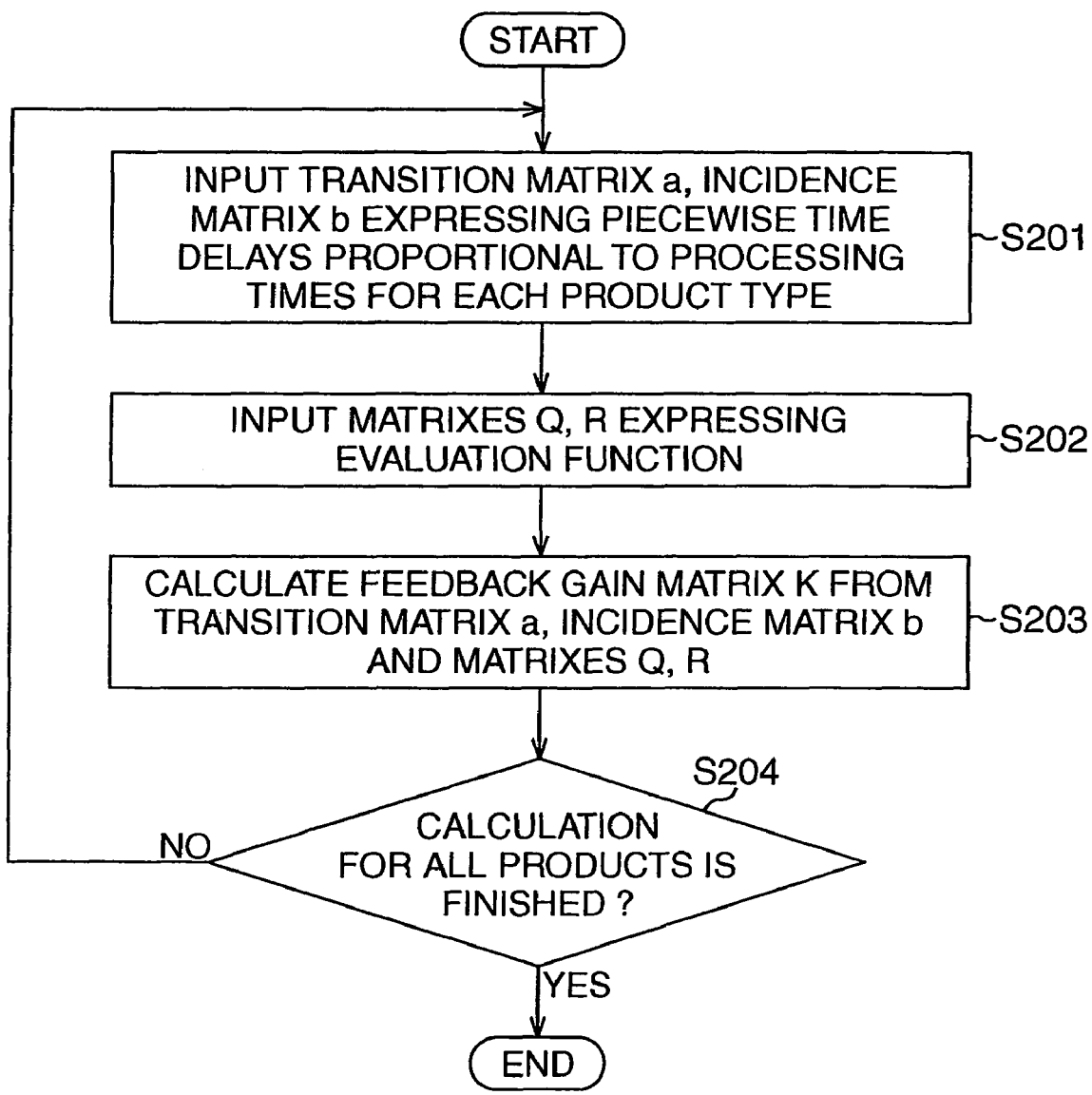
FIG. 5 is a flowchart showing a processing procedure of control rule construction.

FIG. 5 is a flowchart showing an example of the processing in step S32 shown in FIG. 3, namely, the processing procedure for obtaining the feedback gain matrix K for each product type from the state equation composed of the transition matrix a and the incidence matrix b which are obtained as described above, and the evaluation function Q and R that is set.

Namely, first of all, the transition matrix a and the incidence matrix b which express the piecewise time delay np proportional to the processing time Tp of each place of the Petri net model into the optimization calculation device 212 for each product type (step S201), the matrixes Q and R expressing the evaluation function are input (step 5202). Then, the feedback gain matrix K is calculated from the above described inputted transition matrix a, the incidence matrix b and the evaluation matrixes Q and R (step S203). The flow returns to the processing of step S201 from step S204, and the above processing is repeatedly performed until the calculation is completed for all the products. The transition matrix a and the incidence matrix b which express the piecewise time delay np proportional to the processing time Tp of each place of the Petri net model may be input in the gain matrix calculation means 34, for all the products, and all the products may be calculated by one operation.

Figure 6:
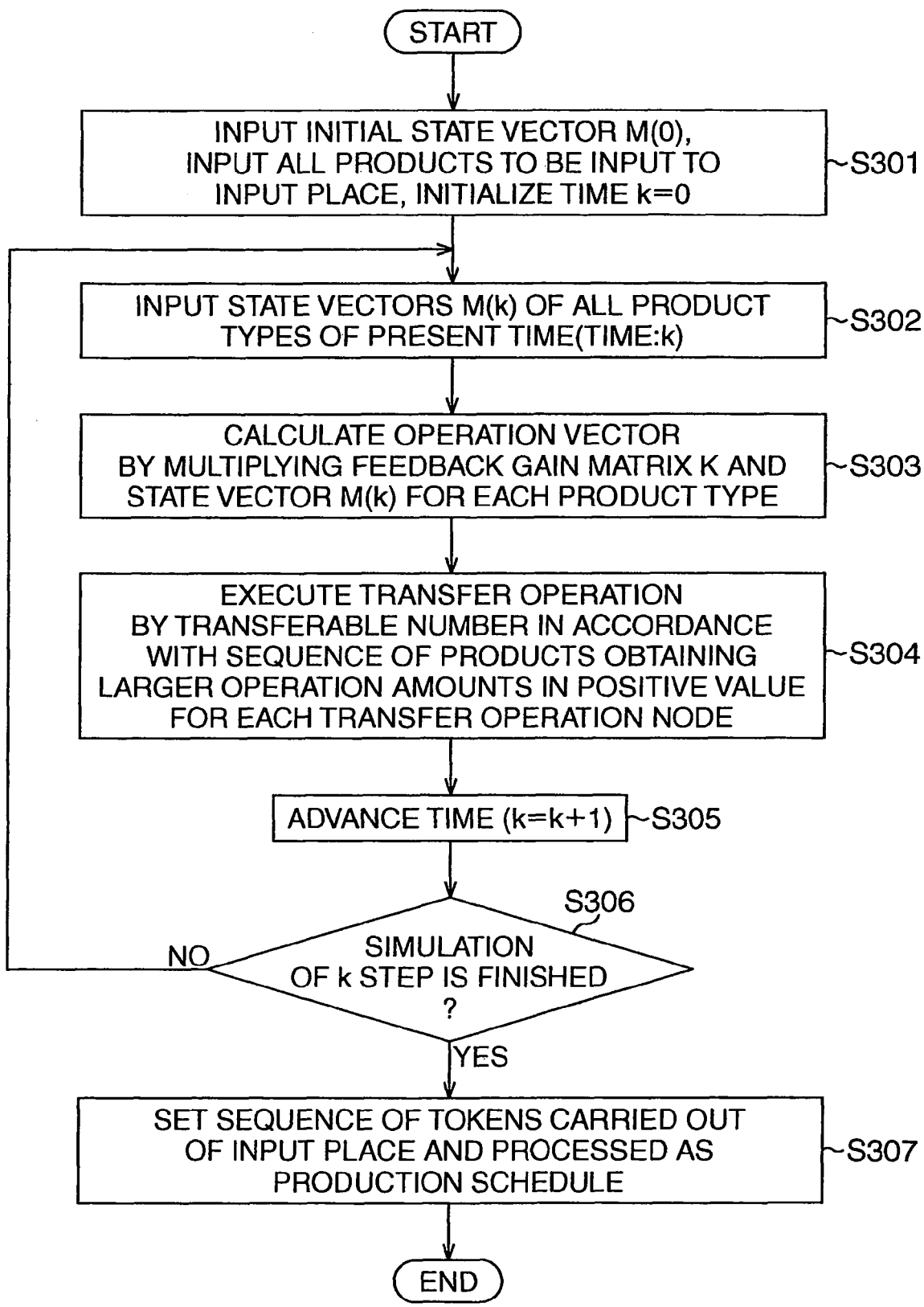
FIG. 6 is a flowchart showing a processing procedure of simulation.

FIG. 6 is a flowchart showing an example of the processing of step S33 shown in FIG. 3, namely, the processing procedure for executing the simulation of the production process for a predetermined time period by using a method for sequentially performing the transfer operation of each of the products by the transferable number in sequence of the products obtaining larger manipulative variables in the positive value for each transfer operation node in the virtual production process, after obtaining the operation vector u(K) for the transfer operation node of the product for each product type from the feedback gain matrix K calculated as described above and the state vector M(K) expressing the in-process product progress state.

Namely, after the state vector M(0) in the initial state of the Petri net model is input, all the products to be input is input into the input place, and the value of time k is initialized to be zero (step S301), the state vectors M(k) of all product types at the present time (time: k) are input (step S302).

Then, the operation vector u(k) is calculated for each product type by multiplying the feedback gain matrix K calculated by using the above described method by the above described input state vector M(k) (step S303), and then, the transfer operation of each product is executed by the transferable number in sequence of the products obtaining larger manipulative variables in the positive value for each transfer operation node (step S304).

Next, after time is advanced (step S305), it is determined whether the simulation of each step is finished or not (step 5306), and when it is not finished, the flow returns to the processing of step S302. When it is finished, the production schedule is set with the sequence of the tokens carried out of the input place as a result (step S307).

Since as described above, in the second embodiment, the optimal control based on the instruction which is obtained as a result of performing the optimization calculation, and the state in the event, is performed, the schedule can be created based on the simulation result in which the optimization calculation is executed for each event, the schedule is the simulation result by the simulator expressing the constraint of the production process, and therefore, it can be confirmed that the schedule is actually usable.

Thereby, when the scale of the above described production simulator 201 is very large, or when the number of constraint conditions is very large and complicated, only an important part having a large influence on the schedule creation, of the production states and the mathematical expressions written in the above described production simulator 201 is taken into the above described mathematical expression model 211, whereby the scale of the above described production simulator 201 is brought into a proper range, and the optimization calculation can be performed within a practical time.

The above described production simulator 201 can express all the production states and production constraints to be considered, and therefore, the schedule created by performing one simulation is assured to be executable in reality.

As described above, in this embodiment, the production simulator 201, the mathematical expression model 211 and the optimization calculation device 212 are linked to create the production schedule, and therefore, (1) the schedule can be created without repeating calculation. Further, (2) the calculating time can be reduced by taking only an important part having a large influence on the schedule creation into the above described mathematical expression model 211, and (3) large-scale problems can be solved Each time the event requiring the production instruction occurs, the production state and the production constraint of the above described production simulator 201 is detected, then, based on the above described detected information and the evaluation index previously set, the optimum production instruction is calculated for the optimization method by the above described optimization calculation device 212, and the detailed simulation is performed with the above described production simulator 201 based on the above described calculation result to create the schedule. Therefore, (4) the schedule accuracy can be enhanced, and (5) the schedule with verification of executabitliy obtained can be created.

As the mathematical expression model 211 is introduced, even if a change occurs to the important part having a large influence on the schedule creation, it is possible to cope with the change quickly, and the schedule creation device with high maintainability can be constructed.

Further, it is possible to separate the processing so that the processing in the simulation control unit 200 is performed online, and construction of the mathematical model (mathematical expression model) 211 and the optimization calculation processing for the above described mathematical expression model 211 in the optimization calculation device 212 is performed offline corresponding to the production simulator 201, and the processing capacity can be enhanced by reducing the processing load in the simulation control unit 200.

Third Embodiment

Figure 7:
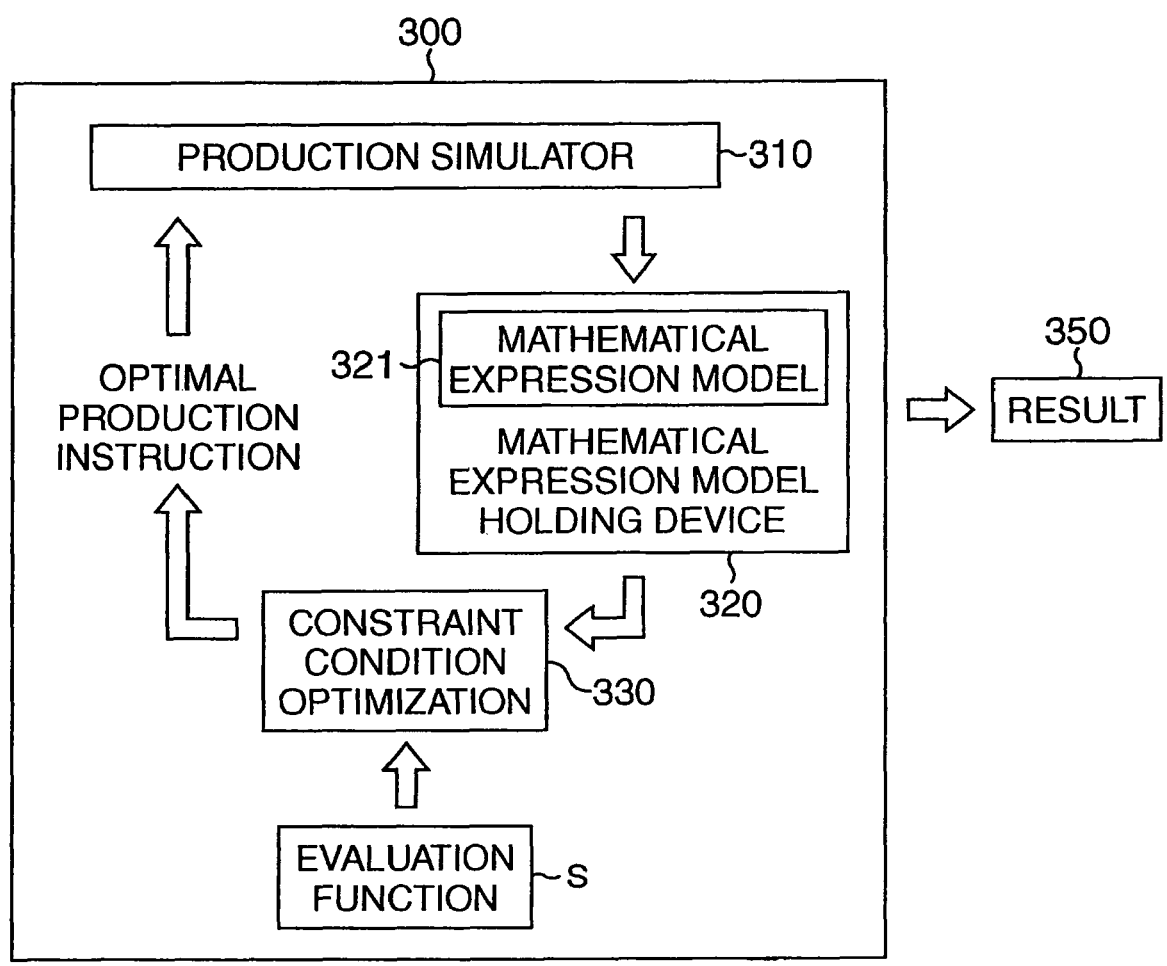
FIG. 7 shows a third embodiment of the present invention, and is a block diagram explaining a schematic configuration of a production schedule creation device.

FIG. 7 is a block diagram explaining a third embodiment of the production schedule creation device of the present invention. As shown in FIG. 7, a production schedule creation device 300 of this embodiment is configured by a production simulator 310, a mathematical expression model holding device 320, an optimization calculation device 330 and the like.

The above described production simulator 310 is a large simulator which simulates a plant, and is composed as a discrete system which moves a thing for each event (event of the simulator). In this embodiment, the above described production simulator 310 is composed by using the Petri net.

A production model (mathematical expression model) 321 is configured to correspond to the above described production simulator 310 and is held by the mathematical expression model holding device 320. In this embodiment, the above described mathematical expression model 321 is created by acquiring the elements relating to the production schedule to be created from the production state and the production constraint of the production process.

In this embodiment, based on the input data expressing all or a part of the product acceptance schedule, the product shipment schedule, inventory schedule, equipment utilizing schedule, equipment repair schedule, equipment capacity, present state of equipment, present state of process, present state of inventory, equipment operation/present state of trouble, and operation perquisites from operators, the mathematical expression model 321 is constructed for the relationship and constraint of work groups accompanying the processing of products, movable bodies and equipment, based on accuracy that is previously set, with the target time period which is previously set from the date and time of start of formulation of the above described production schedule set as the target. The mathematical expression model 321 as constructed as described above is held by the mathematical expression model holding device 320 configured by the semiconductor storage device or the like.

The optimization calculation is performed by the above described mathematical expression model 321 and the optimization calculation device 330, and in this embodiment, optimization calculation processing is performed by using the estimation function S for the above described mathematical expression model 321, and the production instruction for the above described production simulator 310 is calculated.

Then, the above described mathematical expression model 321 is created by acquiring information relating to creation of the production schedule to which attention is paid, with the time period (schedule creation time period) which is previously set from the starting time of the formulation of the above described production process as the target, then, the above described created mathematical expression model 321 is supplied to the above described optimization calculation device 330, the production instruction is calculated with respect to the time period (instruction calculation time period) previously set from the present time by the above described optimization calculation processing and supplied to the above described production simulator, and the simulation is executed for the time period (simulation time period) previously set and the production schedule is determined for the time period (schedule determination time period) previously set.

From the simulation result obtained by repeating the processing of subsequently setting the date and time immediately after the above described determined time period is set as a new schedule creation starting time and time and formulating the production schedule, the production schedule in the production process is created.

Hereinafter, concrete example of the third embodiment will be described with reference to FIG. 8. This example is an example in which the simulation time period and the determination time period are set as the same time period.

Figure 8:
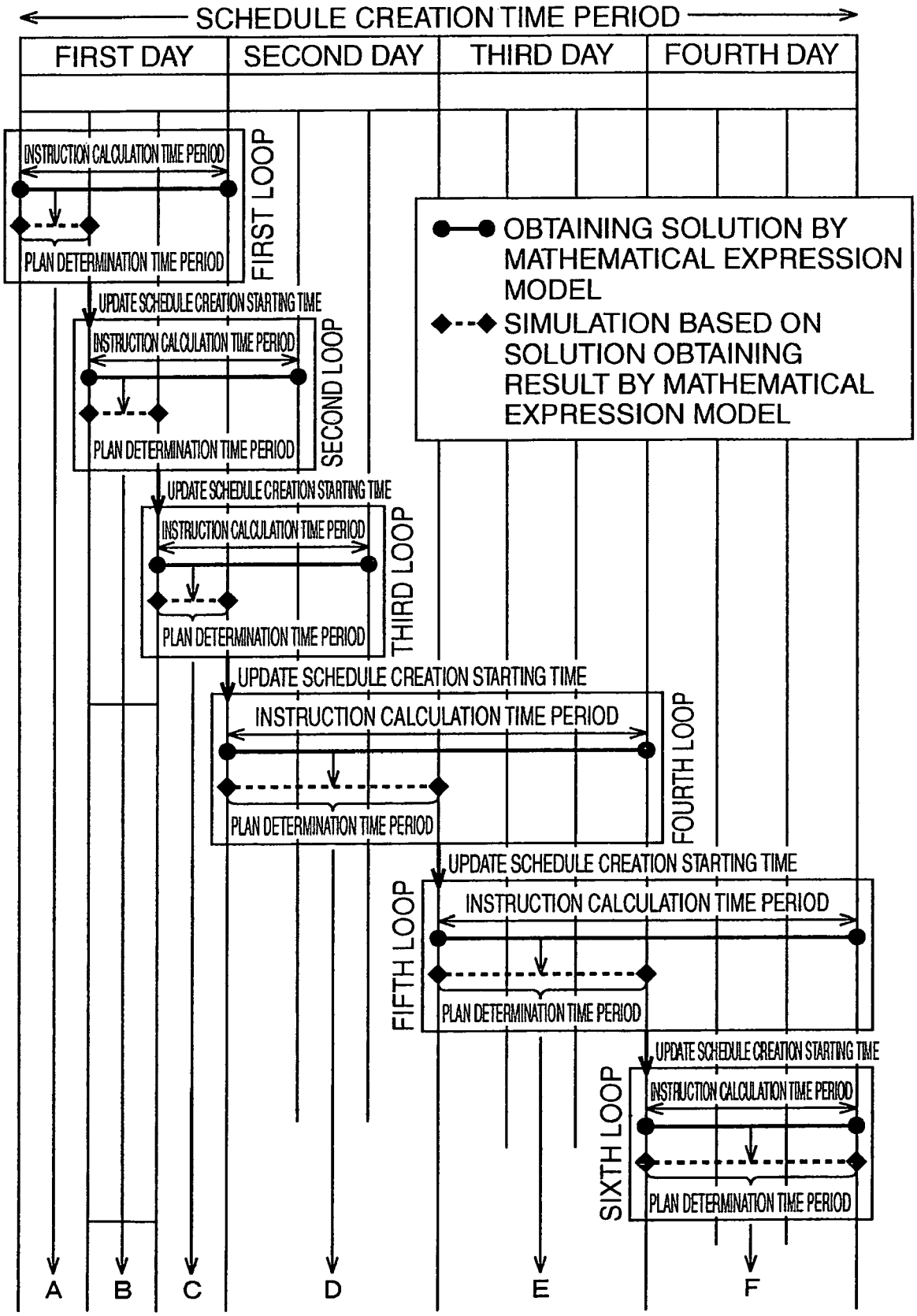
FIG. 8 shows a concrete example to which the present invention is applied, and is a diagram showing a production schedule creation procedure.

As shown in FIG. 8, the first day of the schedule creation period determines the first eight hours of the created production schedule, and the second day and thereafter determines the first day of the production schedule. Part of the created production schedule, which is not included in the above described determining time period, the schedule thereof is not determined, but discarded.

Namely, in a first loop, a solution is found with the above described optimization calculation device 330 based on the mathematical expression model 321 for the target time period of 0'oclock to 24'oclock of the first day. Then, simulation by the production simulator 310 is performed based on the solution finding result obtained by the optimization calculation processing, and a time period A of the first production schedule is determined for the first eight hours.

Next, in a second loop, the date and time immediately after the above described determined time period is set as new schedule creation starting time and time, and the production schedule is formulated. In the case of this example, the time period until 8'oclock of the first day is determined as the time period A of the first production schedule, and therefore, the schedule creation starting time, which is initially 0'oclock of the first day, is updated to 8'oclock of the first day in the second loop.

In the second loop, a solution is also found with the above described optimization calculation device 330 based on the mathematical expression model 321 with 24 hours from 8'oclock of the first day to 8'oclock of the second day as the target time period, as in the first loop. Then, simulation by the production simulator 310 is performed based on the solution finding result obtained by the optimization calculation processing, and a time period B of the second production schedule is determined for the first eight hours, from 8'oclock to 16'oclock of the first day in this case.

Next, in a third loop, the date and time immediately after the above described determined period B of the second production schedule are set as a new schedule creation starting time and time, and the production schedule is also formulated. Since in this case, the time period until 16'oclock of the first day is determined, the schedule creation starting time, which is 8'oclock of the first day in the second loop, is updated to 16'oclock of the first day in the third loop, and a solution is found with the above described optimization calculation device 330 based on the mathematical expression model 321 with 24 hours thereafter as the target time period.

Then, simulation by the production simulator 310 is performed based on the solution finding result obtained by the optimization calculation processing, and the production schedule is determined for the first eight hours. In this case, 16'oclock to 24'oclock of the first day is determined as a time period C of the third production schedule. As a result, in the next fourth loop, the schedule formulation date is 0'oclock of the second day.

In the fourth loop, the target time period for which a solution is found with the above described optimization calculation device 330 based on the mathematical expression model 321 is set to be 48 hours that is from 0'oclock of the second day to 0'oclock of the fourth day. Simulation by the production simulator 310 is performed based on the result of solution finding performed with respect to the above described 48 hours, and in the fourth loop, the production schedule is determined for the first 24 hours. In this case, the time period from 0'oclock of the second day to 24'oclock of the second day (0'oclock of the third day) is determined as a time period D of the fourth production schedule.

Next, in a fifth loop, 0'oclock of the third day, which is the date and time immediately after the above described determined time period is set as a new schedule creation starting time and time, and a solution is found with the above described optimization calculation device 330 based on the mathematical expression model 321 with 48 hours until 24'oclock of the fourth day as the target time period. Then, based on the result of solution finding which is performed with respect to the above described 48 hours, simulation by the production simulator 310 is performed. In the fifth loop, the production schedule is also determined with respect to the first 24 hours out of 48 hours in which the solution finding is performed. In this case, a time period E of the fifth production schedule is determined with respect to the time period from 0'oclock of the second day to 24'oclock of the third day (0'oclock of the fourth day).

Next, in a sixth loop, a solution is found by the mathematical expression model 321 with 24 hours from 0'oclock of the fourth day to 24'oclock of the fourth day as the target time period. In this case, 24 hours, which are all target time period, are determined as a time period F of the sixth production schedule. In this concrete example, all the production schedules of four days are created at the point of time when the sixth loop is finished, and therefore, the processing is finished. Determination of the production schedule may be performed every time an event requiring a production instruction occurs.

As described above, in this third embodiment, the calculation range is divided while the initial value is shifted, and therefore, even when a schedule with a large calculation load is calculated, it can be calculated within a practical time. Accordingly, even when the production schedule of a large-scale plant with tremendous calculation elements is created, the schedule can be created in a practical time. Since especially in this embodiment, split processing is performed by linking the optimization calculation device 330 and the production simulator 310, fine adjustment for each event can be performed even when some deviation occurs in the individual events, and the optimum schedule can be created within a practical time.

Thereby, even when the scale of the above described production simulator 310 is very large, or even when the number of constraint conditions is large and the constraint conditions are complicated, only an important part having a large influence on schedule creation, among the production states and mathematical expressions written in the above described production simulator 310, is taken into the above described mathematical expression model 321, whereby the scale of the above described mathematical expression model 321 is brought into a proper range, so that the optimization calculation can be performed within a practical time.

All the production states and production constrains can be written in the above described production simulator 310, and therefore, the schedule which is created by performing one simulation is assured to be actually executable.

As described above, in this embodiment, the production schedule is created by linking the production simulator 310, the mathematical expression model 321 and the optimization calculation device 330, and therefore, (1) the schedule can be created without repeating the calculation. Further, (2) by taking only an important part having a large influence on the schedule creation into the above described mathematical expression model 321, calculating time can be shortened, and (3) a large-scale problem can be solved.

Further, since the information of the production state and production constraint of the above described production simulator 310 is detected every time an event requiring an production instruction occurs, an optimum production instruction is calculated by the optimization method by the above described optimization calculation device 330 based on the above described detected information and the previously set evaluation index, and the schedule is created by performing detailed simulation with the above described production simulator 310 based on the above described calculation result, (4) schedule accuracy can be enhanced, and (5) the schedule of which executability is verified can be created.

Since the mathematical expression model 321 is introduced, even when a change occurs to an important part having a large influence on schedule creation, it is possible to cope with the change quickly, and the schedule creation device with high maintainability can be constructed.

A fourth embodiment to a sixth embodiment which will be described hereinafter relate to the above described second embodiment.

Fourth Embodiment

As shown in FIG. 2, a production schedule creation device of this embodiment is also configured by the simulation control unit 200 including the production simulator 201, the optimization calculation device 212 and the like.

In this embodiment, the production simulator 201 is a simulator which simulates the production process which expresses the production state and the production constraint of the production process, that is to say, a large-sized simulator simulating a plant, and in this embodiment, the simulator is constructed by using a graph model, and is composed as a discrete system which moves a thing for each event (event of the simulator).

The mathematical model (mathematical expression model) 211 is composed corresponding to the above described production simulator 201. In this embodiment, the above described mathematical expression model 211 is created by using the state equation as shown in the following expression (D) by acquiring the elements relating to the production schedule to be created from the production state and the production constraint of the production process. The above described mathematical expression model 211 is held by mathematical expression model holding device (not shown) configured by semiconductor storage device or the like.

$$M(k+1)=M(k)+b \cdot u(k) \qquad (D)$$

Namely, when the state vector indicating the number of elements present in each point in a certain discrete time k, in other words, the state variable is expressed by M(k), and the operation vector expressing the presence and absence of firing of each line by "1" and "0" is expressed by u(k), the state vector M(k+1) in the next time k+1 can be expressed by the above expression (D) by using an incidence matrix b.

The optimization calculation device 212 performs the optimization calculation processing for the above described mathematical expression model 211, and calculates a feedback gain K. The optimization calculation performed by the above described optimization calculation device 212 utilizes the linear quadratic (LQ) control, and is performed by using the evaluation function S as shown by the following expression (B).

$$S = \Sigma \{M'QM + u'Ru\} \quad (B)$$

In the evaluation function S, Q and R are proper matrixes which are set in accordance with the control purpose, and M' and u' are transposed vectors of the state vector M and the operation vector u, respectively. Considering the control to minimize the evaluation function S, the feedback gain K for performing the state feedback control with $$u(k) = -K \cdot M(k) \quad (c)$$

can be obtained from the optimal control theory.

An optimal controller 202 of the simulation control unit 200 repeats processing of calculating the production instruction (operation vector u) by using the feedback gain K that is calculated by the optimization calculation device 212 and the production state (state vector M) and supplying it to the production simulator 201 to proceed with simulation, then obtaining a new production state and calculating a new production instruction based on the new production state. Then, it creates the production schedule in the production process from the simulation result 220 obtained from this.

Figure 9:
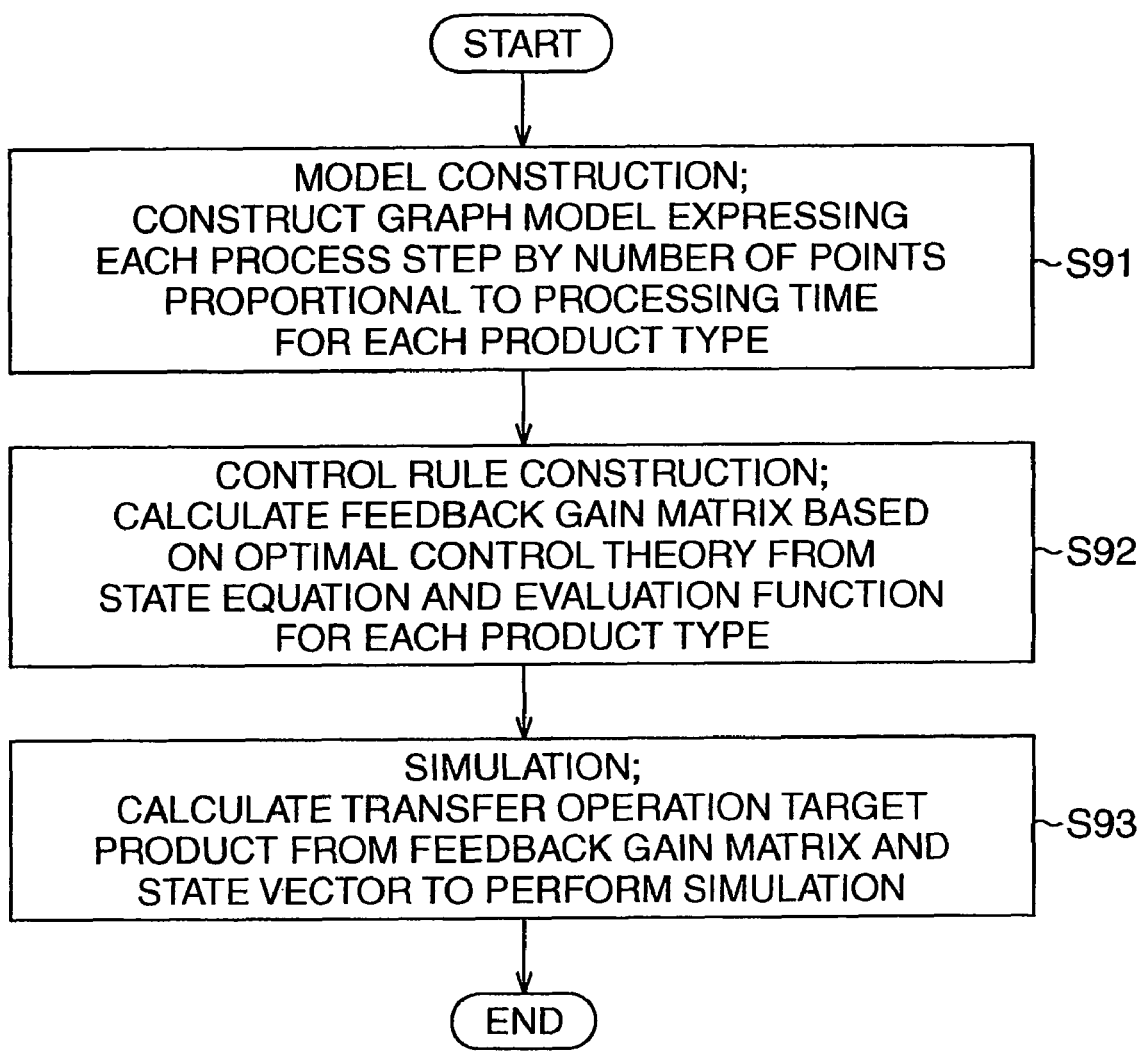
FIG. 9 is a flowchart showing a processing procedure of production schedule creation in a fourth embodiment.

A concrete example of the fourth embodiment will be described with reference to FIGS. 9 to 12. As shown in FIG. 9, firstly, as a graph model of the production process, a graph model expressing each process step by the number of points proportional to the processing time Tp is constructed for each product type (step S91).

Secondly, the feedback gain matrix K is obtained for each product type from the state equation of the constructed graph model and the evaluation function Q and R that is set (step S92).

Thirdly, from the obtained feedback gain matrix K and the state vector M(k) expressing an in-process product progress state, the operation vector u(k) for a transfer operation node of a product is obtained for product type, and thereafter, the simulation of the production process of a predetermined time period is executed by using a method for sequentially performing a transfer operation by the transferable number in accordance with the sequence of the products obtaining larger manipulative variables in the positive value, for each of the transfer operation nodes in the virtual production process (step S93).

Figure 10:
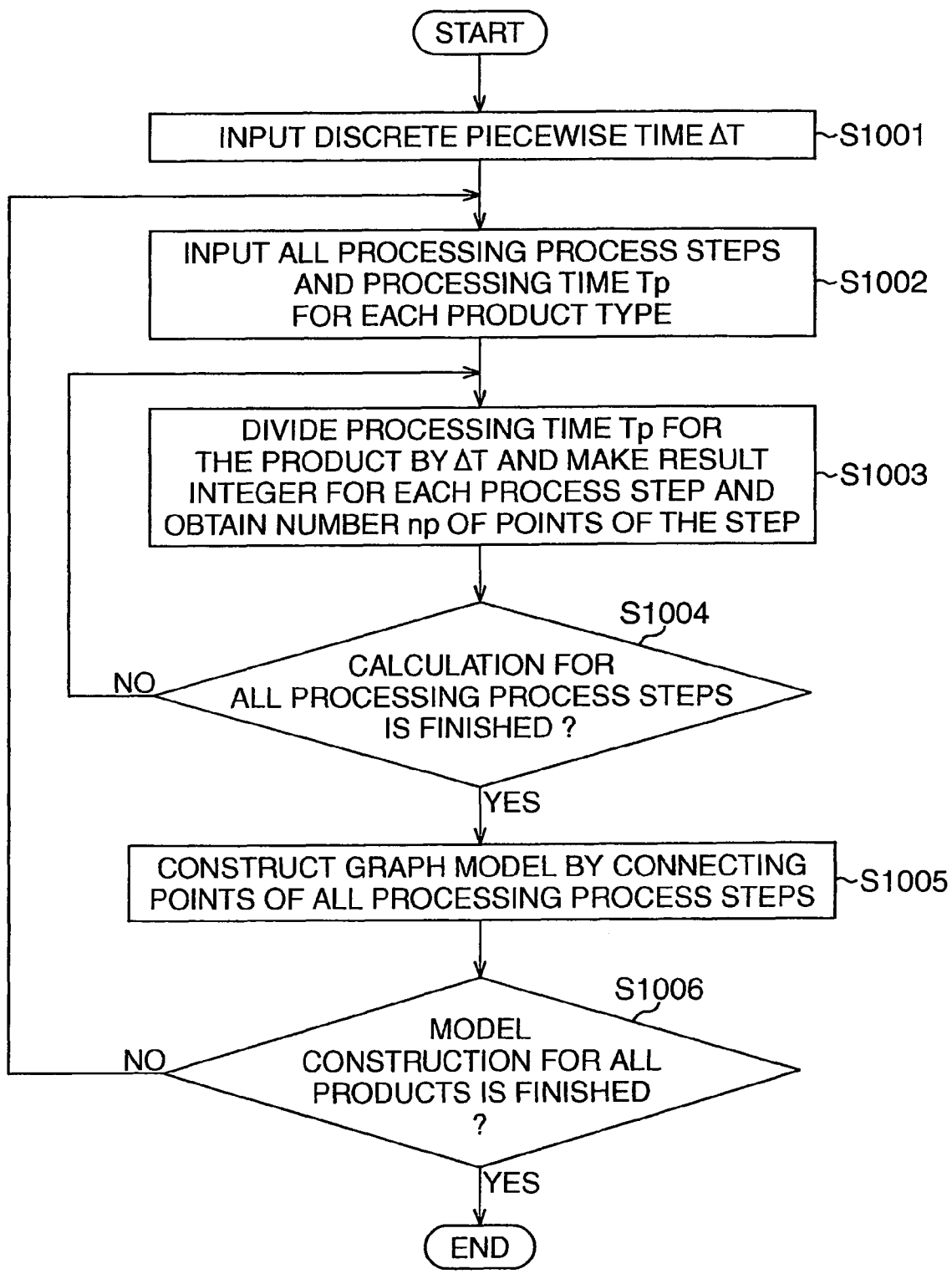
FIG. 10 is a flowchart showing a processing procedure of model construction.

FIG. 10 is a flowchart showing an example of the processing in step S91 shown in FIG. 9, namely, the processing procedure for constructing the graph model which expresses each process step by the number of points corresponding to the processing time, for each product type, as the graph model of the production process.

Namely, first a discrete piecewise time ΔT is input (step S1001), and next, all the processing process steps and processing time Tp are input for each product type (step S1002). Then, the processing time Tp is divided by the piecewise time ΔT and made an integer for each processing process step, thereby; obtaining the number np of points of the above described each processing process step (steps S1003 and S1004), and the points of all the processing process steps are connected by a line, thereby constructing a graph model for each product type (step S1005).

Then, until the graph models are constructed for all products, the flow returns to the processing of step S1002 from step 51006, and the above processing is repeatedly performed. It is the most efficient to define the discrete piecewise time ΔT with the greatest common divisor of each step processing time of each product, but may be properly set in consideration of intended control accuracy.

Figure 11:
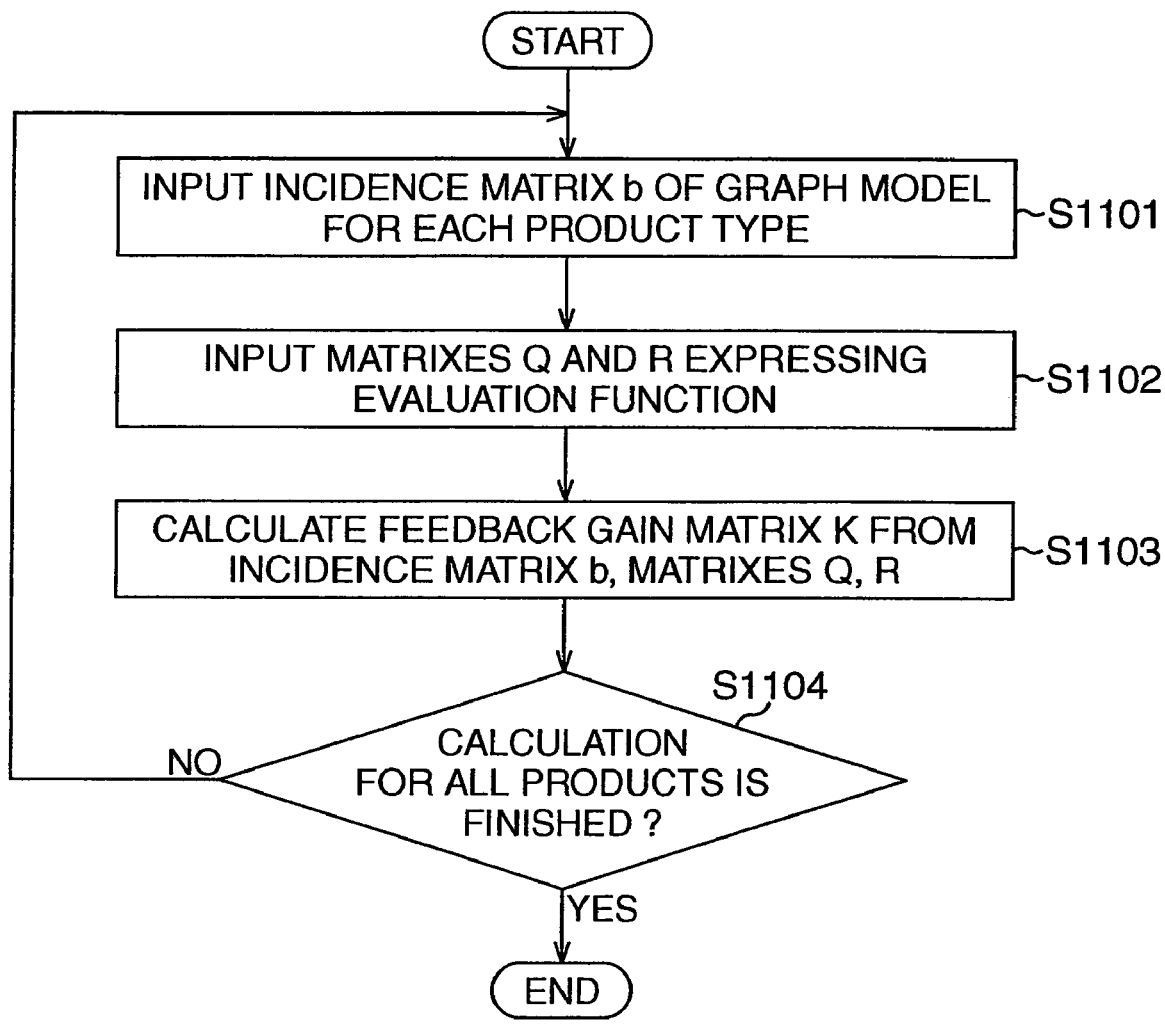
FIG. 11 is a flowchart showing a processing procedure of control rule construction.

FIG. 11 is a flowchart showing an example of the processing of step S92 shown in FIG. 9, namely, the processing procedure for obtaining the feedback gain matrix K for each product type from the state equation of the constructed graph model, and the evaluation function that is set. The incidence matrixes b of the graph models may be created for all the products, and may be input into the optimization calculation device 212, and all the products may be calculated by one operation.

Namely, first, the incidence matrix b which describes the state equation of the graph model is input into the optimization calculation device 212 for each product type (step 51101), and the matrixes Q and R expressing evaluation function are input (step S1102). Then, the feedback gain matrix K is calculated from the above described input incidence matrix b and the evaluation matrixes Q and R (step S1103). The flow returns to the processing of step 1101 from step S1104, and the above processing is repeatedly performed until the calculation is completed for all the products.

Figure 12:
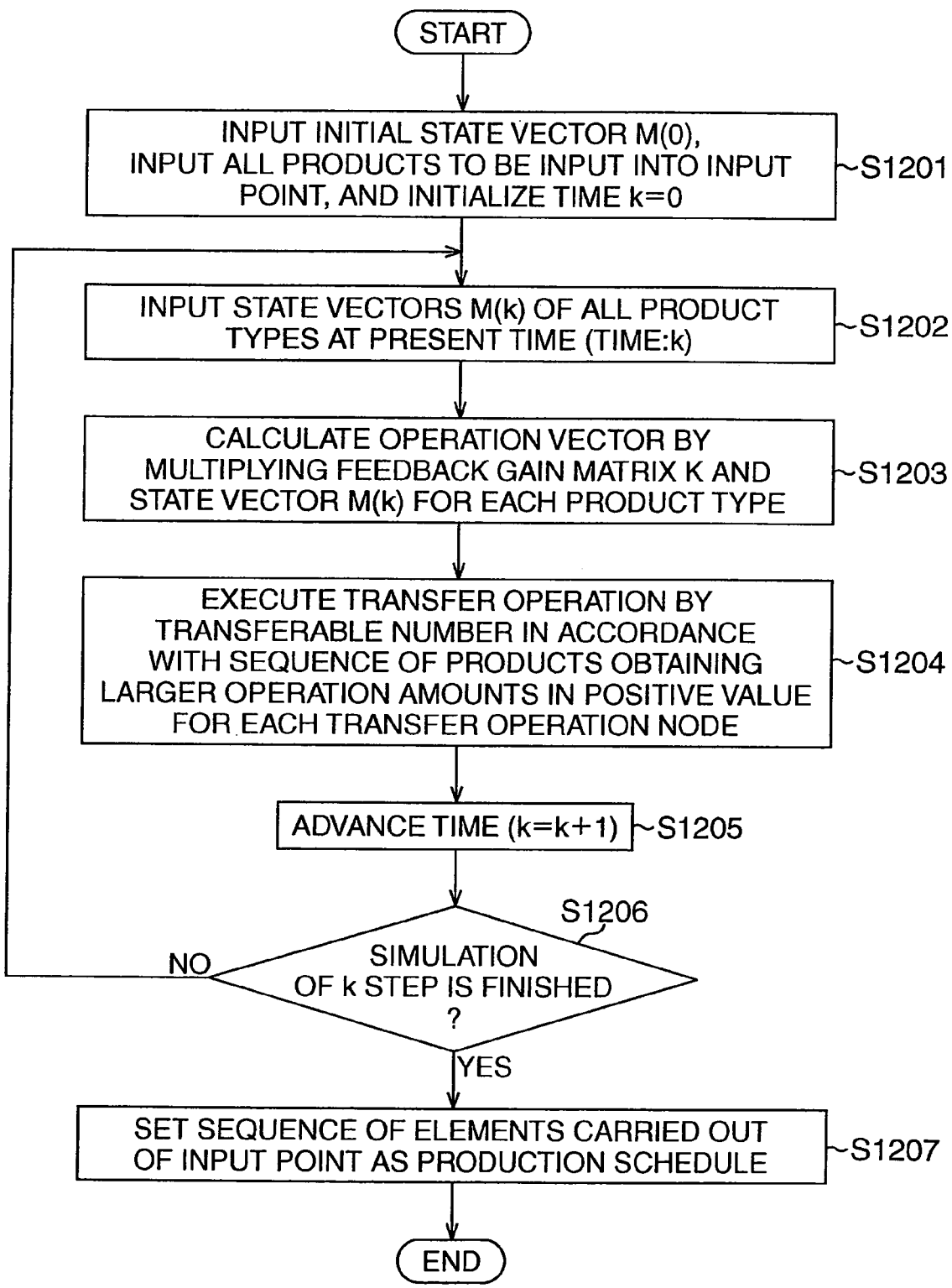
FIG. 12 is a flowchart showing a processing procedure of simulation.

FIG. 12 is a flow chart showing an example of the processing of step S93 shown in FIG. 9, namely, the processing procedure for executing the simulation of the production process of a predetermined time period by using a method for sequentially performing a transfer operation by the transferable number in accordance with the sequence of the products obtaining larger manipulative variables in the positive value, for each transfer operation node in the virtual production process, after obtaining the operation vector u(K) for the transfer operation node of a product for each product type from the feedback gain matrix K calculated as described above and the state vector M(K) expressing the in-process product progress state.

Namely, first the state vector M(0) in the initial state of the graph model is input, all the products (elements) to be input are input into the input point, and the value of time k is initialized to be zero (step S1201), after which, the state vectors M(k) of all product types at the present time (time: k) are input (step S1202).

Then, the operation vector u(k) is calculated for each product type by multiplying the feedback gain matrix K calculated by using the above described method by the above described inputted state vectors M(k) (step S1203), and then, the transfer operation is executed by the transferable number in accordance with the sequence of the products obtaining larger manipulative variables in the positive value for each transfer operation node (step S1204).

Next, after time is advanced (step S1205), it is determined whether the simulation of each step is finished or not (step S1206), and when it is not finished, the flow returns to the processing of step S1202. When it is finished, the simulation result is set as the production schedule (step S1207).

Since as described above, in this embodiment, the optimal control based on the instruction which is obtained as a result of performing the optimization calculation, and the state in the event is performed, the schedule can be created based on the simulation result in which the optimization calculation is executed for each event, and the schedule is the simulation result by the simulator expressing the constraint of the production process, it can be confirmed that the schedule is actually usable.

Thereby, when the scale of the above described production simulator 201 is very large, or when the number of constraint conditions is very large, and the constraint conditions are complicated, only an important part having a large influence on the schedule creation, out of the production states and the mathematical equations written in the above described production simulator 201, is taken into the above described mathematical expression model 211, whereby the scale of the above described production simulator 201 is brought into a proper range, and the optimization calculation can be performed within a practical time.

In the above described production simulator 201, all the production states to be considered and the production constraints can be written, and the schedule created by performing one simulation is assured to be actually executable.

As described above, in this embodiment, the production schedule is created by linking the production simulator 201, the mathematical expression model 211 and the optimization calculation device 212, and therefore, (1) the schedule can be created without repeating calculation. Further, (2) the calculating time can be reduced by taking only an important part having a large influence on the schedule creation into the above described mathematical expression model 211, and (3) large-scale problems can be solved.

Each time the event requiring a production instruction occurs, information of the production state and the production constraint of the above described production simulator 201 is detected, then, based on the above described detected information and the evaluation index previously set, the optimum production instruction is calculated for the optimization method by the above described optimization calculation device 212, and the detailed simulation is performed with the above described production simulator 201 based on the above described calculation result to create the schedule. Therefore, (4) the schedule accuracy can be enhanced, and (5) the schedule of which verification of executabitliy is obtained can be created.

As the mathematical expression model 211 is introduced, even if a change occurs to the important part having a large influence on the schedule creation, it is possible to cope with the change quickly, and the schedule creation device with high maintainability can be constructed.

Further, it is possible to separate the processing so that the processing in the simulation control unit 200 is performed online, and construction of the mathematical model (mathematical expression model) 211 and the optimization calculation processing for the above described mathematical expression model 211 in the optimization calculation device 212 are performed offline corresponding to the production simulator 201, and the processing capacity can be enhanced by reducing the processing load in the simulation control unit 200.

In this embodiment, an example based on the general graph theory is described, but it is possible to apply the present invention to a Petri net model and the other graph models. In the Petri net model, the point in the aforementioned graph model is expressed by a place, and the line is expressed by a transition. The transition is the transfer operation node at which a product, namely, a token is transferred from place to place.

Generally, in a Petri net model, when arcs are input into one transition from a plurality of places, operation of the transition cannot be made unless tokens are present in all the places. This is called a firing rule of transition. When arcs are output to a plurality of places from one transition, tokens are output to all the places. An arc indicates the direction in which a token transfers from a transition to a place or from a place to a transition, and the number of arcs indicates the number of transferring tokens. Operating a transition is called firing the transition.

In the graph model, the processing capacity in each process step is controlled on software, but in the Petri net model, the number of products that can be processed in each processing process step at the same time is controlled in accordance with the number of capacity setting virtual tokens initially set in the virtual place provided in each process step.

When the present invention is applied to the Petri net model having such characteristics, a series of operations are the same as the operations in the aforementioned graph model.

Fifth Embodiment

As shown in FIG. 2, a production schedule creation device of this embodiment is also configured by the simulation control unit 200 including the production simulator 201, the optimization calculation device 212 and the like.

In this embodiment, the production simulator 201 is a simulator which simulates the production process which expresses the production state and the production constraint of the production process, that is to say, a large-sized simulator simulating a plant, and in this embodiment, the simulator is constructed by using a Petri net model, and is composed as a discrete system which moves a thing for each event (event of the simulator).

The mathematical model (mathematical expression model) 211 is composed corresponding to the above described production simulator 201. In this embodiment, the above described mathematical expression model 211 is created by using the state equation as shown in the following expression (D) by acquiring the elements relating to the production schedule to be created from the production state and the production constraint of the production process. The above described mathematical expression model 211 is held by mathematical expression model holding device (not shown) configured by semiconductor storage device or the like.

$$M(k+1)=M(k)+b \cdot u(k) \qquad (D)$$

Namely, when the state vector indicating the presence and absence of a token in each place at a certain discrete time k, in other words, the state variable is expressed by $M(k)$, and the operation vector expressing the presence and absence of each transition firing by "1" and "0" is expressed by $u(k)$, the state vector $M(k+1)$ in the next time $k+1$ can be expressed by the above expression (D) by using an incidence matrix b.

Here, one example of a Petri net model is shown in FIG. 13. A Petri net model is expressed by four elements that are a place (marked ○) (p1 to p6 in the example shown in the drawing), a transition (marked |) (t1 to t5 in the example shown in the drawing), an ark (marked →), and a token (marked ·). In this case, when arks are input from a plurality of places to one transition, operation of the transition cannot be performed unless products, namely, tokens are present in all the places (firing rule of the transition). When arks are output to a plurality of places from one transition, tokens are output to all the places. An ark indicates the direction in which a token moves from a transition to a place, or from a place to a transition, and the number of arks indicates the number of tokens which move. Operating a transition is called firing the transition.

As shown in FIG. 13, taking the case where the transition t1 is fired as an example, when in a certain discrete time k, the state vector indicating the presence and absence of the tokens t1 to t5 in the respective places p1 to p6, in other words, the state variable is expressed by M(k), and the operation vector expressing the presence and absence of each transition firing by "1" and "0" is expressed by u(k), the state vector M(k+1) in the next time k+1 can be expressed by the following equation (1) by using the incidence matrix b.

[Mathematical Expression 1]

[Mathematical Expression 1]

$$\underbrace{\begin{bmatrix} p1 \\ p2 \\ p3 \\ p4 \\ p5 \\ p6 \end{bmatrix}}_{M_{(k+1)}} = \underbrace{\begin{bmatrix} 0 \\ 1 \\ 3 \\ 0 \\ 1 \\ 0 \end{bmatrix}}_{M_{(k)}} + \underbrace{\begin{bmatrix} 1 \\ 0 \\ 2 \\ 0 \\ 1 \\ 0 \end{bmatrix} \begin{bmatrix} -1 & 1 & 0 & 0 & 0 \\ 1 & -1 & 0 & 0 & 0 \\ 1 & 0 & -1 & -2 & 0 \\ 0 & -1 & 1 & 0 & 1 \\ 0 & 0 & 0 & -1 & 1 \\ 0 & 0 & 0 & 1 & -1 \end{bmatrix}}_{b} * \underbrace{\begin{bmatrix} t1 \\ t2 \\ t3 \\ t4 \\ t5 \end{bmatrix}}_{U_{(k)}} + \begin{bmatrix} 1 \\ 0 \\ 2 \\ 0 \\ 1 \\ 0 \end{bmatrix} + \begin{bmatrix} -1 \\ 1 \\ 1 \\ 0 \\ 0 \\ 0 \end{bmatrix} \quad (1)$$

The optimization calculation device 212 performs the optimization calculation processing for the above described mathematical expression model 211, and calculates the feedback gain K. The optimization calculation performed by the above described optimization calculation device 212 utilizes the linear quadratic (LQ) control, and is performed by using the evaluation function S as shown by the following expression (B).

$$S=\Sigma\{M'QM+u'Ru\} \quad (B)$$

In the evaluation function S, Q and R are proper matrixes which are set in accordance with the control purpose, and M' and u' are transposed vectors of the state vector M and the operation vector u, respectively. Considering the control to minimize the evaluation function S, the feedback gain K for performing the state feedback control with $$u(k)=-K \cdot M(k) \quad (c)$$

can be obtained from the optimal control theory.

An optimal controller 202 of the simulation control unit 200 repeats processing of calculating the production instruction (operation vector u) by using the feedback gain K that is calculated by the optimization calculation device 212 and the production state. (state vector M) and supplying it to the production simulator 201 to proceed with simulation, then obtaining a new production state and calculating a new production instruction based on the new production state. Then, it creates the production schedule in the production process from the simulation result 220 obtained from this.

Figure 14:
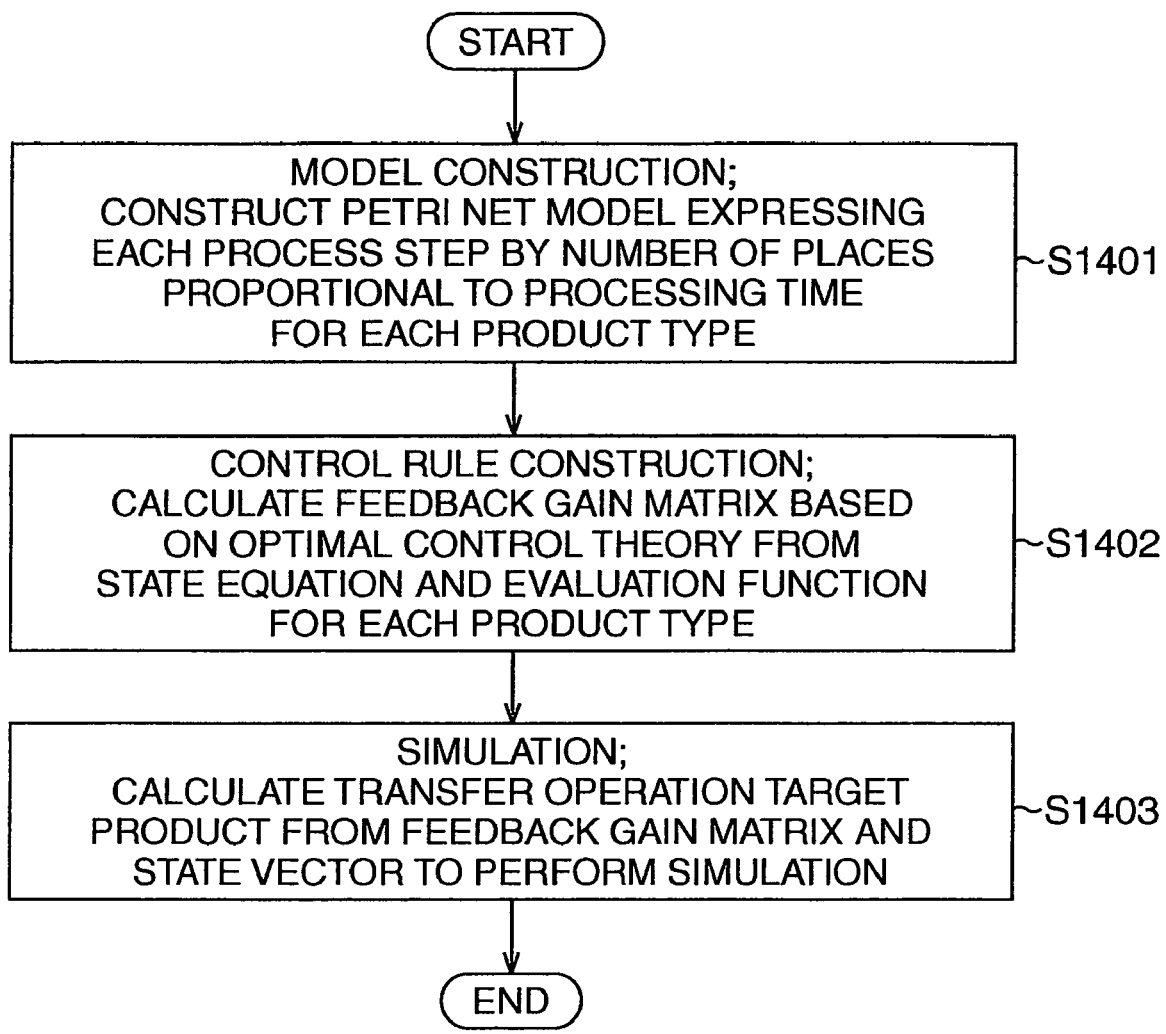
FIG. 14 is a flowchart showing a processing procedure of production schedule creation in a fifth embodiment.

A concrete example of the fifth embodiment will be described with reference to FIGS. 14 to 17. As shown in FIG. 14, firstly, as a Petri net model of the production process, a Petri net model expressing each process step by the number of places proportional to the processing time Tp is constructed for each product type (step S1401).

Secondly, the feedback gain matrix K is obtained for each product type from the state equation of the constructed Petri net model and the evaluation function that is set (step S1402).

Thirdly, from the obtained feedback gain matrix K and the state vector M(k) expressing an in-process product progress state, the operation vector u(k) for a transfer operation node of the product is obtained for product type, and thereafter, the simulation of the production process of a predetermined time period is executed by using a method for sequentially performing a transfer operation by the transferable number in accordance with the sequence of the products obtaining larger manipulative variables in the positive value, for each of the transfer operation nodes in the virtual production process (step S1403).

Figure 15:
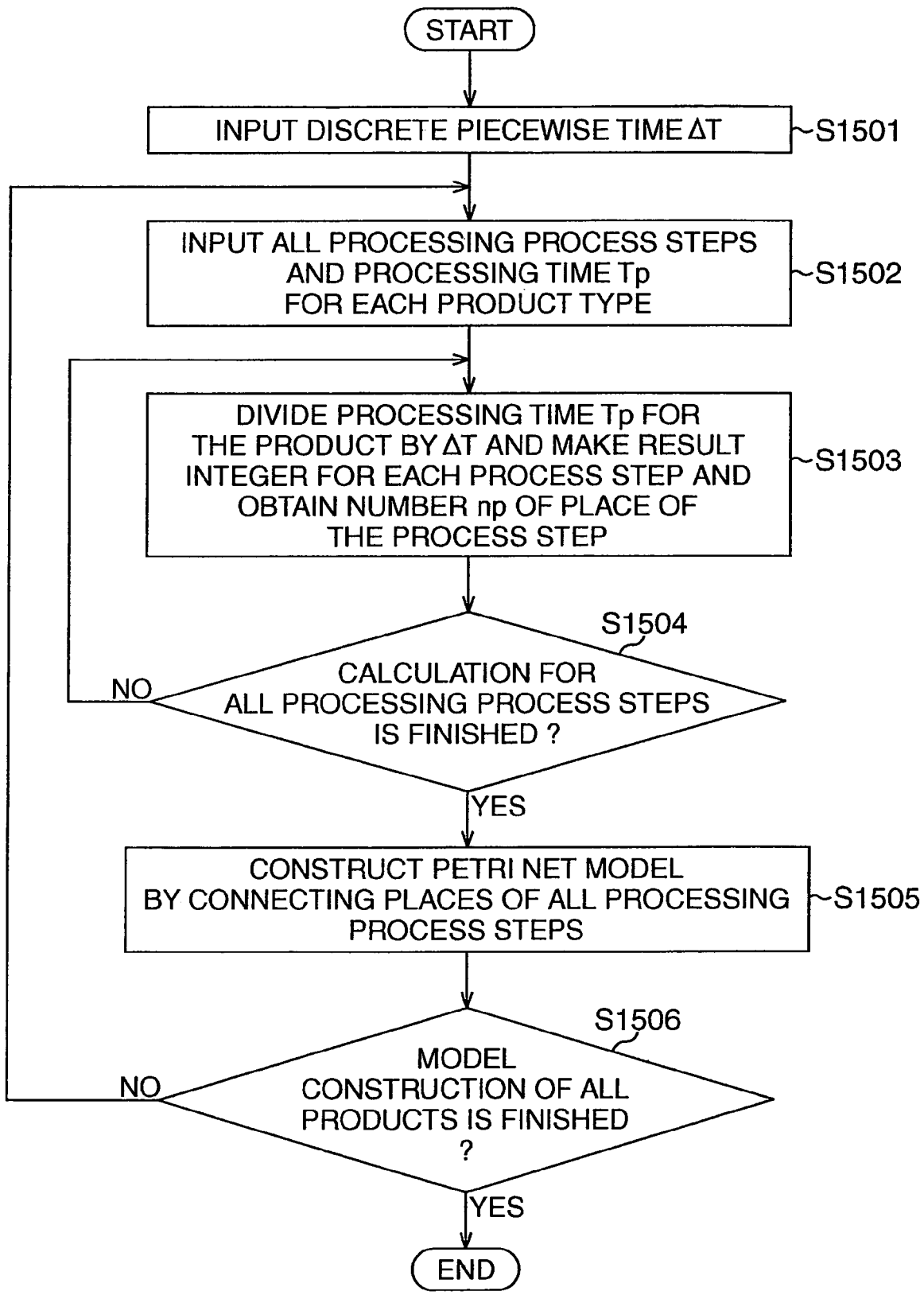
FIG. 15 is a flowchart showing a processing procedure of model construction.

FIG. 15 is a flowchart showing an example of the processing in step S1401 shown in FIG. 14, namely, the processing procedure for constructing the Petri net model which expresses each process step by the number of places proportional to the processing time Tp, for product type as the Petri net model of the production process.

Namely, first, a discrete piecewise time ΔT is input (step S1501), and next, all the processing process steps and processing time Tp are input for each product type (step S1502). Then, the processing time Tp is divided by the piecewise time ΔT and made an integer for each processing process step, thereby, obtaining the number np of places of each processing process step (steps S1503 and S1504), and the places of all the processing process steps are connected, thereby constructing a Petri net model for each product type (step S1505).

Then, until the Petri net models are constructed for all products, the flow returns to the processing of step S1502 from step S1506, and the above processing is repeatedly performed. It is the most efficient to define the discrete piecewise time ΔT with the greatest common divisor of each process step processing time of each product type, but may be properly set in consideration of intended control accuracy.

Figure 16:
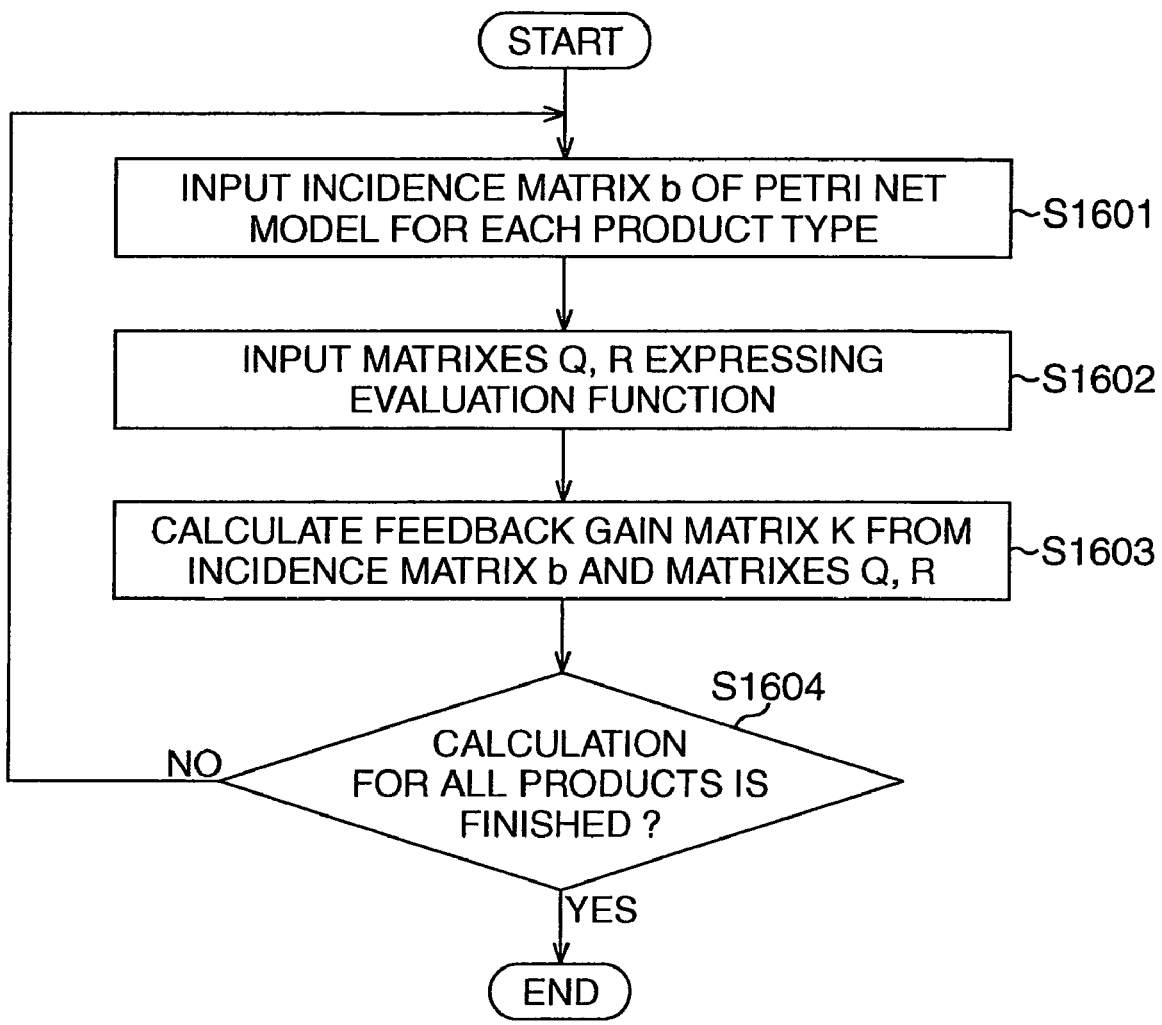
FIG. 16 is a flowchart showing a processing procedure of control rule construction.

FIG. 16 is a flowchart showing an example of the processing of step S1402 shown in FIG. 14, namely, the processing procedure for obtaining the feedback gain matrix K for each kind of product from the state equation of the constructed Petri net model, and the evaluation function that is set.

Namely, first, the incidence matrix b which describes the state equation of the Petri net model is input into the optimization calculation device 212 for each kind of product (step S1601), the matrixes Q and R expressing evaluation function are input (step S1602). Then, the feedback gain matrix K is calculated from the above described inputted incidence matrix b and the evaluation matrixes Q and R (step S1603). Until the calculation is completed for all the products, the flow returns to the processing of step S1601 from step S1604, and the above processing is repeatedly performed. The incidence matrixes b of the Petri net models may be input into the optimization calculation device 212 for all the products, and calculation may be performed for all the products by one operation.

Figure 17:
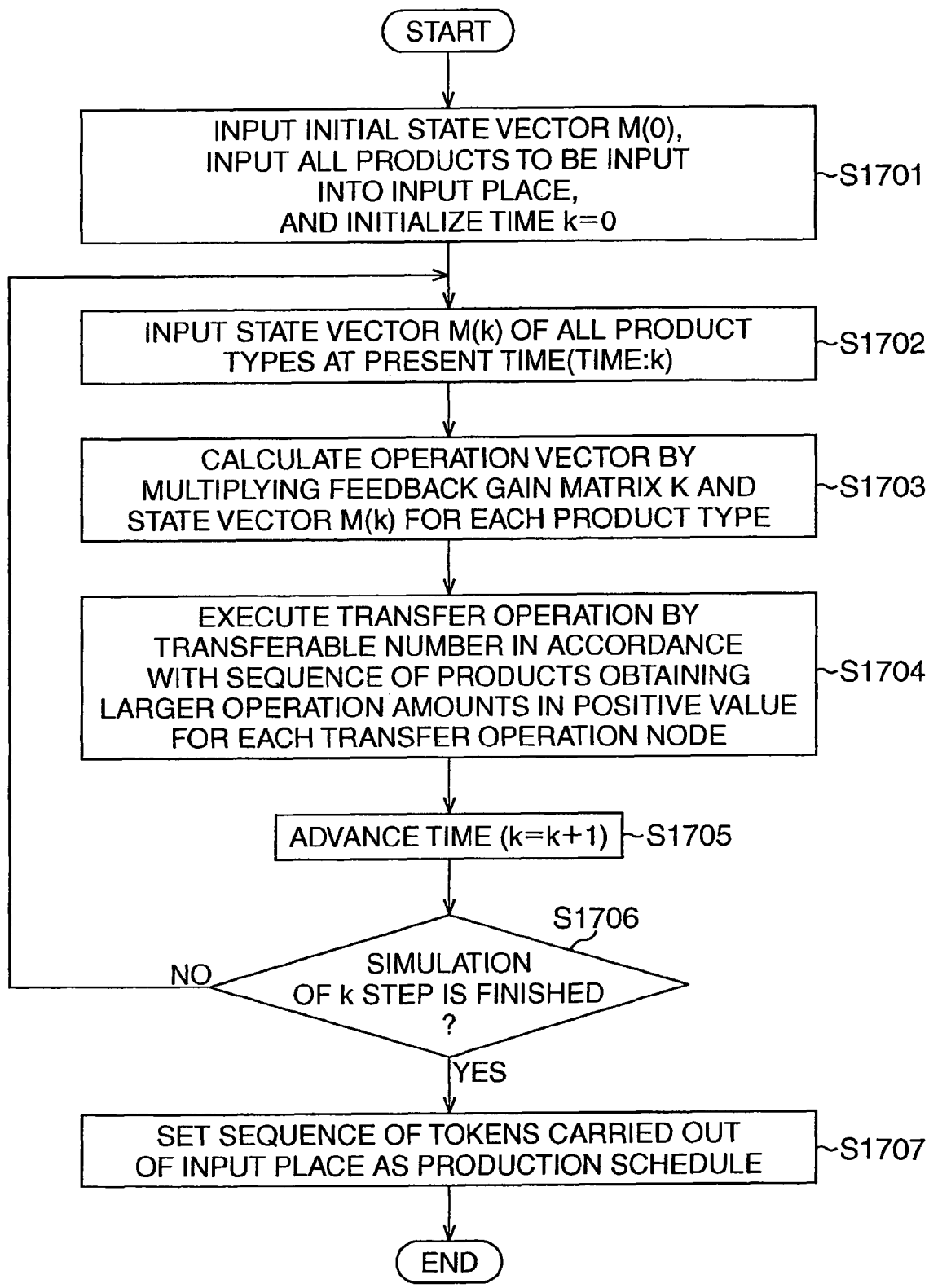
FIG. 17 is a flowchart showing a processing procedure of simulation.

FIG. 17 is a flowchart showing an example of the processing of step S1403 shown in FIG. 14, namely, the processing procedure for executing the simulation of the production process of a predetermined time period by using a method for sequentially performing the transfer operation by the transferable number in accordance with the sequence of the products obtaining larger manipulative variables in the positive value for each transfer operation node in the virtual production process, after obtaining the operation vector u(K) for the transfer operation node of the product for each product type from the feedback gain matrix K calculated as described above and the state vector M(K) expressing the in-process product progress state.

Namely, after the state vector M(0) in the initial state of the Petri net model is input, all the products to be input are input into the input place, and the value of time k is initialized to be zero (step S1701), the state vectors M(k) of all product types at the present time (time: k) are input (step S1702).

Then, the operation vector u(k) is calculated for each kind of product by multiplying the feedback gain matrix K calculated by using the above described method by the above described inputted state vector M(k) (step S1703), and then, the transfer operation is executed by the transferable number in accordance with the sequence of the products obtaining larger manipulative variables in the positive value for each transfer operation node (step S1704).

Next, after the time is advanced (step S1705), it is determined whether the simulation of each step is finished or not (step S1706), and when it is not finished, the flow returns to the processing of step S1702. When it is finished, the simulation result is set as the production schedule (step S1707).

Since as described above, in this embodiment, in addition to the effect of the above described fourth embodiment, the state vector expressing the in-process product progress state is expressed in accordance with presence and absence of the product in each place, each element of the operation vector which is calculated from the feedback gain matrix and the above described state vector can be made to directly reflect the size of each element of the feedback gain matrix, and among a plurality of kinds of products present in the same place, those having larger gains can be always processed with higher priority, as a result of which, an optimum schedule which makes the total processing time in each processing process step the shortest can be easily created.

If either the method in accordance with presence and absence of a product in each place, or the method in accordance with the number of products present in each place is made selectable as a method for expressing the state vector, the schedule which makes the total processing time the shortest can be easily created as described above when the state vector is expressed in accordance with presence and absence of a product in each place, while when the state vector is expressed in accordance with the number of products present in each place, the schedule which makes the total processing time short to some degree while preventing the trouble of certain products staying in one place can be easily created.

Sixth Embodiment

As shown in FIG. 2, a production schedule creation device of this embodiment is also configured by the simulation control unit 200 including the production simulator 201, the optimization calculation device 212 and the like.

In this embodiment, the production simulator 201 is a simulator which simulates the production process which expresses the production state and the production constraint of the production process, that is to say, a large-sized simulator simulating a plant, and in this embodiment, the simulator is constructed by using a Petri net model, and is composed as a discrete system which moves a thing for each event (event of the simulator).

The mathematical model (mathematical expression model) 211 is composed corresponding to the above described production simulator 201. In this embodiment, the above described mathematical expression model 211 is created by using the state equation as shown in the following expression (A) by. acquiring the elements relating to the production schedule to be created from the production state and the production constraint of the production process. The above described mathematical expression model 211 is held by mathematical expression model holding device (not shown) configured by semiconductor storage device or the like.

$$M(k+1) = a \cdot M(k) + b \cdot u(k) \quad (A)$$

Namely, when the state vector indicating the number of tokens present in each place in a certain discrete time k, in other-words, the state variable is expressed by M(k), and the operation vector expressing the presence and absence of each transition firing by "1" and "0" is expressed by u(k), the state vector M(k+1) in the next time k+1 can be expressed by the above expression (A) by using the transition matrix a and the incidence matrix b.

The optimization calculation device 212 performs the optimization calculation processing for the above described mathematical expression model 211, and calculates the feedback gain K. The optimization calculation performed by the above described optimization calculation device 212 utilizes the linear quadratic (LQ) control, and is performed by using the evaluation function S as shown by the following expression (B).

$$S = \Sigma \{M'QM + u'Ru\} \quad (B)$$

In the evaluation function S, Q and R are proper matrixes which are set in accordance with the control purpose, and M' and u' are transposed vectors of the state vector M and the operation vector u, respectively. Considering the control to minimize the evaluation function S, the feedback gain K for performing the state feedback control with $$u(k) = -K \cdot M(k) \quad (c)$$

can be obtained from the optimal control theory.

An optimal controller 202 of the simulation control unit 200 repeats processing of calculating the production instruction (operation vector u) by using the feedback gain K that is calculated by the optimization calculation device 212 and the production state (state vector M) and supplying it to the production simulator 201 to proceed with simulation, then obtaining a new production state and calculating a new production instruction based on the new production state. Then, it creates the production schedule in the production process from the simulation result 220 obtained from this.

Figure 18:
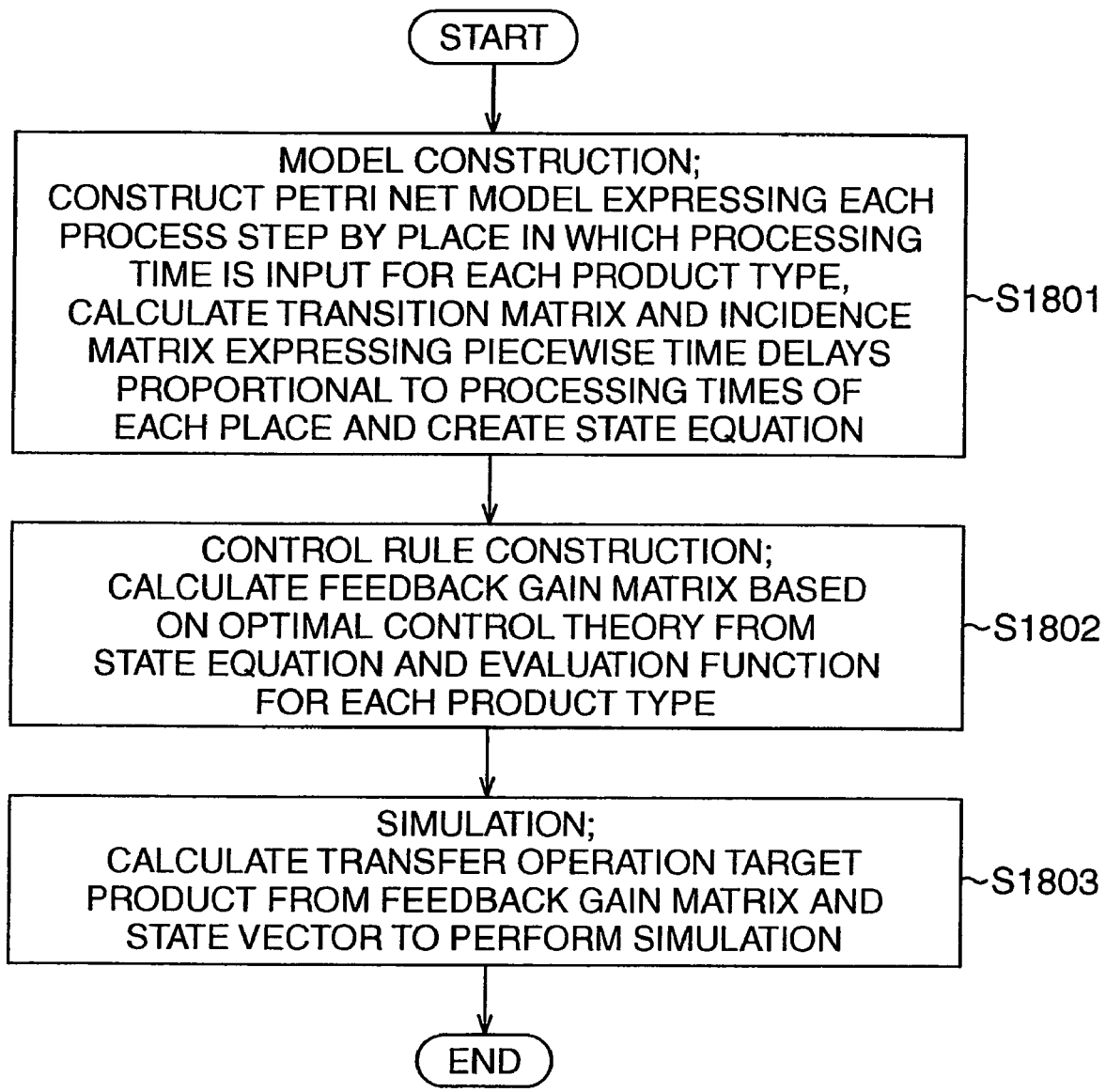
FIG. 18 is a flowchart showing a processing procedure of production schedule creation in a sixth embodiment.

A concrete example of the sixth embodiment will be described with reference to FIGS. 18 to 21. As shown in FIG. 18, firstly, as a Petri net model of the production process, a Petri net model expressing each process step by the place into which the processing time Tp is input is constructed for each product type. Then, the transition matrix a and the incidence matrix b expressed in accordance with piecewise time delay np proportional to the processing time Tp in each place of the constructed Petri net model are calculated, and the state equation is created by using these two matrixes a and b (step S1801).

Secondly, the feedback gain matrix K is obtained for each product type from the state equation created in the above described step S1801, and the evaluation function that is set (step S1802).

Thirdly, from the obtained feedback gain matrix K and thee state vector M(k) expressing an in-process product progress state, the operation vector u(k) for a transfer operation node of the product is obtained for each product type, and thereafter, the simulation of the production process of a predetermined time period is executed by using a method for sequentially performing an transfer operation by the transferable number in accordance with the sequence of the products obtaining larger manipulative variables in the positive value, for each of the transfer operation nodes in the virtual production process (step S1803).

Figure 19:
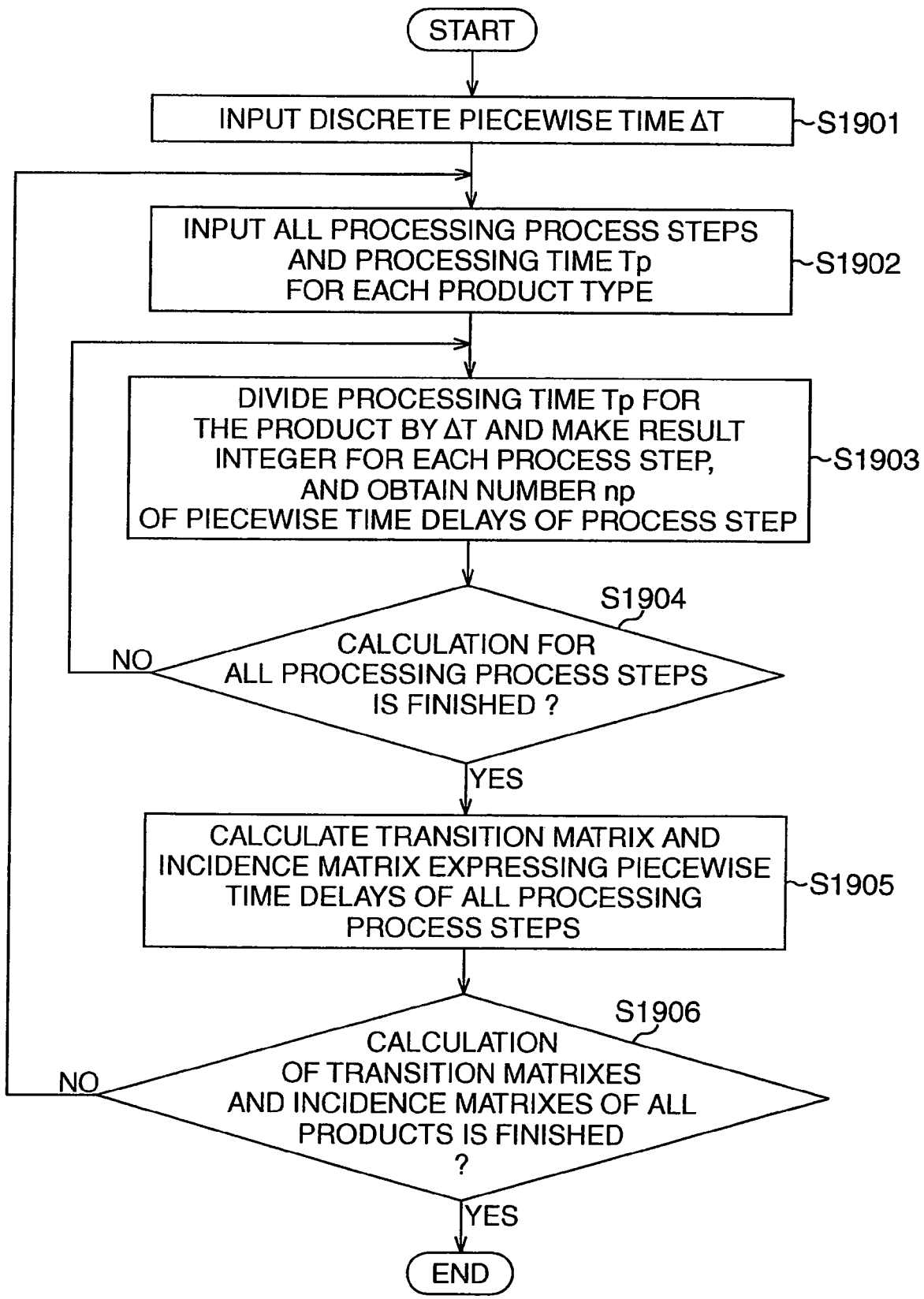
FIG. 19 is a flowchart showing a processing procedure of model construction.

FIG. 19 is a flowchart showing an example of the processing in step S1801 shown in FIG. 18, namely, the processing procedure for constructing the Petri net model that expresses each process step by the place in which the processing time is input, for each product type as the Petri net model of the production process, and for calculating the transition matrix a and the incidence matrix b expressing a piecewise time delay in each process step for each product type.

Namely, first, a discrete piecewise time ΔT is input (step S1901), and next, all the processing process steps and processing time Tp are input for each product type (step S1902). Then, the processing time Tp is divided by the piecewise time ΔT and made an integer for each processing process step, thereby, obtaining the piecewise time delay np of the above described each processing process step (steps S1903 and S1904), and the transition matrix a and the incidence matrix b for each of product type of all processing process steps are calculated (step S1905).

Then, until the transition matrix a and the incidence matrix b are calculated for all products, the flow returns to the processing of step S1902 from step S1906, and the above processing is repeatedly performed. It is the most efficient to define the discrete piecewise time ΔT with the greatest common divisor of each process step processing time of each product type, but may be properly set in consideration of intended control accuracy.

Figure 20:
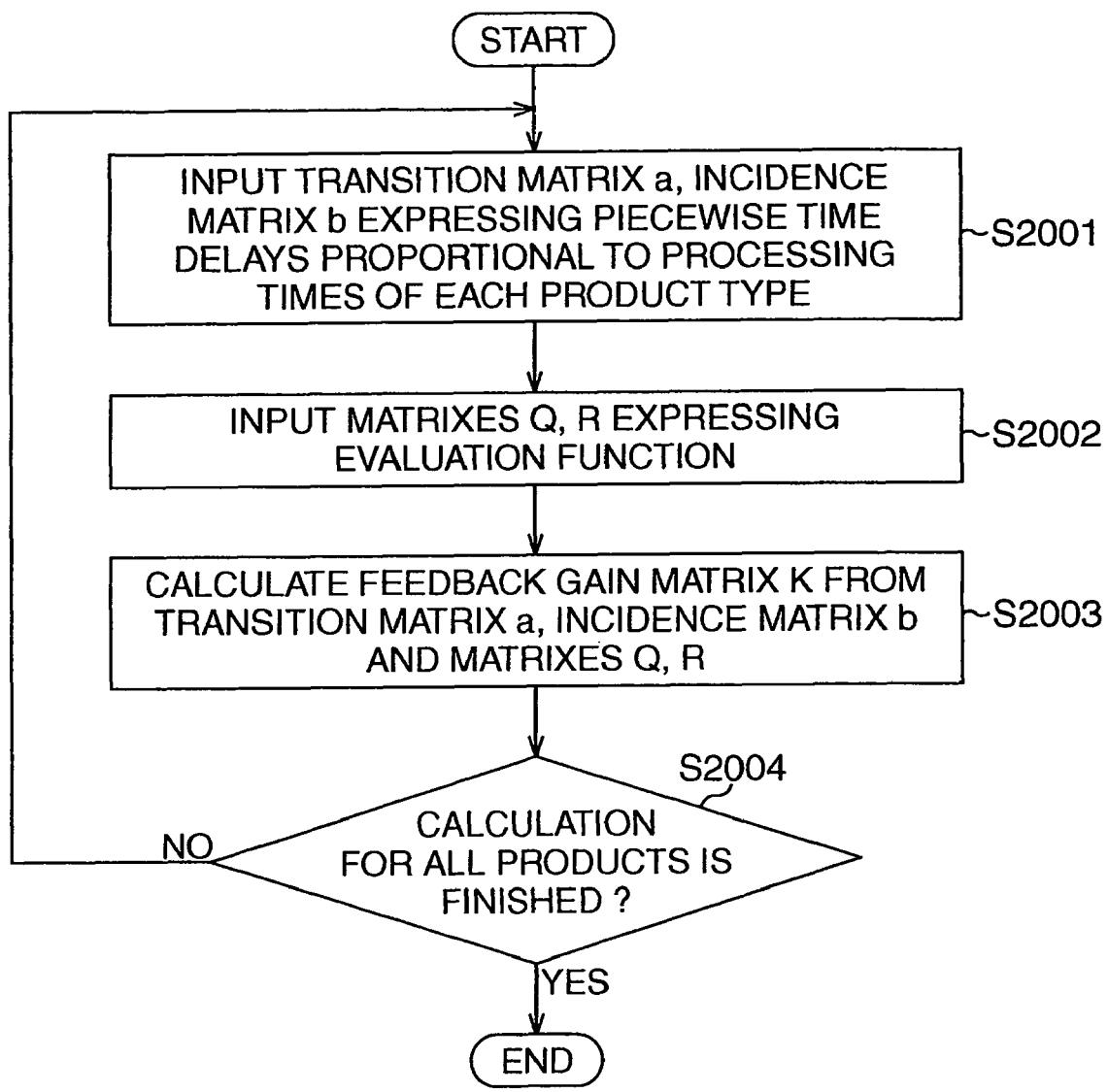
FIG. 20 is a flowchart showing a processing procedure of control rule construction.

FIG. 20 is a flowchart showing an example of the processing of step S1802 shown in FIG. 18, namely, the processing procedure for obtaining the feedback gain matrix K for each product type from the state equation composed of the transition matrix a and the incidence matrix b which are obtained as described above, and the evaluation function that is set.

Namely, first, the transition matrix a and the incidence matrix b which express the piecewise time delay np proportional to the processing time Tp of each place of the Petri net model are input into the optimization calculation device 212 for each product type (step S2001), the matrixes Q and R expressing the evaluation function are input (step S2002). Then, the feedback gain matrix K is calculated from the above described inputted transition matrix a, incidence matrix b and evaluation matrixes Q and R (step S2003). Until the calculation is completed for all the products, the flow returns to the processing of step S2001 from step 52004, and the above processing is repeatedly performed. The transition matrix a and the incidence matrix b which express the piecewise time delay np proportional to the processing time Tp of each place of the Petri net model may be input into the optimization calculation device 212 for all the products, and calculation may be performed for all the products by one operation.

Figure 21:
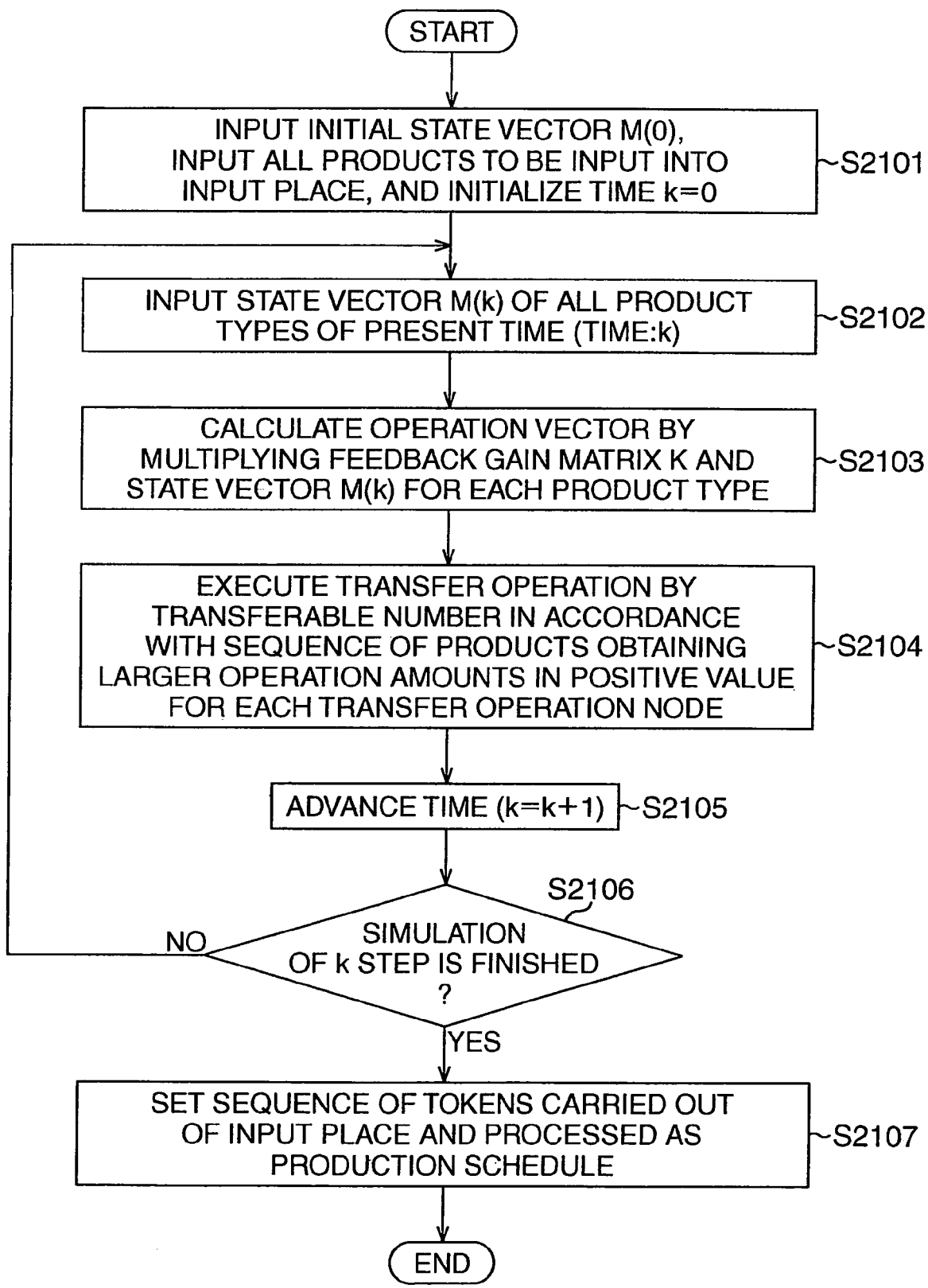
FIG. 21 is a flowchart showing a processing procedure of simulation.

FIG. 21 is a flowchart showing an example of the processing of step S1803 shown in FIG. 18, namely, the processing procedure for executing the simulation of the production process of a predetermined time period by using a method for sequentially performing a transfer operation by the transferable number in accordance with the sequence of the products obtaining larger manipulative variables in the positive value for each transfer operation node in the virtual production process, after obtaining the operation vector u(K) for the transfer operation node of the product for each product type from the feedback gain matrix K calculated as described above and the state vector M(K) expressing the in-process product progress state.

Namely, after the state vector M(0) in the initial state of the Petri net model is input, all the products to be input are input into the input place, and the value of time k is initialized to be zero (step S2101), the state vectors M(k) of all product type in the present time (time: k) are input (step S2102).

Then, the operation vector u(k) is calculated for each product type by multiplying the feedback gain matrix K calculated by using the above described method by the above described inputted state vector M(k) (step S2103), and then, a transfer operation is executed by the transferable number in accordance with the sequence of the products obtaining larger manipulative variables in the positive value for each transfer operation node (step S2104).

Next, after the time is advanced (step S2105), it is determined whether the simulation of each step is finished or not (step S2106), and when it is not finished, the flow returns to the processing of step S2102. When it is finished, the simulation result is set as the production schedule (step S2107).

Next, an operation of the sixth embodiment will be described based on an example shown as follows. Here, as an example of a process for processing a plurality of products in a plurality of different process steps and manufacturing the products, the case where two kinds of products, namely, a product A and a product B are manufactured by being processed in four process steps is considered, and processing time for each process step for each product is assumed to be given as in Table 1.

TABLE 1

|  |  | PROCESS STEP 1 | PROCESS STEP 2 | PROCESS STEP 3 | PROCESS STEP 4 |
|---|---|---|---|---|---|
| PRODUCT A | PROCESSING TIME (MIN) | 10 | 15 | 5 | 10 |
|  | PIECEWISE TIME DELAY | 2 | 3 | 1 | 2 |
| PRODUCT B | PROCESSING TIME (MIN) | 10 | 10 | . . . | 10 |
|  | PIECEWISE TIME DELAY | 2 | 2 | 0 | 2 |

Figure 22:
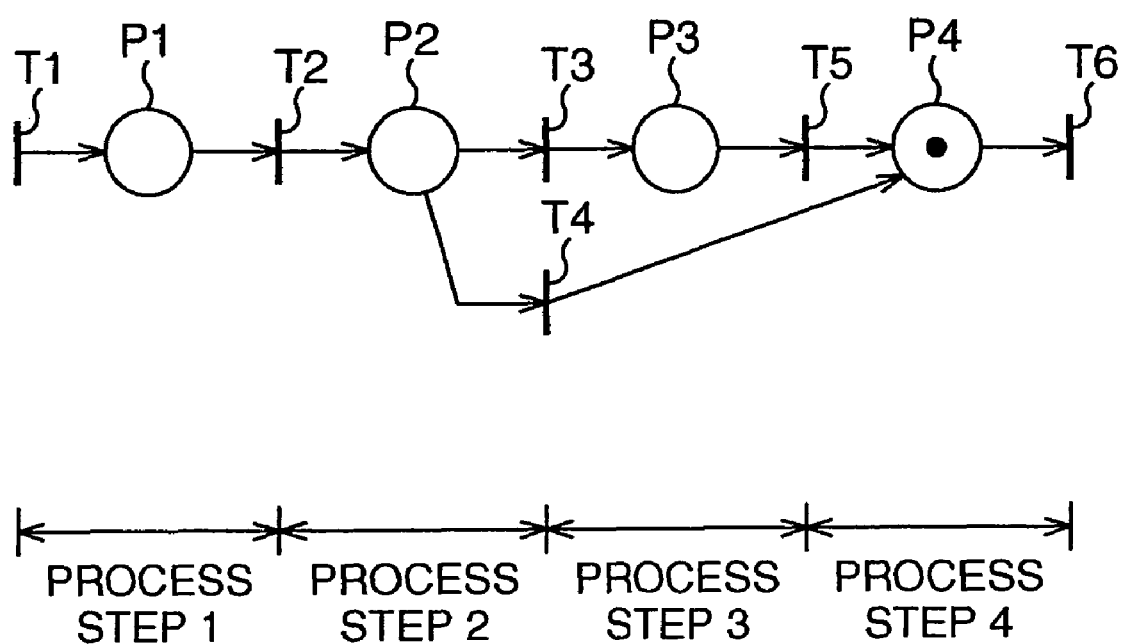
FIG. 22 is a diagram showing an example of a Petri net model.

FIG. 22 shows a Petri net model of the process of manufacturing both the products A and B with discrete piecewise time ΔT set as five minutes. The above described Table 1 expresses the piecewise time delay of each of the process steps 1, 2, 3 and 4 which is obtained by dividing the processing time by the discrete piecewise time ΔT (=five minutes). In this example, as for the product A, the process steps 1, 2, 3 and 4 have the piecewise time delays of 2, 3, 1 and 2, respectively, and as for the product B, the process steps 1, 2, 3 and 4 have the piecewise time delays of 2, 2, 0 and 2, respectively. In this example, the products A and B are input via a transfer operation node T1 (hereinafter, the transfer operation node will be also called a transition), and are carried out to the next process step, the inventory or the like via a transition T6. Namely, the product A passes through the places P1, P2, P3 and P4, and the product B passes through the places P1, P2 and P4.

When as described above, the state vector indicating the number of tokens present in each place in a certain discrete time k, in other words, the state variable is expressed by M(k), and the operation vector expressing the presence and absence of each transition firing by "1" and "0" is expressed by u(k), the state vector M(k+1) in the next time k+1 can be expressed by the above expression (A) by using the transition matrix a and the incidence matrix b. The transfer operation node (transition) on the state equation (A), and the transfer operation node of the actual process correspond to each other. Namely, the signal of the operation vector u(k) is an operation signal of the actual process.

For example, when the vector with the number of tokens present in the places P1, P2, P3 and P4 arranged for the product A is set as M, and the operation vector expressing the presence and absence of firing of the transitions T1, T2, T3, T5 and T6 by "1" and "0" is set as u, the change of state from the vector M(k) to the vector M(k+1) can be expressed by using the transition matrix a and the incidence matrix b shown by the following expressions (2) and (3).

[Mathematical Expression 2]

$$a = \begin{bmatrix} & 1 & 2 & 3 & 4 & \\ 0 & 0 & & & & 11 \\ 1 & 1 & & & 0 & 12 \\ & & 0 & 0 & 0 & 21 \\ & & 1 & 0 & 0 & 22 \\ & & 0 & 1 & 1 & 23 \\ & & & & 1 & 31 \\ 0 & & & & 0 & 0 & 41 \\ & & & & 1 & 1 & 42 \end{bmatrix}$$ (2)

$$b = \begin{bmatrix} & 1 & 2 & 3 & 5 & 6 & \\ 1 & 0 & 0 & 0 & 0 & 11 \\ 0 & -1 & 0 & 0 & 0 & 12 \\ 0 & 1 & 0 & 0 & 0 & 21 \\ 0 & 0 & 0 & 0 & 0 & 22 \\ 0 & 0 & -1 & 0 & 0 & 23 \\ 0 & 0 & 1 & -1 & 0 & 31 \\ 0 & 0 & 0 & 1 & 0 & 41 \\ 0 & 0 & 0 & 0 & -1 & 42 \end{bmatrix}$$ (3)

In the above described expression (2), each single-digit number in the column direction represents a place number, and in each of the two-digit numbers in the row direction, the numeral at the left side represents the place number, while the numeral at the right side represents the number of the state present in each place (piecewise time delay). In the above described expression (3), each of the single-digit numbers in the column direction represents the transition number, and in each of the two-digit numbers in the row direction, the numeral at the left side represents the place number while the numeral at the right side represents the number of the state present in each place (piecewise time delay).

A general form to the above described transition matrix a is shown in the following expression (4). As is obvious from the expression (4), when the number of states present in a certain process step is n, a small matrix of the portion relating to the process step is expressed by the square matrix of n by n as shown in the expression (4). The transition matrix a expressing the transition of all the process steps is expressed by setting the small matrix relating to the above described each process step at a proper position corresponding to the numbers in the row direction and in the column direction, and by making all of other elements "0".

[Mathematical Expression 3]

[Mathematical Expression 3]

(4)

$$a = \begin{bmatrix} & 1 & 2 & & n\text{-}1 & n & \\ 0 & 0 & \ldots & 0 & 0 & 0 & 0 \\ 1 & 0 & \ldots & 0 & 0 & 0 & 0 \\ 0 & 0 & \ldots & 0 & 0 & 0 & 0 \\ \vdots & & & & & & \vdots \\ 0 & 0 & \ldots & 1 & 0 & 0 & 0 \\ 0 & 0 & \ldots & 0 & 1 & 0 & 0 \\ 0 & 0 & \ldots & 0 & 0 & 1 & 0 \end{bmatrix} \begin{matrix} \text{1: EXPRESSION OF THE DELAY OF } n \text{ TIME} \\ 2 \\ \\ \\ \\ n\text{-}1 \\ n \end{matrix}$$

SMALL MATRIX IN THE CASE OF STATE NUMERAL OF 1
SMALL MATRIX IN THE CASE OF STATE NUMERAL OF 2
SMALL MATRIX IN THE CASE OF STATE NUMERAL OF 3

A general form to the above described incidence matrix b is shown in the following expression (5). Namely, when the number of states present in a certain process step is n, the small matrix of the portion relating to the process step is expressed by the matrix of n by 2 as shown in the expression (5). The numeral "1" of the element (1, 1) indicates that a token is input into the corresponding place, and the numeral "−1" of the element (n, 2) indicates that a token is output from the corresponding place. The incidence matrix b relating to all the steps is expressed by setting the small matrix of the above described each process step in a proper position corresponding to the numbers in the row direction and in the column direction, and by making all of the other elements "0".

[Mathematical Expression 4]

[Mathematical Expression 4]

$$b = \begin{pmatrix} 1 & 0 \\ 0 & 0 \\ 0 & 0 \\ \vdots & \vdots \\ 0 & 0 \\ 0 & 0 \\ 0 & -1 \end{pmatrix} \begin{matrix} \text{1: EXPRESSION OF } n \text{ TIME DELAY} \\ 2 \\ \\ \\ \\ n\text{-}1 \\ n \end{matrix}$$ (5)

The same thing as the state transition to the vector M(k+1) from the vector M(k) expressed by using the transition matrix a and the incidence matrix b shown by the above described expressions (2) and (3) with respect to the product A can be expressed with respect to the product B.

By expressing each process step by the transition matrix a and the incidence matrix b expressing the piecewise time delay in each process step for each product by using the Petri net model having the place in which the processing time is input, for each product as described above, it can be expressed that a token transfers in the place requiring a plurality of discrete piecewise times each time the discrete time k advances by 1, and as a result, the form to which the optimal control theory of the discrete-time system can be applied.

In this case, the Petri net model is constructed by allocating a plurality of processing times (discrete piecewise times) to one place, so that the production model can be expressed by only two matrix expressions of the transition matrix a and the incidence matrix b, and therefore, a Petri net model for control provided with one place for each discrete piecewise time does not have to be reconstructed. The number of control node can be made small as compared with the above described Petri net model provided with a place for each discrete piecewise time, and the model easy to use for an actual process can be made.

Thereby, considering the control to minimize the evaluation function (B) by setting the proper matrixes Q and R in accordance with the purpose of the control, the feedback gain matrix K for performing the state feedback control with the above described expression (C) can be obtained by the optimal control theory. As the calculation method for the feedback gain matrix K, for example, several methods described in (Control System Design by Numeric Value Analysis Method" Kazuaki Ando, et al., issued by Society of Instrument and Control Engineers, pp. 126 to 130, second impression of the first edition of 1993).

The evaluation matrixes Q and R are square matrixes having dimensions of the number of places and the number of transitions, respectively, and are for expressing the transient characteristics of a control and input energy of a transition operation as the evaluation function, respectively, and may be properly set in accordance with, the control purpose. For example, when importance is placed on the transient characteristics, the matrix Q having a large numeral value is set. When the input energy required for operation is suppressed to be small, the matrix R having a large numeral value is set.

Next, a concrete example of the sixth embodiment will be described hereinafter by dividing it into model construction, control rule construction, simulation and an implementation result example.

[Model Construction]

Figure 23:
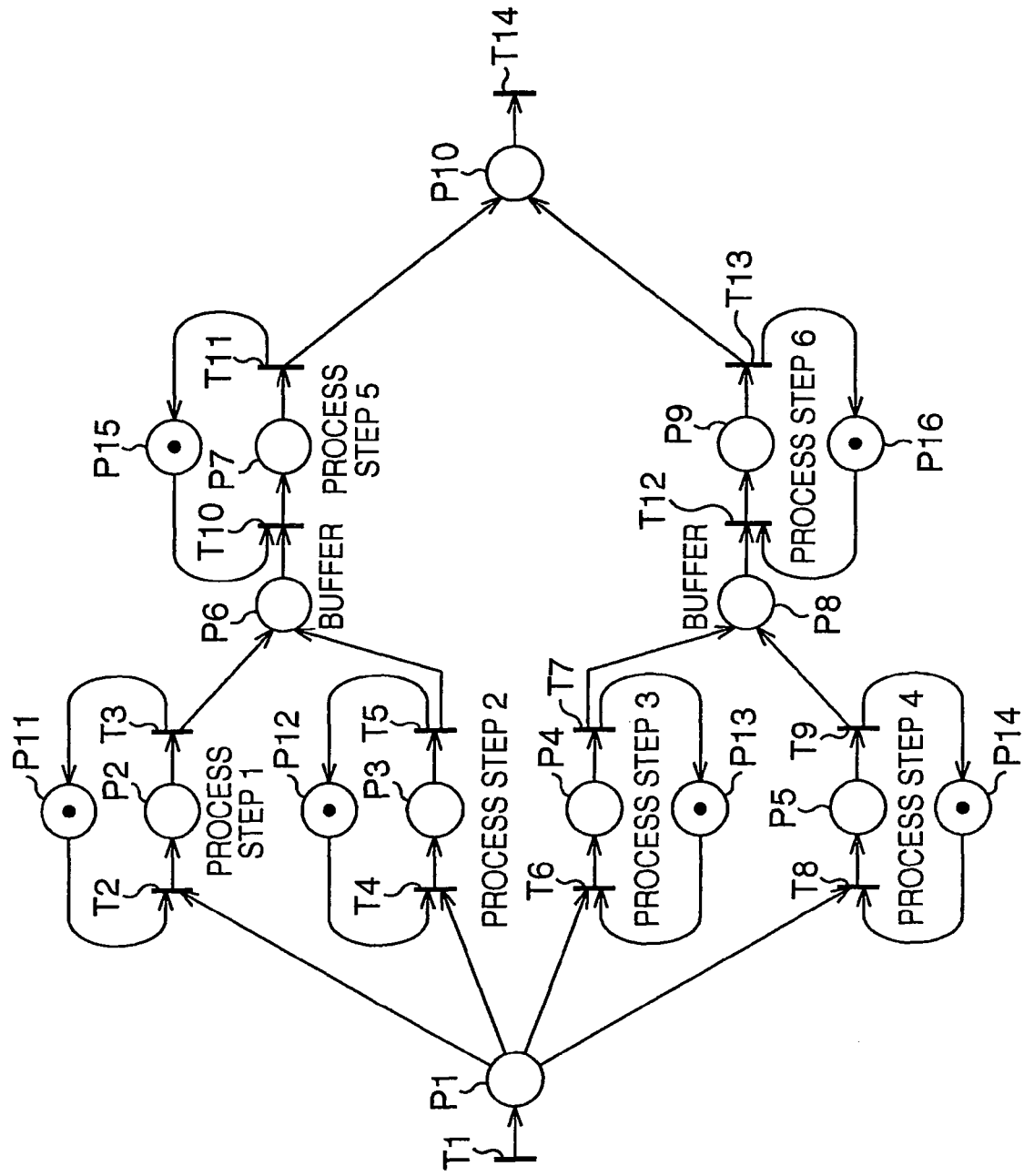
FIG. 23 is a diagram showing an example of the Petri net model.

FIG. 23 shows one example of a Petri net model of a manufacturing process composed of a plurality of process steps, and the discrete piecewise time ΔT is set at five minutes. The manufacturing process is constructed by a preprocessing process step composed of process steps 1, 2, 3 and 4, and a postprocessing process step composed of steps 5 and 6, and includes a preprocessing process step entrance side buffer shown by a place P1 (input place), a postprocessing process step entrance side buffer shown by places P6 and P8, and a carrying-out place shown by a place P10.

In this manufacturing process, the products processed in the preprocessing process step 1 or 2 are processed in the postprocessing process step 5, and the products processed in the preprocessing process step 3 or 4 are processed in the postprocessing process step 6, but some products can be processed by any of a plurality of combinations of the preprocessing process steps 1 to 4 and the postprocessing process steps 5 to 6, and therefore, there are 15 kinds of products in all. The following Table 2 shows the respective product types can be processed by the combinations of which preprocessing process steps and which postprocessing process steps.

TABLE 2

| PRODUCT TYPE No | (PREPROCESSING STEP No., POSTPROCESSING STEP No) |
|---|---|
| 1 | (1, 5) |
| 2 | (2, 5) |
| 3 | (3, 6) |
| 4 | (4, 6) |
| 5 | (1, 5) (2, 5) |
| 6 | (1, 5) (3, 6) |
| 7 | (1, 5) (4, 6) |
| 8 | (2, 5) (3, 6) |
| 9 | (2, 5) (4, 6) |
| 10 | (3, 6) (4, 6) |
| 11 | (1, 5) (2, 5) (3, 6) |
| 12 | (1, 5) (2, 5) (3, 6) |
| 13 | (1, 5) (3, 6) (4, 6) |
| 14 | (2, 4) (3, 6) (4, 6) |
| 15 | (1, 5) (2, 5) (3, 6) (4, 6) |

In FIG. 23, the places P11, P12, P13, P14, P15 and P16 are virtual places for restricting the processing capacities of the process steps 1 to 6, respectively, and by the number of capacity setting virtual tokens initially set in these virtual places, the number of products which can be processed at the same time in each processing process step is restricted. For example, the process step 1 is composed of the place P2, and one capacity setting virtual token is placed in the virtual place P11 as the initial state, whereby the processing capacity of the process step 1 is set at 1.

Namely, when the product is input via a transition T2 from the state where no product is in the process step 1, the capacity setting virtual token placed in the virtual place p11 is input at the same time, and the token expressing the product transfers to the place P2 from the place P1. Thereafter, at the same time when the token transfers to the place P6 via a transition T3, the capacity setting virtual token returns to the place P11, and the process step 1 is in the wait state again.

It is a known method to construct a Petri net model of a manufacturing process by setting the processing capacity of each process step by properly utilizing the virtual places for the process steps expressed by a plurality of places like this.

The example of FIG. 23 shows the process in which the capacities of the virtual places P11, P12, P13, P14, P15 and P16 from the process step 1 to the process step 6 are all 1. The place P1 for inputting a product and the place P10 for outputting a product are capable of accommodating 200 products at the maximum, and the buffers of the places P6 and P8 are both set to be capable of accommodating 20 products at the maximum.

Figure 24:
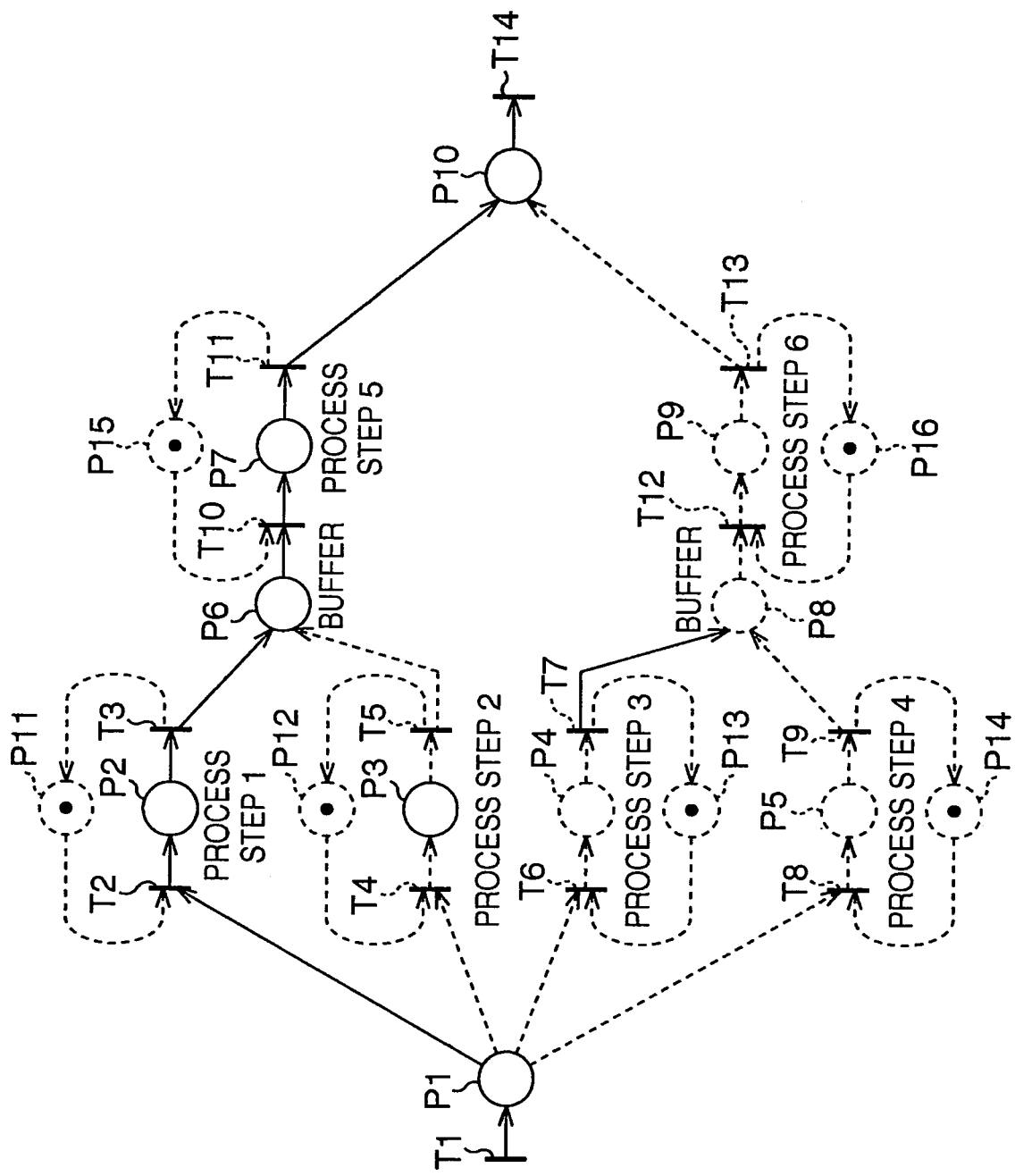
FIG. 24 is a diagram showing an example of a Petri net model for a product type No. 1.

The portion shown by the solid line in FIG. 24 shows a Petri net model for the product type No. 1 described in Table 2. By similarly constructing Petri net models for all product types, model construction shown in the flowchart in FIG. 18 is performed.

[Control Rule Construction]

Subsequently, the process of obtaining the feedback gain matrix K is described with the product type No. 1 taken as an example. The transition matrix a in the state equation in the expression (A) is obtained as the matrix of a size of 8 by 8 expressed by the following expression (6) for the Petri net model of the product type No. 1 shown in FIG. 24. In the expression (6), the numbers in the column direction represent place numbers, and of the numbers in the row direction, the numerals other than the numerals in the lowest order represent place numbers, while the numeral in the lowest order represents the number of the state (piecewise time delay) present in each place.

[Mathematical Expression 5]

[Mathematical Expression 5]

$$a = \begin{bmatrix} \begin{matrix} 1 & 2 & 6 & 7 & & & 10 \\ 1 & & & & & & \\ & 0 & 0 & & 0 & & \\ & 1 & 1 & & & & \\ & & & 1 & & & \\ & & & & 0 & 0 & 0 \\ & & & & 1 & 0 & 0 \\ 0 & & & & 0 & 1 & 1 \\ & & & & & & 1 \end{matrix} \end{bmatrix} \begin{matrix} 11 \\ 21 \\ 22 \\ 61 \\ 71 \\ 72 \\ 73 \\ 101 \end{matrix} \quad (6)$$

The incidence matrix b in the state equation of the expression (A) is obtained as the matrix of a size of 8 by 6 expressed by the following expression (7) for the Petri net model of the product type No. 1 shown in FIG. 24. In the expression (7), the numbers in the column direction represent transition numbers, and of the numbers in the row direction, the numerals other than the numerals in the lowest order represent place numbers, while the numeral in the lowest order represents the number of the state present in each place.

[Mathematical Expression 6]

[Mathematical Expression 6]

$$b = \begin{bmatrix} 1 & 2 & 3 & 10 & 11 & 14 \\ 1 & -1 & 0 & 0 & 0 & 0 \\ 0 & 1 & 0 & 0 & 0 & 0 \\ 0 & 0 & -1 & 0 & 0 & 0 \\ 0 & 0 & 1 & -1 & 0 & 0 \\ 0 & 0 & 0 & 1 & 0 & 0 \\ 0 & 0 & 0 & 0 & 0 & 0 \\ 0 & 0 & 0 & 0 & -1 & 0 \\ 0 & 0 & 0 & 0 & 1 & -1 \end{bmatrix} \begin{matrix} 11 \\ 21 \\ 22 \\ 61 \\ 71 \\ 72 \\ 73 \\ 101 \end{matrix} \quad (7)$$

The matrixes Q and R in the evaluation function expressed by the expression (B) are square matrixes which respectively have the dimensions of the number of piecewise time delays and the number of transitions in each process step, and therefore, are respectively set for a Petri net model of each product type.

For the product type No. 1, as the standard values in this manufacturing process, $$Q = 20 \times I(8) \quad (8)$$

and $$R = I(6) \quad (9)$$

are set. In the expressions (8) and (9), I(n) is the unit matrix of n order.

When the transition matrix a and the incidence matrix b, and the matrixes Q and R which define the evaluation function are fixed as described above, the feedback gain matrix K can be obtained by the optimal control theory in the discrete-time system.

Namely, when a solution P that satisfies the algebraic Riccati equation (10)

$$P = A^T P A - A^T P B (B^T P B + R)^{-1} B^T P A + Q \quad (10),$$

the feedback gain matrix K can be calculated from $$K = -(B^T P B + R)^{-1} B^T P A \quad (11).$$

Here, $(B^T P B + R)^{-1}$ is the inverse matrix of the matrix $(B^T P B + R)$. As the solution of the Riccati equation, various known methods are known as described in detail in the above described reference document.

The feedback gain matrix K for the Petri net model of the product type No. 1 thus calculated is given by the following expression (12). In the expression (12), the numbers in the column direction and the numbers in the row direction correspond to the numbers in the row direction and the numbers in the column direction in the expression (7) respectively.

[Mathematical Expression 7]

By similarly calculating the feedback gain matrixes K for all the product types, construction of the control rule shown in the flowchart in FIG. 11 is performed.

[Simulation]

Next, the simulation will be described along the flowchart shown in FIG. 21. First, the state vector M(0) in the initial state of the Petri net model is input, all the products to be input are input into the input place, and the value of the time k is initialized to zero (step S2101). Thereafter, when the state vectors of all the product types at the present time (time: k) are input (step S2102), and a new input product is input for each product type and are added to the state vector the final state vector M(k) in the present time is fixed. Further, the feedback gain matrix K is multiplied by the state vector M(k) for each product type, the operation vector u(k) can be calculated (step S2103).

For example, when in a certain time k, one token of the product type No. 1 is present in only the place P6, and no newly inputted product of the same product type is present, the final state vector M(k) for the product type No. 1 is $$M(k) = [0 0 0 1 0 0 0 0]' \quad (13).$$

In the expression (13), the sign expresses the transposed vector. Respective elements of the expression (13) express the numbers of tokens of the product type No. 1 corresponding to the state numbers 11, 21, 22, 61, 71, 72, 73 and 101 of the respective places P1, P2, P6, P7 and P10.

Next, the feedback gain matrix K given by the expression (12) is multiplied by the state vector M(k) of the expression (13) in accordance with the expression (C), and thereby, the operation vector u(k) is obtained as $$u(k) = [-0.249 \ -0.255 \ -0.343 \ 0.300 \ 0.002 \ 0.004]' \quad (14).$$

The respective elements in the expression (14) are the manipulative variables for the transitions T1, T2, T3, T10, T11 and T14, respectively.

The operation vector u(k) is also obtained similarly for all the product types. Then, for each transfer operation node, namely, each transition, transfer operation is executed by the transferable number in accordance with the sequence of the products obtaining larger manipulative variables in the positive value (step S2104).

For example, it is assumed that one token of the product type No. 1 is present in the place P6 at the time k, at the same time as this, one token of the product type No. 8 is also present in the place P6, and no tokens of the other product types are present in the place P6. In this case, the manipulative variable for the token of the product type No. 1 relating to the transition T10 is 0.300 from the expression (14). Meanwhile, the manipulative variable for the token of the product type No. 8 is similarly calculated. The transition matrix a of the product

[Mathematical Expression 7]

$$K = -\begin{pmatrix} 11 & 21 & 22 & 61 & 71 & 72 & 73 & 101 \\ -0.927 & -0.252 & -0.252 & -0.249 & -0.001 & 0.000 & 0.000 & 0.000 \\ 0.029 & -0.259 & -0.259 & -0.255 & -0.001 & 0.000 & 0.000 & 0.000 \\ 0.003 & 0.629 & 0.629 & -0.343 & -0.001 & 0.000 & 0.000 & 0.000 \\ 0.006 & 0.292 & 0.292 & 0.300 & -0.003 & 0.000 & 0.000 & 0.000 \\ 0.000 & 0.002 & 0.002 & 0.002 & 0.073 & 0.919 & 0.919 & -0.039 \\ 0.000 & 0.004 & 0.004 & 0.004 & 0.107 & 0.880 & 0.880 & 0.919 \end{pmatrix} \begin{matrix} 1 \\ 2 \\ 3 \\ 10 \\ 11 \\ 14 \end{matrix} \quad (12)$$

type No. 8 is expressed by the expression (15), the incidence matrix b is expressed by the expression (16), and the matrixes Q and R are expressed by (17) and (18). The feedback gain matrix K is as in the following expression (19) and the manipulative variable of the transition T10 is 0.361.

[Mathematical Expression 8]

[Mathematical Expression 8]

$$a = \begin{bmatrix}
1 & & 3 & 4 & & 6 & 7 & 8 & 9 & \\
1 & & & & & & & & & \\
& & 0 & 0 & 0 & & & & & \\
& & 1 & 0 & 0 & & & & & \\
& & 0 & 1 & 1 & & & & & \\
& & & & 0 & 0 & 0 & 0 & & \\
& & & & 1 & 0 & 0 & 0 & & \\
& & & & 0 & 1 & 0 & 0 & & \\
& & & & 0 & 0 & 1 & 1 & & \\
& & & & & & & & 1 & \\
& & & & & & 0 & 0 & 0 & \\
& & & & & & 1 & 0 & 0 & \\
& & & & & & 0 & 1 & 1 & \\
& & & & & & & & & 1 \\
& & & & & & & & 0 & 0 \\
& & & & & & & & 1 & 1 \\
& & & & & & & & & 1
\end{bmatrix} \begin{matrix} 11 \\ 31 \\ 32 \\ 33 \\ 41 \\ 42 \\ 43 \\ 44 \\ 61 \\ 71 \\ 72 \\ 73 \\ 81 \\ 91 \\ 92 \\ 101 \end{matrix}$$ (15)

[Mathematical Expression 9]

[Mathematical Expression 9]

$$b = \begin{bmatrix}
1 & 4 & 5 & 6 & 7 & 10 & 11 & 12 & 13 & 14 \\
1 & -1 & 0 & -1 & & & & & & 0 \\
& 1 & 0 & & & & & & & \\
& 0 & 0 & & & & & & & \\
& 0 & -1 & & & & & & & \\
& & & 1 & 0 & & & & & \\
& & & 0 & 0 & & & & & \\
& & & 0 & 0 & & & & & \\
& & & 0 & -1 & & & & & \\
& & & -1 & 0 & 0 & -1 & & & \\
& & & & & & 1 & 1 & & \\
& & & & & & 0 & 0 & & \\
& & & & & & 0 & -1 & & \\
& & & & & -1 & 0 & 0 & -1 & \\
& & & & & & & & 1 & 0 \\
& & & & & & & & 0 & -1 \\
& & & & & & -1 & 0 & 1 & -1
\end{bmatrix} \begin{matrix} 11 \\ 31 \\ 32 \\ 33 \\ 41 \\ 42 \\ 43 \\ 44 \\ 61 \\ 71 \\ 72 \\ 73 \\ 81 \\ 91 \\ 92 \\ 101 \end{matrix}$$ (16)

$$Q = 20 \times I(16)$$ (17)

$$R = I(10)$$ (18)

In the expressions (17) and (18), I(n) is the unit matrix of n order.

[Mathematical Expression 10]

[Mathematical Expression 10]

(19)

$$K = -\begin{pmatrix}
\text{11} & \text{31} & \text{32} & \text{33} & \text{41} & \text{42} & \text{43} & \text{44} & \text{61} & \text{71} & \text{72} & \text{73} & \text{81} \\
-0.925 & -0.131 & -0.107 & -0.107 & -0.056 & -0.033 & -0.023 & -0.023 & -0.105 & -0.001 & 0.000 & 0.000 & -0.023 \\
0.018 & -0.134 & -0.109 & -0.109 & -0.001 & -0.001 & -0.001 & -0.001 & -0.108 & 1.000 & 0.000 & 0.000 & -0.001 \\
0.001 & 0.116 & 0.663 & 0.663 & 0.000 & -0.002 & -0.001 & -0.001 & -0.310 & -0.001 & 0.000 & 0.000 & -0.001 \\
0.013 & 0.000 & 0.000 & 0.000 & -0.056 & -0.032 & -0.023 & -0.023 & 0.000 & 0.001 & 0.000 & 0.000 & -0.022 \\
0.000 & 0.001 & 0.002 & 0.002 & 0.065 & 0.137 & 0.721 & 0.721 & 0.002 & -0.007 & -0.002 & -0.002 & -0.250 \\
0.002 & 0.208 & 0.354 & 0.354 & -0.001 & -0.003 & -0.003 & -0.003 & 0.361 & -0.003 & 0.000 & 0.000 & -0.003 \\
0.000 & 0.002 & 0.003 & 0.003 & 0.005 & 0.009 & 0.014 & 0.014 & 0.003 & 0.070 & 0.921 & 0.921 & 0.014 \\
0.001 & 0.003 & 0.003 & 0.003 & 0.127 & 0.249 & 0.471 & 0.471 & 0.003 & -0.014 & -0.003 & -0.003 & 0.482 \\
0.000 & 0.002 & 0.002 & 0.002 & 0.011 & 0.020 & 0.035 & 0.035 & 0.002 & 0.026 & -0.033 & -0.033 & 0.036 \\
0.000 & 0.005 & 0.007 & 0.007 & 0.020 & 0.038 & 0.065 & 0.065 & 0.007 & 0.126 & 0.851 & 0.851 & 0.066
\end{pmatrix}$$

$$\begin{pmatrix}
91 & 92 & 101 & \\
0.000 & 0.000 & 0.000 & 1 \\
0.000 & 0.000 & 0.000 & 4 \\
0.000 & 0.000 & 0.000 & 5 \\
0.000 & 0.000 & 0.000 & 6 \\
-0.002 & -0.002 & -0.001 & 7 \\
0.000 & 0.000 & 0.000 & 10 \\
-0.033 & -0.033 & -0.036 & 11 \\
-0.004 & -0.004 & -0.003 & 12 \\
0.921 & 0.921 & -0.036 & 13 \\
0.851 & 0.851 & 0.888 & 14
\end{pmatrix}$$

Here, the transition T10 is assumed to be capable of transferring one token to the place P7 by transfer operation, namely, firing. In this case, one capacity setting virtual token is present in the virtual place P15 at the time k, and therefore, it ultimately becomes possible to fire the transition T10 for only the token of the product type No. 8. Since the token of the product type No. 8 is not present in the other places at the time k, transitions other than the transition T10 cannot be fired irrespective of positive and negative of the manipulative variable.

Therefore, the final operation vector u(k) for the product type No. 8 is $$u(k)=[0000010000]' \quad (20),$$

and, only the transition T10 is fired. As a result, the state vector at the time k for the product type No. 8 is updated from $$M(k)=[0000000010000000]' \quad (21),$$

to the state vector at the time k+1

$$M(k+1)=[0000000001000000]' \quad (22).$$

If the same calculation is performed for all transitions of all product types, the state vectors M(k+1) at the time k+1 for the all product types are calculated. Thereafter, the time is advanced (step S2105), and thereafter, it is determined whether simulation of each step is finished or not (step S2106). When it is not finished, the flow returns to the processing in step S2102. When it is finished, the simulation result is set as the production schedule (step S2107).

As described above, in this embodiment, in addition to the effect of the above described fourth embodiment, the Petri net model is constructed to include a plurality of piecewise time delays in one place, so that the mathematical expression model can be expressed by only the two matrixes that are the transition matrix and the incidence matrix, and therefore, the Petri net model provided with one place for each piecewise time delay does not have to be constructed. The number of control node can be made smaller as compared with the Petri net model provided with one place for each piecewise time delay, and the Petri net model can be made easy for use in the actual process.

In this embodiment, the explanation is made by citing a Petri net model as an example, but the present invention is also applicable to the other graph models, for example, a directed graph and an undirected graph. For example, in a directed graph, the place in the above described Petri net model is expressed by a point and the transition is expressed by a line with an arrow. The line with an arrow is the transfer operation node for transferring the product, namely, token from point to point, and functions as a transfer path. The arrow shows the direction in which the token transfers from a line to a point, or from a point to a line.

In the Petri net model, the number of products which can be processed at the same time in each processing process step is restricted by the number of capacity setting virtual tokens initially set in the virtual place provided in each process step, but in an ordinary graph model, the virtual place does not exist, and the processing capacity in each process step is controlled on software.

When the present invention is applied to an ordinary graph model having such characteristics, a series of operations are the same as the operations in the above described Petri net model, and the detailed description of it will be omitted here.

A seventh embodiment described as follows relates to the above described third embodiment.

Seventh Embodiment

As shown in FIG. 3, the production schedule creation device of this embodiment is also configured by the production simulator 300, the mathematical expression model 321, the optimization calculation device 330 and the like.

Hereinafter, the seventh embodiment will be described with reference to FIGS. 25 to 27.

In the production schedule creation device of this embodiment, an optimization problem of a process A operation schedule matched with a process B operation schedule is assumed to be dealt with under a given input sequence and plant production constraint in a manufacturing process from a process A to a process B. However, this is only one example, and the production schedule creation device of this embodiment is applicable and is especially effective on the occasion of creating an operation schedule in upper process steps while keeping a number of constraints imposed on lower process steps.

In the operation schedule in this case, it is the first object to maximize throughput of the entire plant. It is the second object to minimize semi-finished product residence time on the way to a process step. Namely, after a semi-finished product processed by the process A is carried to the place of the process B by a conveying device or the like, it is temporarily placed in a storage space until a semi-finished product inputted in the intermediate buffer at present is completely finished, and a waiting time occurs here. If the waiting time is long, the temperature reduction of the semi-finished product becomes large to cause the problem in the quality of the product. Therefore, in order to suppress such temperature reduction, it is necessary to minimize the input waiting time on the storage space.

It takes time to carry the semi-finished products processed by the process A to the process B by the conveying device. On this occasion, depending on the kind of the product, processing of the secondary process is applied to the products in the part-way process from the process A to the process B in some cases.

The processing time of a semi-finished product in the process B sometimes differs for each semi-product. On the other hand, it is necessary to input the next semi-finished product before the intermediate buffer at the entrance of the process B becomes completely vacant, as described above. Therefore, when the operation schedule of the process A is created, it is necessary to decide not only the processing sequence in the process A but also the processing time accurately in consideration of the fact that the processing time differs for each semi-finished product, necessity of continuation and minimization of the residence time of each semi-finished product.

Figure 25:
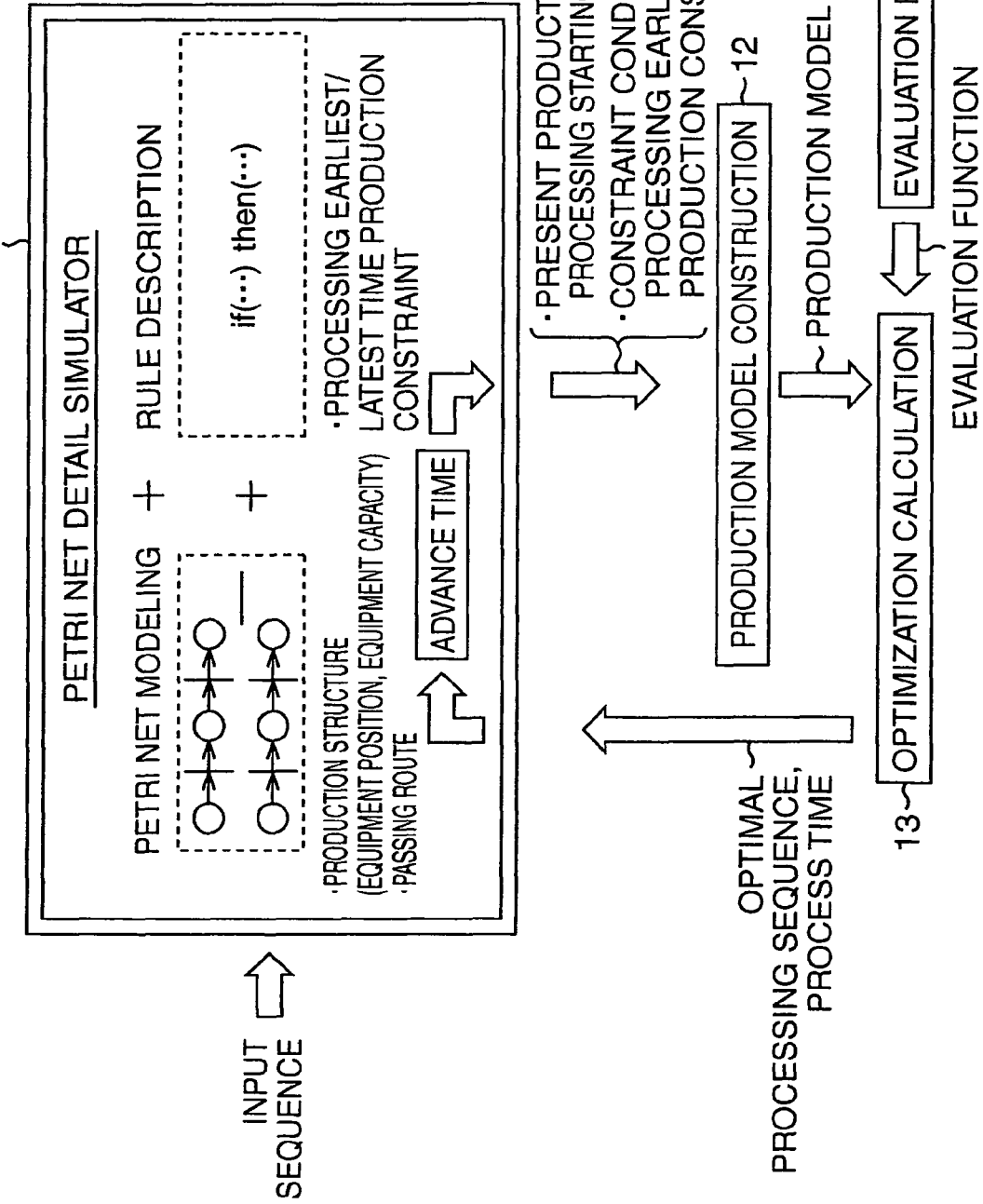
FIG. 25 shows an eighth embodiment, and is a block-diagram showing a configuration of a main part of a production schedule creation device in a manufacturing process.
Figure 26:
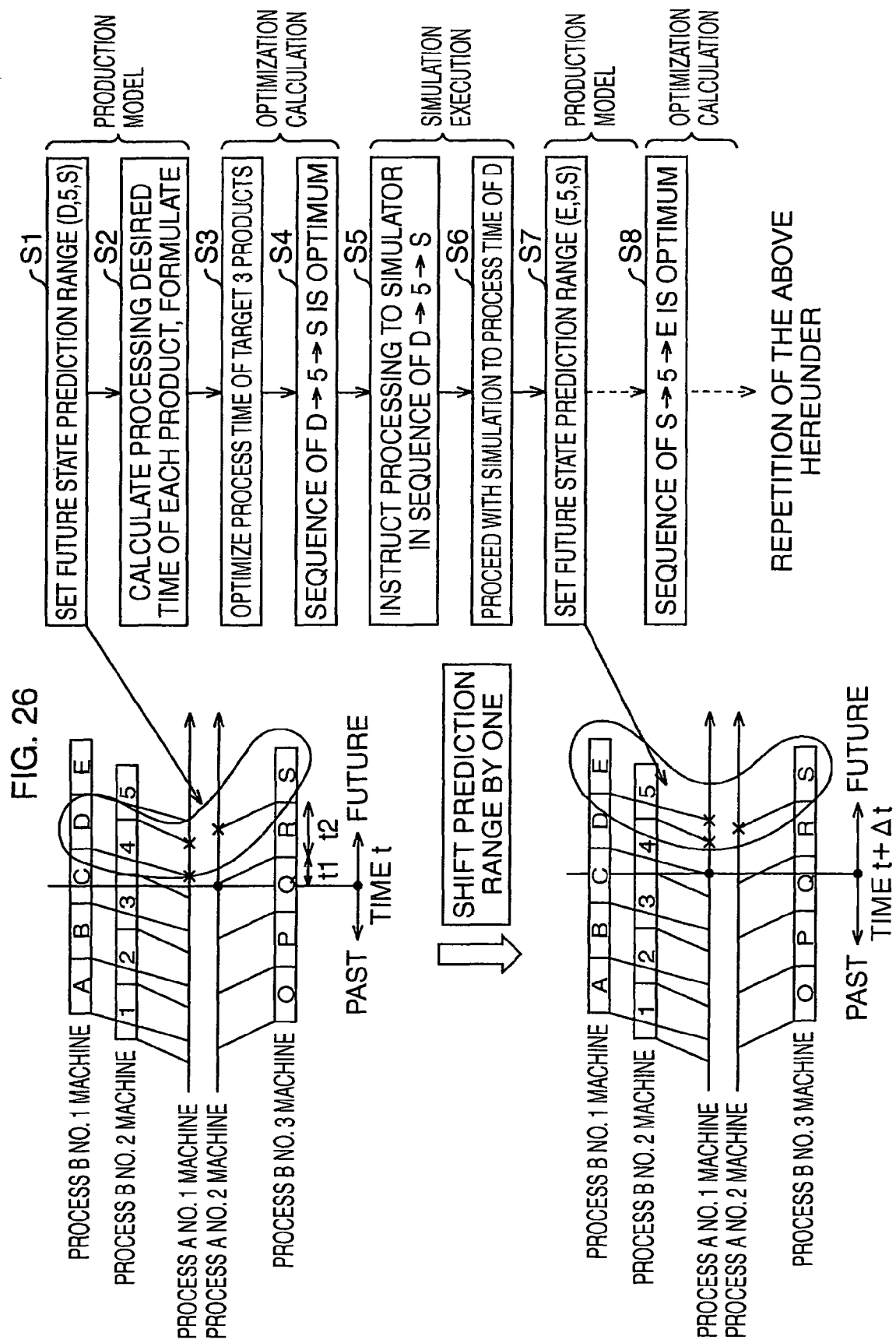
FIG. 26 is a diagram for explaining operations performed by the production schedule creation device (production schedule creation method according to this embodiment)
Figure 27:
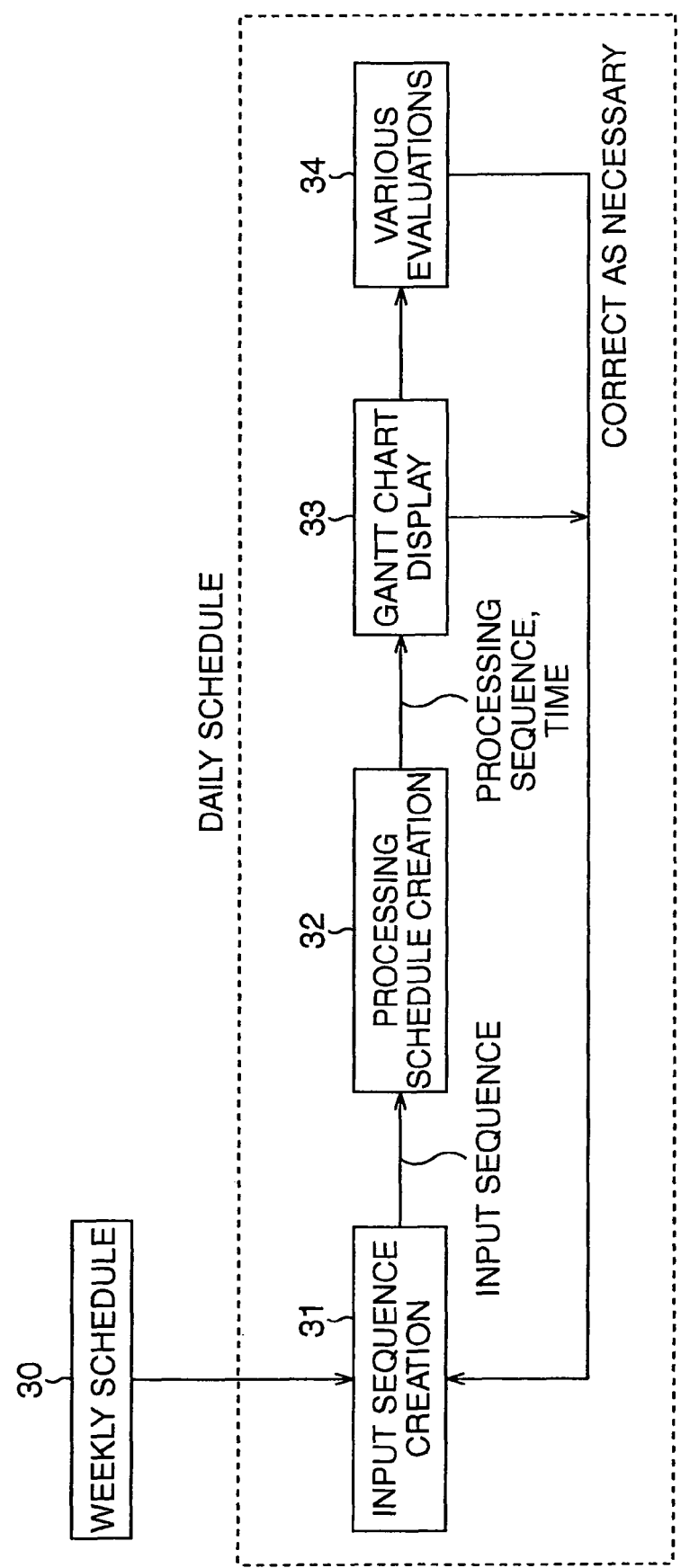
FIG. 27 is a diagram showing location of a production schedule creation device in a weekly and daily schedule system.

FIG. 25 is a block diagram showing a schematic configuration of the production schedule creation device according to this embodiment, FIG. 26 is a diagram for explaining an outline of the processing performed by the production schedule creation device according to this embodiment, and FIG. 27 is a diagram showing location of the processing schedule creation device according to this embodiment in the scheduling system. First, location of the production schedule creation device according to this embodiment will be described by using FIG. 27.

As shown in FIG. 27, on creating a daily operation schedule, the input sequence of each semi-finished product to the process B is first decided based on a weekly schedule 30 which is previously set in an input sequence creation part 31. Here, it is at least determined that after processed in which device in the process A, the semi-finished products are processed in what sequence in which device of the process B.

The schedule creation part 32 of this embodiment obtains the operation schedule in the process A, namely, the input sequence and process time in the process A from information of the input sequence of the process B supplied from the input sequence creation part 31 under the input sequence created by the input sequence creation part 31 and various plant production constraints.

In this schedule creation part 32, the processing sequence and the process time in the process A are optimized based on the concept of a so-called model predictive control by the combination, which is totally new and not found in the prior arts, of a discrete event simulator by a Petri net graphically modeling a production structure (equipment disposition in the plant and its connecting relationship, equipment capacity, passing routes of semi-finished products, and the like), and an LP (linear programming) frequently used as the solution for the static scheduling problem.

The operation schedule (information of the processing sequence and the process time) in the process A obtained in the schedule creation part 32 is given to a display part 33, and is displayed in a form of a Gantt chart, for example; In various kinds of evaluation part 34, the obtained operation schedule is evaluated from various points of view, and if the satisfactory result is not obtained, the input sequence of each semi-finished product is corrected as necessary. Then, the operation schedule is created once again in the schedule creation part 32.

Next, an outline of the processing performed by the above descried schedule creation part 32 will be described by using FIG. 26. In the example of FIG. 26, a No. 1 machine and a No. 2 machine of the process A, and a No. 1 machine, a No. 2 machine and a No. 3 machine of the process B are taken as examples. In the example in FIG. 26, it is decided by the input sequence creation part 31 in FIG. 27 that semi-finished products shown by English characters "A, B, C, D, E" in the No. 1 machine of the process A and the No. 1 machine of the process B are processed in this sequence, semi-finished products shown by numerals "1, 2, 3, 4, 5" in the No. 2 machine of the process B are processed in this sequence, and semi-finished products shown by English characters "O, P, Q, R, S" in the No. 2 machine of the process A and the No. 3 machine of the process B are processed in this sequence.

The schedule creation part 32 decides the processing sequence and process time of the process A which optimize a predetermined evaluation function which is set to maximize the entire throughput and minimize waiting time after estimating the waiting time of semi-finished products on the storage space that is a future production state, and deceleration amount of semi-finished product processing speed at each determination time (each time the processing event occurs) of the simulation of the process time, based on the concept of the model predictive control, under the above input sequence. In this case, the estimation range of the future production state is set as one semi-finished product to be processed in each process B.

Namely, it is assumed that the processing event of a semi-finished product R occurs at the time t in the simulation as shown in, the upper part of FIG. 26, for example. The semi-finished product R is carried by the conveying device after processed by the No. 2 machine of the process A, and reaches the No. 3 machine of the process B3 after a time t1 (the time t1 is assumed to include processing time in the secondary processing). Then, the processing of continuous processing is performed for the time t in the No. 3 machine of the process B. When such a processing event of the semi-finished product R occurs, one semi-finished product is set for each process B as the prediction range of the future production state first in step S1. In this case, a semi-finished product D with respect to the No. 1 machine of the process B, a semi-finished product 5 with respect to the No. 2 machine of the process B, and a semi-finished product S with respect to the No. 3 machine of the process B are set as the prediction ranges.

Next, in step S2, processing completion desired time of each of the semi-finished products (D, 5, S) in the set prediction range is calculated, and a production model based on the production constraint is formulated. Here, the processing completion desired time is the time indicating what time the semi-finished product should be processed from the process. A to cause the semi-finished product to reach the process B just at the processing completion time of the previous semi-finished product. This is easily obtained by subtracting the conveying time of the semi-finished product (including the secondary process processing time) from the processing completion time of the previous semi-finished product already processed. The processing completion desired time of each of the semi-finished products (D, 5, S) in the prediction range at present is shown by a cross in the upper part of FIG. 26.

After the production model is constructed by setting the prediction range of one semi-finished product for each process B when a processing event occurs at a certain time t as above, optimization calculation of the process time is performed for three semi-finished products (D, 5, 3) in the prediction range by using the constructed production model, and a predetermined evaluation function set in advance. In this case, it is assumed that the result that the sequence of the semi-finished product D→the semi-finished product 5→the semi-finished product S is optimum is obtained in step S4 by the optimization calculation.

Thus, in the next step S5, processing instruction is issued to the simulator of the Petri net in the sequence of the semi-finished product D→the semi-finished product 5→the semi-finished product S. In response to this, the simulator proceeds with simulation until the process time t+Δt of the semi-finished product D in step S6. This state is shown in the lower part of FIG. 26. In this manner, a processing event occurs again, and therefore, a production state of one semi-finished product is set for each process B as an prediction range of a future production state from the processing event occurrence time t+Δt of the semi-finished product D. In this case, the same products are set as the previous time with respect to the No. 2 machine and the No. 3 machine of the process B, but a semi-finished product E is newly set as the prediction range with respect to the No. 1 machine of the process B1 in which the processing event occurs.

As for the newly set prediction range, the construction of the production model and the optimization calculation are also performed as in the previous time. When the desired process time of the semi-finished product E is obtained in the construction of the production model, the semi-finished product D directly before the semi-finished product E is already processed and simulated, and therefore, the processing completion time of the semi-finished product D can be obtained from the simulator of the Petri net. Thereby, the desired process time of the semi-finished product E is obtained by subtracting the conveying time of the semi-finished product E from the processing completion time of the semi-finished product D.

In the optimization calculation here, it is assumed that the result that the sequence of the semi-finished product S→the semi-finished product 5→the semi-finished product E is optimum is obtained. In this case, the simulation in the simulator is caused to proceed until the process time of the semi-finished product S by issuing the processing instruction to the simulator of the Petri net in the sequence of the semi-finished product S→the semi-finished product 5→the semi-finished product E. Thereafter, the processing of partially performing simulation (optimization of the processing sequence and process time) by dividing the future prediction range by one semi-finished product of each process B is similarly performed each time the processing event occurs.

The example in FIG. 26 shows the result of the simulation in which all the semi-finished products are processed just at the desired process times, but the result that they are processed just at the desired process times cannot be always obtained. If the process time is delayed from the desired process time, continuity of the semi-finished products in the process B is cut off, and therefore, in order to keep continuity, it is necessary to make the processing time of the previous semi-finished product long (decelerate the processing speed). However, this operates in the direction to reduce the entire throughput.

On the other hand, if the process time is advanced from the desired process time, it is possible to enhance the entire throughput, but this works in the direction to increase the residence time of the semi-finished products in the storage space, and the temperature reduction of the semi-finished products is caused during waiting time. Therefore, in reality, optimum tradeoff of both of them is designed by selecting the process time at which the obtained evaluation value becomes the best as a result of optimization calculation by using the evaluation function considering both the entire throughput and residence time.

Next, the schematic configuration of the schedule creation part 32 which performs the processing as shown in FIG. 26 will be described by using FIG. 25. In FIG. 25, reference numeral 11 denotes a discrete event simulator by the Petri net, and is configured by a graphical production structure model by the Petri net, and rule description that cannot be graphically expressed. Here, examples of the rule include processing earliest time indicating the limit of a time at which the semi-finished product can be processed the earliest, processing latest time indicating the limit at which the semi-finished product can be processed the latest, interference conditions of a plurality of processes A and the like.

Hereinafter, a concrete example of the mathematical expression model will be described. Since as described above, the processing speed of each of the semi-finished products in the process B is allowed to be changed in only a certain small range, and the waiting time in the storage space has the upper and lower limits, in order to satisfy all of them, the processing termination earliest time and latest time of the process A is set for each semi-finished product.

In order to perform processing continuously with the same machine of the process A, intervals need to be secured at least in the processing time of the process A, and in order to perform processing with another machine of the process A, time intervals required by the constraint of the ability of the conveying device for charging the raw material into the process A needs to be secured. Therefore, the condition that the interval of, for example, 45 minutes with respect to the same machine and an interval of, for example, 20 minutes with respect to another machine have to be allowed is imposed as the production constraint.

Reference numeral 12 denotes a production model construction part, which sets the future prediction range of one semi-finished product for each process B by combining information of the processing termination earliest and latest times and production constraint set in the above described simulator 11, and the present production situation given as the result of performing simulation by the simulator 11 (information that which semi-finished product started processing in the past and what time is its processing completion time), and constructs the production model in that range. The production model is constructed by formulation of the mathematical model as will be described hereunder.

Figure 28:
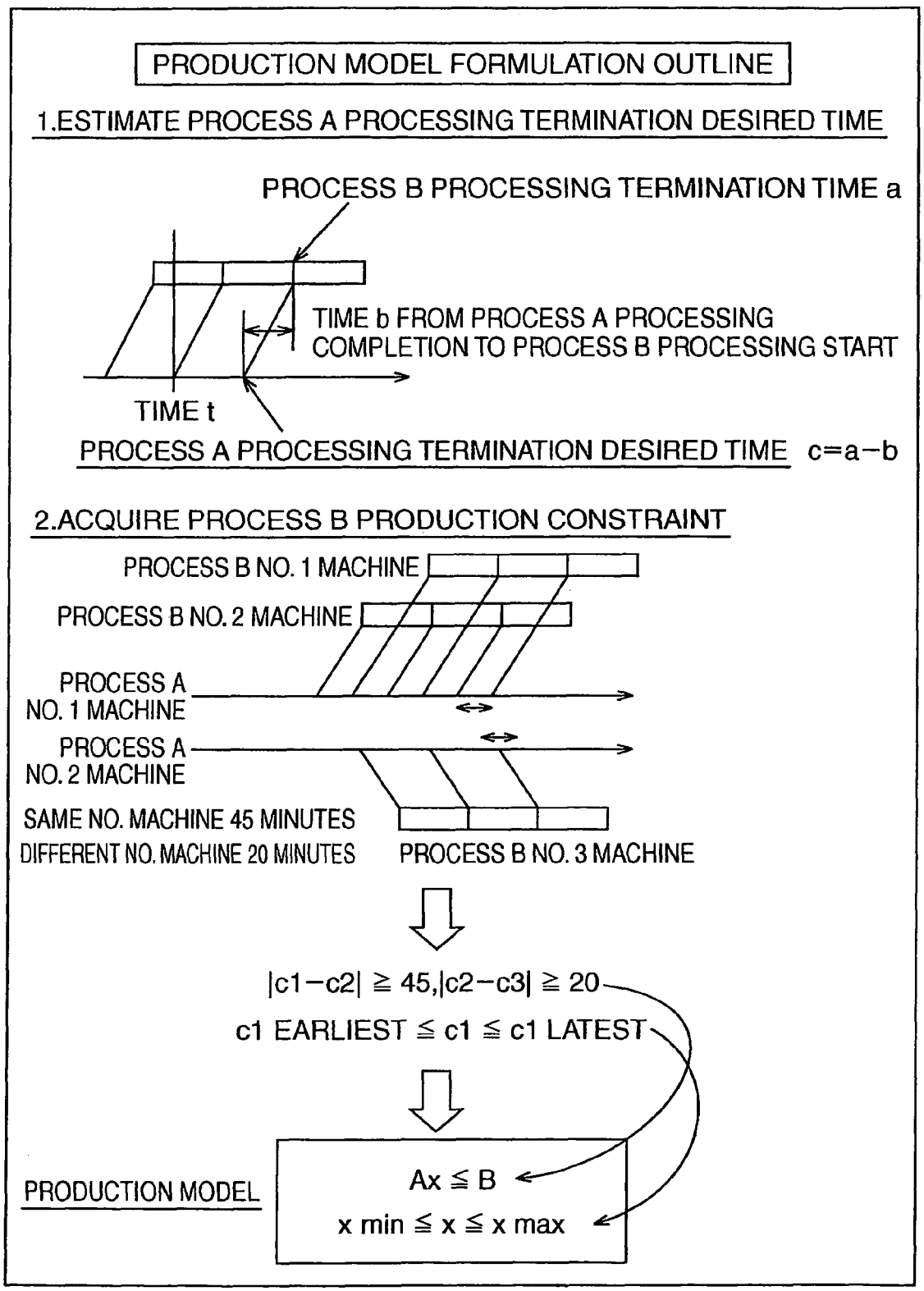
FIG. 28 is a diagram explaining formulation of a production model.

Here, formulation of the production model will be described. As above described, FIG. 28 is a diagram showing an outline of formulation of the production model. As shown in FIG. 28, when the processing termination event of the process A of a certain semi-finished product occurs at the time t on the simulation, a processing time for one semi-finished product is set as the prediction range of the future production state for each process B from the time t, and from the present production state obtained by the simulator 11, the processing termination desired time of the process A of each of the semi-finished product in the prediction range is calculated. The processing completion-time-of the previous semi-finished product obtained by the simulator 11 is set as a, and the predicted time from the processing termination of the process A to processing start of the process B of the semi-finished product is set as b, the processing termination desired time of the process A is easily obtained by the calculation of c=a−b.

Next, the information of the processing termination earliest and latest times of the process A and the production constraint of the process B is taken by the simulator 11, and is formulated. When a processing termination time of the process A to the No. 1 machine of the process B is set as C1, a processing termination time of the process A to the No. 2 machine of the process B is set as C2, and a processing termination time of the process A to the No. 3 machine of the process B is set as C3, the production constraint of the process B is expressed as $$|c1-c2| \geq 45, |c2-c3| \geq 20,$$

and conditions of the processing termination earliest time and latest time of the process A are expressed as $$c1\ \text{earliest} \leq c1 \leq c1\ \text{latest}$$

$$c2\ \text{earliest} \leq c2 \leq c2\ \text{latest}$$

$$c3\ \text{earliest} \leq c3 \leq c3\ \text{latest}$$

Further, when these expressions are modified, the production model can be expressed by the simple linear equations $$Ax \leq B$$

$$Xmin \leq X \leq Xmax.$$

x is matrix expression of the processing termination time of the process A of each process B, A and B are predetermined matrices, xmin and xmax are matrix expressions of the processing termination earliest time and latest time of the process A to each process B, respectively.

Figure 29:
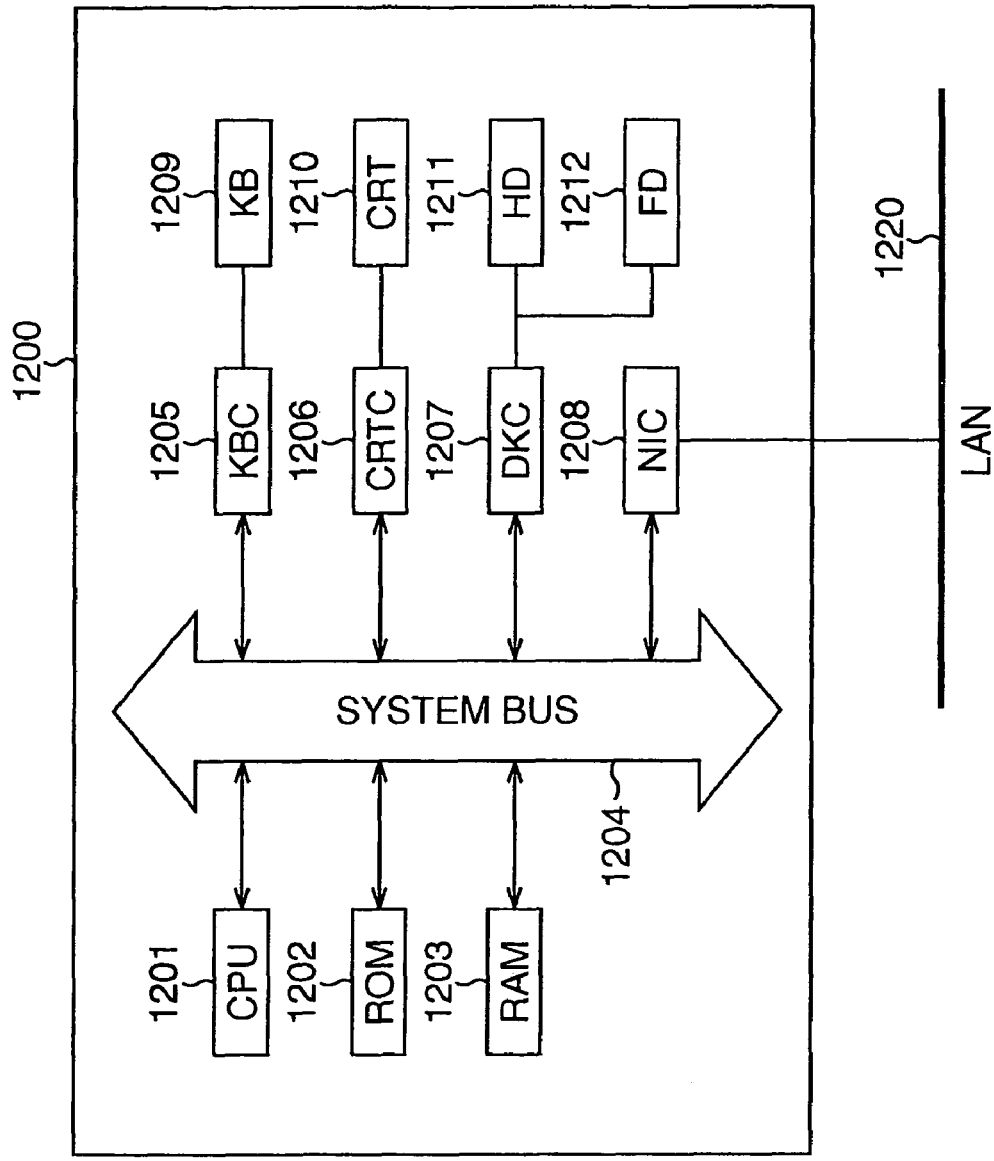
FIG. 29 is a block diagram showing one example of a computer system capable of configuring the production schedule creation device of the present invention.

FIG. 29 is a block diagram showing one example of a computer system capable of configuring the production schedule creation device of each of the above described embodiments. In the drawing, reference numeral 1200 denotes a computer PC. The PC 1200 includes a CPU 1201, and executes device control software stored in a ROM 1202 or a hard disk (HD) 1211, or supplied from a flexible disk drive (FD) 1212, and collectively controls each device connected to a system bus 1204.

Each function means of this embodiment is configured in accordance with a program stored in the CPU 1201 of the above described PC 1200, the ROM 1202 or the hard disk (HD) 1211.

Reference numeral 1203 denotes a RAM, which functions as a main memory, a work area and the like of the CPU 1201.

Reference numeral 1205 is a key board controller (KBC), which performs control of inputting a signal inputted from a key board (KB) 1209 into a system main body. Reference numeral 1206 denotes a display controller (CRTC), which performs display control on a display device (CRT) 1210. Reference numeral 1207 denotes a disk controller (DKC), which controls access with the hard disk (HD) 1211 and the flexible disk (FD) 1212 that store a boot program (actuation program: a program that starts execution (operation) of hardware and software of a personal computer), a plurality of applications, an edit file, a user file, a network management program and the like.

Reference numeral 1208 is a network interface card (NIC), which exchanges data in both directions with a network printer, other network devices, or other PCs via a LAN 1220.

The present invention may be applied to a system composed of a plurality of devices, or may be applied to a device composed of one device.

It goes without saying that the object of the present invention may also be accomplished by supplying a system or an apparatus with a storage medium in which a program code of software, which realizes the functions of the above described embodiments, is stored, and causing a computer (or CPU or MPU) of the system or apparatus to read out and execute the program code stored in the storage medium.

In this case, the program code itself read from the storage medium realizes the functions of the above described embodiments, and hence the program code and a storage medium on which the program code is stored constitute the present invention.

As examples of the storage medium for supplying the program code, for example, a flexible disk, a hard disk, an optical disk, a magnetic-optical disk, a CD-ROM, a CD-R, a magnetic tape, a nonvolatile memory card, a ROM and the like can be used.

Further, it is to be understood that the functions of the above described embodiments may be accomplished not only by executing the program code read out by a computer, but also by causing an OS (operating system) or the like which, operates on the computer to perform a part or all of the actual operations based on instructions of the program code.

Further, it is to be understood that the functions of any of the above described embodiments may be accomplished by writing the program code read out from the storage medium into a memory provided in an expansion board inserted into a computer or memory provided in an expansion unit connected to the computer and then causing a CPU or the like provided in the expansion board or the expansion unit to perform a part or all of the actual operations based on instructions of the program code.

In each of the above described embodiments, the example in which the production schedule in the above described production process is created from the simulation result is described, but the present invention is also applied to the case where control of the production process is performed based on the simulation result.

INDUSTRIAL APPLICABILITY

According to the present invention, the processing of detecting information of the production state and production constraint at the present time of the simulation from the simulator each time an event requiring a production instruction occurs during execution of detailed simulation, calculating an optimum production instruction by the optimization method based on the above described detected information and the previously fixed evaluation index, causing the detailed simulation thereafter caused to proceed based on the above described calculation result, and calculating the optimum production instruction again at the time of occurrence of the next event requiring a production instruction is repeatedly performed, and therefore, the optimum production instruction can be obtained by performing the detailed simulation itself only once. Further, since the optimum production instruction is calculated by linking the simulator, the mathematical expression model and the optimization device, and the schedule is created by performing the simulation of the above described calculation result, the schedule which is executable even when the production constraint conditions are complicated can be created. The schedule which makes the desired evaluation index the best can be created, and the schedule can be created within a practical time by reducing the calculating time. Thereby, both optimality and executability can be secured. Time and efforts on the occasion of creating the schedule in accordance with the state of the target production process can be significantly reduced. Further, when the scale of the target of which schedule is to be created is large, an accurate production schedule can be created at a high speed with high accuracy.

What is claimed is:

1. A computer-based system for production schedule creation, comprising:
    a production simulator that simulates a production process expressing a production state and a production constraint of the production process;
    a mathematical expression model holding device that holds a mathematical expression model which uses a state equation created by acquiring information relating to creation of a production schedule to which attention is paid, and is a mathematical expresion model expressing the production state and the production constraint of the above described production process in a mathematical expression; and
    an optimization calculation device that performs optimization calculation processing by using a predetermined evaluation function for the above described mathematical expression model to calculate a production instruction for said production simulator,
    wherein the production schedule in the above described production process is created from a simulation result obtained by repeating processing of calculating a feedback gain by the above described optimization calculation processing, calculating the production instruction by using the feedback gain and the production state to supply the production instruction to said production simulator to proceed with simulation, obtaining a new production state, and calculating a new production instruction based on the new production state.

2. The computer-based system for production schedule creation according to claim 1,
    wherein said production simulator is a production simulator of a discrete system.

3. The computer-based system for production schedule creation according to claim 2,
    wherein said production simulator of the discrete system constructs a simulator by using a graph model, and the above described state equation is a state equation of the graph model.

4. The computer-based system for production schedule creation according to claim 3,
    wherein when the feedback gain is calculated by the above described optimization calculation processing, and the production instruction is calculated by using the feedback gain and the production state, an operation vector for a transfer operation node of each of products is obtained from the feedback gain and a state vector expressing an in-process product progress state, and thereafter, in accordance with sequence of products obtaining larger manipulative variables in positive value of the obtained operation vectors, an operation is made for each transfer operation node to transfer each of the products by a transferable number.

5. The computer-based system for production schedule creation according to claim 2,
wherein said production simulator of the discrete system constructs a simulator by using a graph model, and the above described state equation is a state equation using an incidence matrix and a transition matrix which are expressed in accordance with piecewise time delays proportional to processing times.

6. The computer-based system for production schedule creation according to claim 5,
wherein when the feedback gain is calculated by the above described optimization calculation processing, and the production instruction is calculated by using the feedback gain and the production state, an operation vector for a transfer operation node of each of products is obtained from the feedback gain and a state vector expressing an in-process product progress state, and thereafter, in accordance with sequence of the products obtaining larger manipulative variables in positive value of the obtained operation vectors, an operation is made for each transfer operation node to transfer each of the products by a transferable number.

7. The computer-based system for production schedule creation according to claim 2,
wherein said production simulator of the discrete system constructs a simulator by using a Petri net model, and the above described state equation is a state equation of the Petri net model.

8. The computer-based system for production schedule creation according to claim 7,
wherein when the feedback gain is calculated by the above described optimization calculation processing, and the production instruction is calculated by using the feedback gain and the production state, an operation vector for a transfer operation node of each of products is obtained from the feedback gain and a state vector expressing an in-process product progress state, and thereafter, in accordance with sequence of products obtaining larger manipulative variables in positive value of the obtained operation vectors, an operation is made for each transfer operation node to transfer each of the products by a transferable number.

9. The computer-based system for production schedule creation according to claim 2,
wherein said production simulator of the discrete system constructs a simulator by using a Petri net model, and the above described state equation is a state equation using an incidence matrix and a transition matrix which are expressed in accordance with piecewise time delays proportional to processing times.

10. The computer-based system for production schedule creation according to claim 9,
wherein when the feedback gain is calculated by the above described optimization calculation processing, and the production instruction is calculated by using the feedback gain and the production state, an operation vector for a transfer operation node of each of products is obtained from the feedback gain and a state vector expressing an in-process product progress state, and thereafter, in accordance with sequence of products obtaining larger manipulative variables in positive value of the obtained operation vectors, an operation is made for each transfer operation node to transfer each of the products by a transferable number.

11. The computer-based system for production schedule creation according to claim 1,
wherein the above described optimization calculation processing utilizes linear quadratic control, and calculates the above described feedback gain to minimize an evaluation function expressed by using a predetermined evaluation matrix.

12. A method for creating a production schedule by a production schedule creation device having a production simulator that simulates a production process expressing a production state and a production constraint of the production process, a mathematical expression model holding device that holds a mathematical expression model which uses a state equation created by acquiring information relating to creation of a production schedule to which attention is paid, and is a mathematical expression model expressing the production state and the production constraint of the above described production process in a mathematical expression, and an optimization calculation device that performs optimization calculation processing by using a predetermined evaluation function for the above described mathematical expression model to calculate a production instruction for the above described production simulator,
wherein the production schedule in the above described production process is created from a simulation result obtained by repeating processing of calculating a feedback gain by the above described optimization calculation processing, calculating the production instruction by using the feedback gain and the production state to supply the production instruction to the above described production simulator to proceed with simulation, obtaining a new production state, and calculating a new production instruction based on the new production state.

13. A computer-readable recording medium recording a computer program causing a computer to realize functions as a production simulator that simulates a production process expressing a production state and a production constraint of the production process, a mathematical expression model holding device that holds a mathematical expression model which uses a state equation created by acquiring information relating to creation of a production schedule to which attention is paid, and is a mathematical expression model expressing the production state and the production constraint of the above described production process in a mathematical expression, and an optimization calculation device that performs optimization calculation processing by using a predetermined evaluation function for the above described mathematical expression model to calculate a production instruction for the above described production, simulator,
wherein the production schedule in the above described production process is created from a simulation result obtained by repeating processing of calculating a feedback gain by the above described optimization calculation processing, calculating the production instruction by using the feedback gain and the production state to supply the production instruction to the above described production simulator to proceed with simulation, obtaining a new production state, and calculating a new production instruction based on the new production state.

14. A computer-based system for production process control comprising:
- a production simulator that simulates a production process expressing a production state and a production constraint of the production process;
- a mathematical expression model holding device that holds a mathematical expression model which uses a state equation created by acquiring information relating to creation of a production schedule to which attention is paid, and is a mathematical expression model expressing the production state and the production constraint of the above described production process in a mathematical expression; and
- an optimization calculation device that performs optimization calculation processing by using a predetermined evaluation function for the above described mathematical expression model to calculate a production instruction for said production simulator,
- wherein control of the production process is performed based on a simulation result obtained by repeating processing of calculating a feedback gain by the above described optimization calculation processing, calculating the production instruction by using the feedback gain and the production state to supply the production instruction to said production simulator to proceed with simulation, obtaining a new production state, and calculating a new production instruction based on the new production state.

15. A method for controlling a production process by a production process control device having a production simulator that simulates a production process expressing a production state and a production constraint of the production process, a mathematical expression model holding device that holds a mathematical expression model which uses a state equation created by acquiring information relating to creation of a production schedule to which attention is paid, and is a mathematical expression model expressing the production state and the production constraint of the above described production process in a mathematical expression, and an optimization calculation device that performs optimization calculation processing by using a predetermined evaluation function for the above described mathematical expression model to calculate a production instruction for the above described production simulator,
- wherein control of the production process is performed based on a simulation result obtained by repeating processing of calculating a feedback gain by the above described optimization calculation processing, calculating the production instruction by using the feedback gain and the production state to supply the production instruction to the above described production simulator to proceed with simulation, obtaining a new production state, and calculating a new production instruction based on the new production state.

16. A computer-readable recording medium recording a computer program causing a computer to realize functions as a production simulator that simulates a production process expressing a production-state and a-production constraint of the production process, a mathematical expression model holding device that holds a mathematical expression model which uses a state equation created by acquiring information relating to creation of a production schedule to which attention is paid, and is a mathematical expression model expressing the production state and the production constraint of the above described production process in a mathematical expression, and an optimization calculation device that performs optimization calculation processing by using a predetermined evaluation function for the above described mathematical expression model to calculate a production instruction for the above described production simulator,
- wherein control of the production process is performed based on a simulation result obtained by repeating processing of calculating a feedback gain, by the above described optimization calculation processing, calculating the production instruction by using the feedback gain and the production state to supply the production instruction to the above described production simulator to proceed with simulation, obtaining a new production state, and calculating a new production instruction based on the new production state.

* * * * *